(12) United States Patent
Griffin

(10) Patent No.: US 10,282,940 B2
(45) Date of Patent: May 7, 2019

(54) APPLICATION MONETIZATION PLATFORM WITH GAMEPLAY BEHAVIOR METRICS

(71) Applicant: Collisse Group Limited, Road Town (VG)

(72) Inventor: Christopher E. Griffin, San Francisco, CA (US)

(73) Assignee: Collisse Group Limited, Road Town (VG)

( * ) Notice: Subject to any disclaimer, the term of this patent is extended or adjusted under 35 U.S.C. 154(b) by 0 days.

(21) Appl. No.: 14/705,466

(22) Filed: May 6, 2015

(65) Prior Publication Data
US 2015/0235517 A1 Aug. 20, 2015

Related U.S. Application Data

(62) Division of application No. 13/571,281, filed on Aug. 9, 2012, now Pat. No. 9,076,290.
(Continued)

(51) Int. Cl.
*A63F 9/24* (2006.01)
*G07F 17/32* (2006.01)
(Continued)

(52) U.S. Cl.
CPC .......... *G07F 17/3237* (2013.01); *A63F 13/12* (2013.01); *G06Q 30/00* (2013.01);
(Continued)

(58) Field of Classification Search
CPC ............. G07F 17/3204; G07F 17/3209; G07F 17/3223; G07F 17/3225; G07F 17/3227;
(Continued)

(56) References Cited

U.S. PATENT DOCUMENTS 6,106,395 A 8/2000 Begis
6,345,239 B1 2/2002 Bowman-Amuah
(Continued)

FOREIGN PATENT DOCUMENTS

WO WO 2010/020884 A2 2/2010

OTHER PUBLICATIONS

Non-Final Action dated Sep. 29, 2011 in U.S. Appl. No. 12/543,149.
(Continued)

*Primary Examiner* — Justin L Myhr
(74) *Attorney, Agent, or Firm* — Stoel Rives LLP

(57) ABSTRACT

Various example embodiments are directed to a computer-implemented gaming management system for facilitating applications that support user wagering. The gaming management system may comprise a computer system in communication with a developer computer device. The computer system may be programmed to receive from the developer computer device configuration data for a contingent event to be associated with a user application; determine whether the configuration data meets at least one predetermined standard; and provided that the configuration data meets the at least one predetermined standard, provide the developer computer device with an application program interface (API) credential to be utilized by the user application, wherein the API credential is to give the user application access to an API for resolving the contingent event.

20 Claims, 47 Drawing Sheets

Related U.S. Application Data

(60) Provisional application No. 61/669,443, filed on Jul. 9, 2012, provisional application No. 61/521,733, filed on Aug. 9, 2011.

(51) Int. Cl.
| | | |
|---|---|---|
| *H04L 9/32* | (2006.01) | |
| *A63F 13/30* | (2014.01) | |
| *G06Q 30/00* | (2012.01) | |
| *G06Q 30/02* | (2012.01) | |
| *G07F 17/34* | (2006.01) | |

(52) U.S. Cl.
CPC ..... *G06Q 30/0241* (2013.01); *G07F 17/3213* (2013.01); *G07F 17/3225* (2013.01); *G07F 17/3227* (2013.01); *G07F 17/3241* (2013.01); *G07F 17/3244* (2013.01); *G07F 17/34* (2013.01); *H04L 9/321* (2013.01); *A63F 2300/535* (2013.01); *G07F 17/3204* (2013.01); *G07F 17/329* (2013.01); *G07F 17/3209* (2013.01); *G07F 17/3223* (2013.01); *G07F 17/3239* (2013.01); *H04L 2463/102* (2013.01)

(58) Field of Classification Search
CPC . G07F 17/3239; A63F 13/12; A63F 2300/535
See application file for complete search history.

(56) References Cited

U.S. PATENT DOCUMENTS

| | | |
|---|---|---|
| 6,676,521 B1 | 1/2004 | La Mura et al. |
| 6,899,621 B2 | 5/2005 | Behm et al. |
| 6,966,832 B2 | 11/2005 | Leen et al. |
| 7,029,394 B2 | 4/2006 | Leen et al. |
| 7,240,093 B1 | 7/2007 | Danieli et al. |
| 7,313,760 B2 | 12/2007 | Grossman et al. |
| 7,452,270 B2 | 11/2008 | Walker et al. |
| 7,690,991 B2 | 4/2010 | Black |
| 7,720,732 B2 | 5/2010 | Lortscher |
| 7,819,749 B1 | 10/2010 | Fish et al. |
| 7,901,291 B2 | 3/2011 | Hecht et al. |
| 7,959,502 B2 | 6/2011 | Kane et al. |
| 8,221,225 B2 | 7/2012 | Laut |
| 9,076,290 B2 | 7/2015 | Griffin |
| 2001/0037211 A1 | 11/2001 | McNutt et al. |
| 2002/0142825 A1* | 10/2002 | Lark ............... G06Q 20/382 463/16 |
| 2003/0125112 A1 | 7/2003 | Silvester |
| 2003/0228910 A1 | 12/2003 | Jawaharlal et al. |
| 2004/0127277 A1 | 7/2004 | Walker et al. |
| 2004/0152517 A1 | 8/2004 | Hardisty et al. |
| 2004/0266533 A1 | 12/2004 | Gentles et al. |
| 2005/0003888 A1 | 1/2005 | Asher et al. |
| 2006/0019749 A1 | 1/2006 | Merati et al. |
| 2007/0087834 A1* | 4/2007 | Moser ............... G06Q 30/02 463/42 |
| 2007/0093299 A1 | 4/2007 | Bergeron et al. |
| 2007/0129956 A1 | 6/2007 | Stinski |
| 2007/0130040 A1 | 6/2007 | Stinski |
| 2008/0065579 A1 | 3/2008 | Ricketts |
| 2008/0220856 A1* | 9/2008 | Lynch ............... G07F 17/32 463/25 |
| 2008/0254876 A1 | 10/2008 | Koustas et al. |
| 2008/0268958 A1 | 10/2008 | Walker et al. |
| 2008/0318655 A1 | 12/2008 | Davies |
| 2009/0036203 A1 | 2/2009 | Anderson et al. |
| 2009/0143128 A1 | 6/2009 | Cautley et al. |
| 2009/0163264 A1 | 6/2009 | Whiteman et al. |
| 2009/0176558 A1* | 7/2009 | Englman ............ G07F 17/32 463/25 |
| 2009/0176566 A1 | 7/2009 | Kelly |
| 2009/0247272 A1 | 10/2009 | Abe |
| 2009/0247284 A1* | 10/2009 | Sugiyama ............ G07F 17/32 463/25 |
| 2009/0298576 A1 | 12/2009 | Nguyen |
| 2010/0010908 A1 | 1/2010 | Pasupulati et al. |
| 2010/0035679 A1 | 2/2010 | Oram |
| 2010/0041482 A1 | 2/2010 | Kumar et al. |
| 2010/0144426 A1 | 6/2010 | Winner et al. |
| 2010/0148442 A1 | 6/2010 | Walker et al. |
| 2010/0160022 A1 | 6/2010 | Oram |
| 2010/0248843 A1 | 9/2010 | Karsten |
| 2010/0298045 A1 | 11/2010 | Patel |
| 2011/0065490 A1 | 3/2011 | Lutnick |
| 2011/0111836 A1* | 5/2011 | Acres ............... G07F 17/32 463/25 |
| 2011/0183762 A1 | 7/2011 | Topham et al. |
| 2011/0195769 A1 | 8/2011 | Frick et al. |
| 2012/0165094 A1 | 6/2012 | Kinsley et al. |

OTHER PUBLICATIONS

Non-Final Action dated Jan. 5, 2012 in U.S. Appl. No. 12/703,651.
International Search Report for International Application No. PCT/US12/50208 dated Dec. 7, 2012.
Written Opinion of the International Searching Authority for International Application No. PCT/US12/50208 dated Dec. 7, 2012.
International Preliminary Report on Patentability for International Application No. PCT/US12/50208 dated Feb. 11, 2014.
Extended European Search Report for European Application No. 12821916.9 dated Jul. 27, 2015.

* cited by examiner

Betable

I'll deposit later, skip this form

Deposit funds to play with

Proin gravida nibh vel velit auctor aliquet. Aenean sollicitudin, lorem quis bibendum auctor, nisi eli consequat ipsum, nec sagittis sem nibh id elit. Nec sagittis sem nibh id elit.

| Deposit amount | £20 |
| Payment method | Credit card ▼ |

Credit card information

| Name on card | |
| Card number | |
| Expiration date | Month ▼ Year ▼ |
| Security code / CVV2 | ☐ 3-digit code |

☐ Save this credit card for future use

Billing information

| Address 1 | |
| Address 2 | Apartment, Suite, Floor, etc. |
| City | |
| State / Province | |
| ZIP / postal code | |

[Deposit £20]

⊛Betable  Logged in as: Betable  Games  Resources  Account  Log out

Games > Wheels of Steel

Setup ✓
Integration
Publish

Integrate with Betable

Tools  Manage sandbox  Game settings  Go to Publish

Sandbox redirect URL — 1568
Current: *None provided*

| URL | http://www.betable.com:12345/oauth2callback |

Save

Add Sandbox Funds — 1570
Nisi edi consequat ipsum, neo sagittis sem nibh id eht duis sed odio sit amet nich vulpurate

| Amount | 200 | Current sandbox balance: 100.00 |

Add funds — 1571

Send test user invites — 1572
Nisi edi consequat ipsum, neo sagittis sem nibh id eht. Duis sed odio sit amet nich vulpurate cursus a sit amet mauris. Morbi accumsan ipsum velit.

| Email address | xxxxxxxxxxxxxxxx | Send invite | — 1573

Wheels of Steel test users

| Active | John Doe | JohnDoe@gmail.com | ✕ |
| Inactive \| RE-INVITE? | chris@betable.com | | ✕ |
| Inactive \| RE-INVITE? | tyke@betable.com | | ✕ |
| Inactive \| RE-INVITE? | stefano@betable.com | | ✕ |

@Betable — Logged in as: Betable | Games | Resources | Account | Log out

Games > Wheels of Steel

Setup ●
Integration
Publish

Integrate with Betable

Tools | Manage sandbox | Game settings | Go to Publish

Nisi edi consequat ipsum, neo sagittis sem nibh id eht. Duis sed odio sit amet nich vulpurate cursus a sit amet mauris. Morbi accumsan ipsum velit.

Production redirect URL — 1576

| URI | http://www.betable.com:12345/oauth2callback |

[Save]

— 1578

Game setup details

| Return to player | 87.55% |
| Variance | +/-8.25% |
| Overall win % | 16% |
| Max. allowed wager | £5.00 |
| Min. operating funds | £650.00 GBP / $1019.00 USD |

Gameplay availability by location — 1580

Betable services are currently not available to players living or traveling in the following countries: United States, Italy, Turkey, Holland, and China.

Exclude additional countries (optional) — 1584

| Country | xxxxxxxxxxxxxxxx | [Exclude] | — 1582

Additional excluded countries on November 12, 2012 — Philippines — ⊗

APPLICATION MONETIZATION PLATFORM WITH GAMEPLAY BEHAVIOR METRICS

RELATED APPLICATIONS

This application is a divisional of U.S. application Ser. No. 13/571,281, filed on Aug. 9, 2012 and now allowed, which is incorporated herein by reference in its entirety and which claims the benefit of U.S. Provisional Application Ser. No. 61/521,733 filed on Aug. 9, 2011 and of U.S. Provisional Application Ser. No. 61/669,443 filed on Jul. 9, 2012 both of which are incorporated herein by reference in their entireties. This application is related to commonly-owned PCT Application Serial No. PCT/US2012/50208, filed on Aug. 9, 2012 and incorporated herein by reference in its entirety.

BACKGROUND

This application generally relates to implementing aspects of gambling and/or betting into third party gaming applications.

Developments in computing technology in recent years have led to an increased market for applications that are executable on various different types of computer devices including handheld devices such as mobile smart phones, tablet computers, etc., as well as more traditional computer devices such as desktops or laptops. One popular genre of applications are gaming applications where users play virtual games of varying complexity. Although there are many applications in circulation, developers' current methods for monetizing the applications are often inadequate.

One existing gaming application monetization method relies on in-game advertising. Advertisements are provided within the application itself and provide revenue to the developer based on interactions between the users and specific advertisements (e.g., number of impressions, number of click-throughs, etc.). Many gaming application users, however, consider the advertisements to be a nuisance at best. A developer that includes advertisements, or too many advertisements, in its gaming application risks driving away potential users.

According to another existing gaming application monetization method, developers charge users for access to the code implementing the application itself. The purchased access may include a download of the code (e.g., in executable form) to the user's computer device and/or access the application as executed at a remote server. It is often difficult, however, to persuade users to pay for an application before the user has played the associated game.

According to yet another monetization method, users are initially provided with access to gaming applications for free. Once a user has begun to access the application, the user is provided with opportunities to purchase extras, such as virtual goods used within the game and/or additional levels. This method has the capacity to generate a high revenue per user for users that are motivated enough to purchase virtual goods and levels. Typically, however, a large number of users simply play the free portions of the game without purchasing extras, that is the free-to-paid conversion is often relatively low. Thus, the average customer lifetime value (CLV) and average revenue per user (ARPU) are often low.

DRAWINGS

FIG. 7 is a screen shot showing one embodiment of an interface screen that may be shown to a user to receive a fund deposit from the user.

Figure 13:
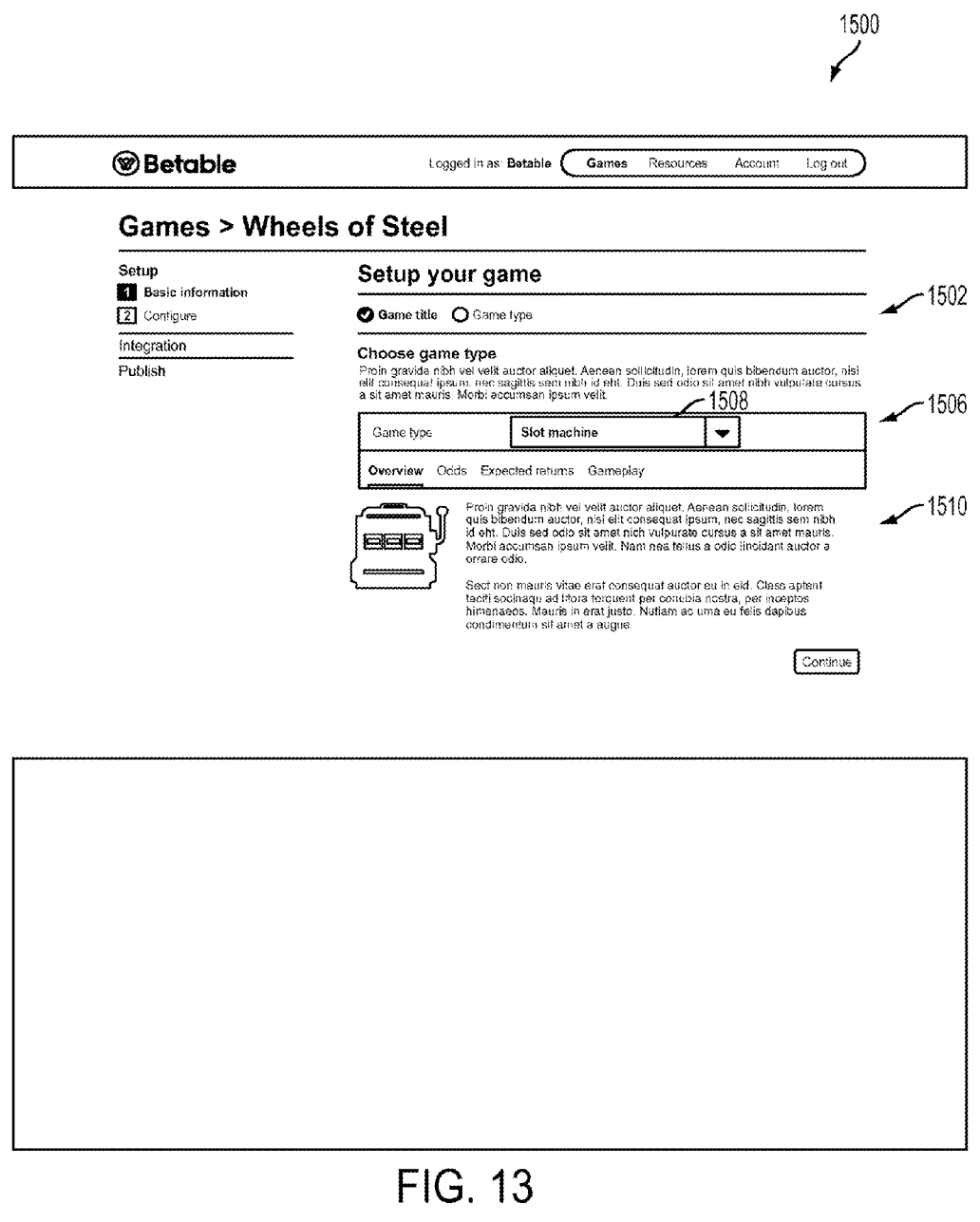

FIG. 13 is a screen shot showing one embodiment of the interface screen that may be provided to the developer to describe the selected contingent event type.

FIG. 18 is a screen shot showing one embodiment of an interface screen that may be provided to the developer to provide the developer with test environment API credentials, receive house funds from the developer, and/or provide test users.

FIG. 19 is a screen shot showing one embodiment of an interface screen that may be provided to the developer to provide the developer with production environment API credentials and allowable contingent event characteristics and receive from the developer changes to the contingent event characteristics.

FIG. 20 is a screen shot showing one embodiment of an interface screen that may be provided to the developer to confirm that appropriate steps have been taken to integrate the developer's application with the gaming management system of FIG. 1.

FIG. 23 is a screen shot showing one embodiment of the interface screen of FIG. 22 including additional developer payment information fields.

FIG. 28 is a screen shot showing one embodiment of the interface screen of FIG. 13 with the "keno" event type selected.

FIG. 29 is a screen shot showing one embodiment of an interface screen that may be provided to a developer to receive contingent event configuration characteristics according to a framework for "keno" type contingent events.

FIG. 42 is a screen shot showing one embodiment of an interface screen that may be provided to a developer to receive payment detail information.

DESCRIPTION

Figure 1:
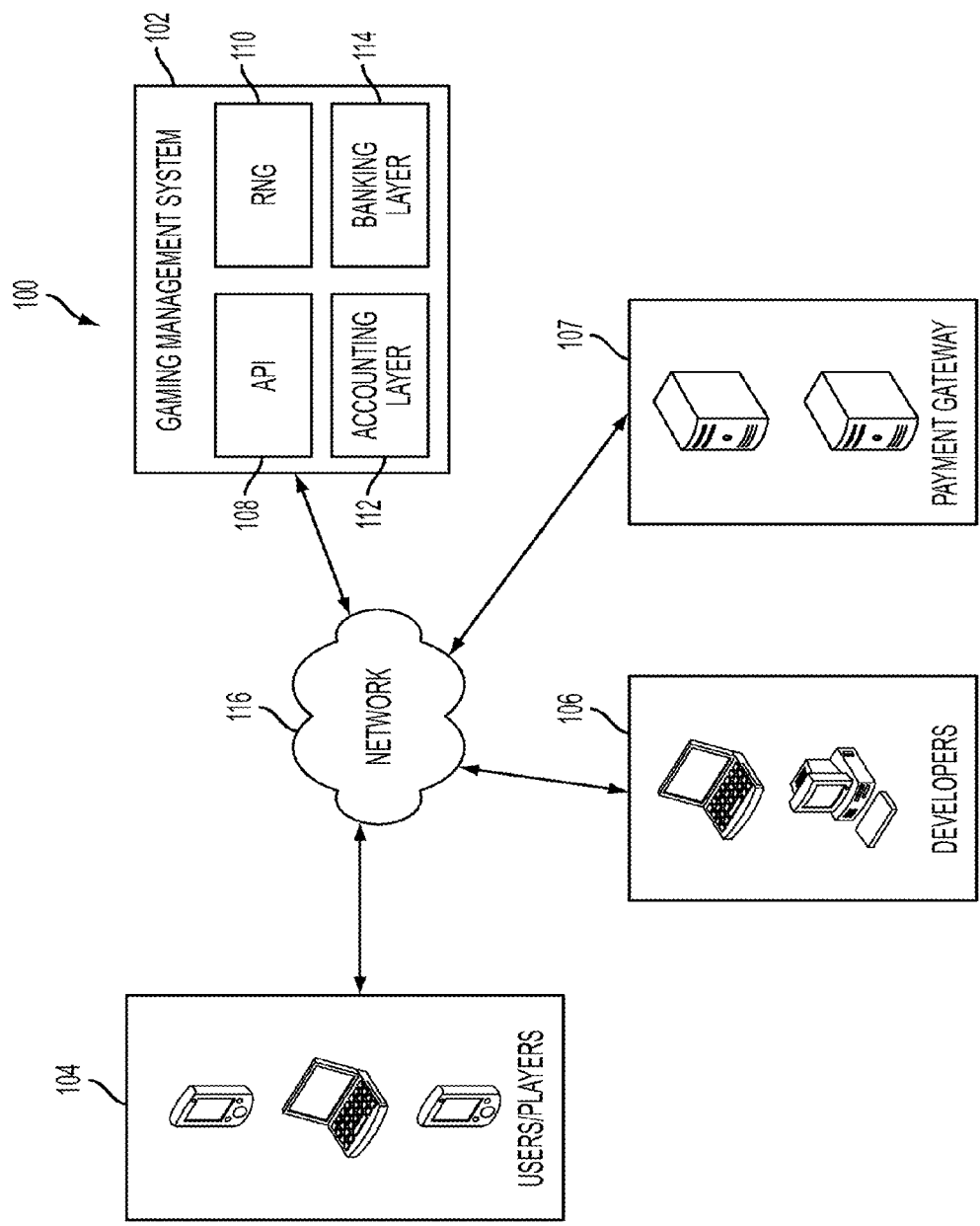
FIG. 1 is a diagram showing one example embodiment of an environment for implementing a gaming management system.

The features and advantages described in the specification are not all inclusive and, in particular, many additional features and advantages will be apparent to one of ordinary skill in the art in view of the drawings, specification, and claims. The language used in the specification has been principally selected for readability and instructional purposes, and may not have been selected to delineate or circumscribe the disclosed subject matter.

The figures and the following description relate to example embodiments of the invention by way of illustration only. Alternative example embodiments of the structures and methods disclosed here may be employed without departing from the principles of what is claimed.

To improve monetization of game and other applications, developers may incorporate functionality to allow users to place monetary wagers or bets within an application. Entities offering monetary wagers or bets to the public are often subject to significant licensing, and regulatory requirements. The expenses and liabilities associated with obtaining and maintaining appropriate licenses as well as complying with relevant regulatory schemes can constitute a significant barrier to entry for application developers. For example, a developer or other entity offering a gambling application must identify jurisdictions where a gambling license is required and, for each jurisdiction, engage in onerous expensive and often time-consuming procedures to obtain the required licenses. Even after appropriate licenses are obtained, the licensed entity must comply with strict regulations relating to game play, accounting, and even banking services.

Various example embodiments are directed to systems and methods for facilitating the incorporation of monetary wagers or bets into third-party applications. For example, the systems and methods described herein may obviate the need for individual developers to obtain gambling licenses. A gaming management system may be implemented by a facilitating business entity or facilitating entity having one or more gambling licenses. The gaming management system provides third-party application developers with functionality to incorporate monetary wagers or bets into their gaming applications. For example, developers may allow application users to wager on outcomes of one or more contingent events, described in more detail below. Allowable parameters of contingent events and bets that may be placed are controlled by the gaming management system. In this way, the gaming management system may ensure that any bets placed are in compliance with applicable regulations and/or with previously approved contingent event forms. When the resulting applications are executed, users may place bets through the gaming management system. For example, the gaming management system may: determine an outcome for each contingent game event, determine winnings or losses, and distribute the winnings or losses to the user. In this way, the applications may utilize a gambling license or licenses held by the facilitating entity. Accordingly, the developer may develop the applications, distribute the applications, and obtain users, while the facilitating entity may operate gambling aspects of the game in accordance with applicable regulations and licenses (e.g., held by the facilitating entity).

As used herein, the term "gambling license," "license" or "gaming license" refers to a license that is held by an entity offering betting, wagering or other gaming to the public. In some jurisdictions, a gambling license may be required to offer certain types of betting, wagering or other gaming to the public.

Contingent events, also referred to as contingent game events, may be situations within a game or other type of application that have an unknown outcome and may be the subject of a bet or wager. A contingent event may have at least two potential outcomes. Each potential outcome may be associated with a probability that the potential outcome will occur. Probabilities for different potential outcomes may be fixed (e.g., set in advance) and/or parameterized (e.g., determined based on circumstances of game play surrounding the contingent event). The gaming management system may resolve contingent events based on the probabilities for the potential outcomes. For example, the gaming management system may randomly select one of the potential outcomes based on the relevant probabilities (e.g., utilizing a random number generator or any other suitable type of method or device). The selected outcome may be referred to as the outcome of the contingent event.

Contingent events may be any type of event that can occur in the context of a game or other type of application where the outcome is initially unknown. It will be appreciated, however, that different types of applications can manifest contingent events in different forms. For example, some use cases involving contingent events relate to applications that implement games traditionally associated with gambling, such as slot machine games, card games, craps games, etc. In games such as these, contingent events may be similar to the unknown events on which physical versions of the game are played. For example, in a slot machine game, a virtual pull of the slot machine lever is a contingent event. Each potential configuration of the slot machine reels may correspond to a potential outcome, with the probability of each potential outcome corresponding to the configuration of the reels. In a craps game, each roll of the dice is a contingent event, with each potential configuration of the dice corresponding to a potential outcome. In card games, such as poker, blackjack, etc., the deal is a contingent event. Potential outcomes may correspond to potential cards and/or hands held by each player after the deal. In some example embodiments, contingent events may be compound. For example, the outcome of a hand of poker can depend on multiple rounds of betting and multiple deals. Examples of games implementing traditional gambling wagers include SLOTS and POKER, both available from ZYNGA.

Other use cases for contingent events relate to games that are not typically associated with gambling. For example, one currently popular genre of social network games involves the planting and raising of crops, animals, etc. Examples of games in this genre include FARMVILLE and CITYVILLE, both available from ZYNGA, FARMTOWN available from SLASHKEY, etc. In these games, users virtually "plant" crops. When the crops are ready, the user may virtually "harvest" the crops for in-game rewards, such as virtual currency, experience points, etc. In one example of a game implemented with the gaming management system described herein, the planting of a crop is a contingent event. The user's wager may take the form of a payment for the seeds or other resources necessary to plant the crop. The user's winnings (if any) may be determined based on the success of the harvest. Potential outcomes of the contingent event include a successful harvest, an unsuccessful harvest and/or various gradations between a successful and unsuccessful harvest. Contingent events corresponding to the planting of crops, in some example embodiments, may be parameterized. For example, the probability of a successful harvest outcome may be based on predetermined factors, but may also be based on user behavior (e.g., whether the user waters the crops, whether the user harvests the crops on time, whether the user feeds or waters an animal, etc.).

Another use case for contingent events relates to games of skill. A contingent event may be a particular play or set of plays (e.g., a set of plays making up a level). The potential outcomes for each contingent event may reflect the possible results of a play. The probability for each potential outcome may be determined based on the difficulty of the play or level. In some example embodiments, the probability for a given outcome may be parameterized (e.g., based on the user's skill level or past history with the game. Examples of games of skill that may utilize contingent events as described include the various iterations of ANGRY BIRDS available from ROVIO ENTERTAINMENT, LTD. For example, a contingent event may be a bird launch or series of bird launches. Potential outcomes of the contingent event may relate to the number of enemies defeated.

Another example use case relates to a currently popular genre of games involves conflicts between different users, with each user corresponding to an individual and/or army that is a party to the conflict. Examples of games in this genre include MAFIA WARS and MAFIA WARS 2 from ZYNGA. In games of this genre, fights or conflicts between players are one example contingent event type. For example, a user may bet that they will win a conflict, that they will win a conflict in a certain number of turns, with at least a certain amount of energy remaining, etc. Potential outcomes may correspond to potential outcomes of the conflict. In some example embodiments, the probabilities of each potential outcome may depend on properties of the users involved. Such properties may be parameters of the contingent event and can include, for example, skill and/or experience points associated with each user, game items possessed by each user (e.g., weapons), etc.

In some example embodiments, not limited to conflict-type games, contingent events may be utilized to cross-sell other products within applications such as, for example, level packs, virtual goods, etc. For example, applications may be configured to prompt users to purchase additional level packs, virtual goods, etc. by advertising that the promoted purchases will increase the user's probability of winning wagers on contingent events. Such prompts may be provided at any time during game play. In some example embodiments, the prompts may be provided after the user has lost a wager. For example, the application may be configured to inform the user that possession of a particular virtual good would have increased the user's chances of winning.

It will be appreciated that contingent events may be applied to any type of game or other application involving an event with an unknown outcome upon which the user can wager or place a bet. The contingent event examples provided herein are intended only as examples. Also, it will be appreciated that games and other application types using contingent events may be provided directly to a user and/or via an intermediate application or game. For example, the user's character within the intermediate game may play a contingent event game. For example, an application may implement a casino comprising various gambling games for avatars of the game SECOND LIFE from LINDON LABS and/or similar games.

FIG. 1 is a diagram showing one example embodiment of an environment 100 for implementing a gaming management system 102. The gaming management system 102 may be implemented utilizing any suitable type of computer or system of computers and may include one or more processors and operatively associated memory. In some example embodiments, the gaming management system 102 may by implemented by one or more servers that may be located at a single location and/or at multiple geographic locations.

FIG. 1 also shows a set of application players or users 104 and developers 106. The users 104 may access applications developed by the developers 106. The users 104 may utilize any suitable type of computer device or devices including, for example, hand held devices such as mobile smart phones, tablet computers, laptop computers, desktop computers, etc. In some example embodiments, execution of the applications may be local at the users' computer devices, remote at a server or servers of the developers 106 and/or mixed. A payment gateway 107 may facilitate financial transactions associated with the wagers or be t placed. For example, the payment gateway 107 may be utilized by the gaming management system 102 to transfer winnings and/or losses between financial accounts associated with the users 104 and the house. The various components of the environment 100 are in communication with one another via a network 116. The network 116 may comprise wired and/or wireless components and may be and/or comprise one or more wide area networks (WAN's) and/or local area networks (LAN's). In some example embodiments, the network 116 may comprise and/or utilize the Internet.

The gaming management system 102 may comprise various functional components 108, 110, 112, 114 that may be implemented, for example, as software code executed by the gaming management system 102. An application program interface (API) 108 provides an interface allowing the gaming application 104 to communicate with the gaming management system 102. For example, the API 108 may support commands (described herein) allowing applications to pass an indication of a contingent event and associated parameters (if present). The outcome for the contingent event as determined by the gaming management system 102 may also be passed from the gaming management system 102 to the application. A random number generator (RNG) 110 may be programmed to resolve contingent events (e.g., select a potential outcome from the plurality of potential outcomes based on the probabilities of the potential outcomes). An accounting layer 112 is programmed to track the financial results of each contingent event. For example, the accounting layer 112 may determine the winnings or losses for the user or the house based on the outcome of each contingent event. The winnings or losses of the parties may be based on properties of the contingent event as well as parameters of the contingent event, such as an amount of a wager made by the user, a property of the user within the application, etc. A banking layer 114 may execute transactions to implement the outcome of a contingent event. The specific required transactions for a contingent event are determined, for example, by the banking layer 114 and/or by the accounting layer 112.

Figure 2:
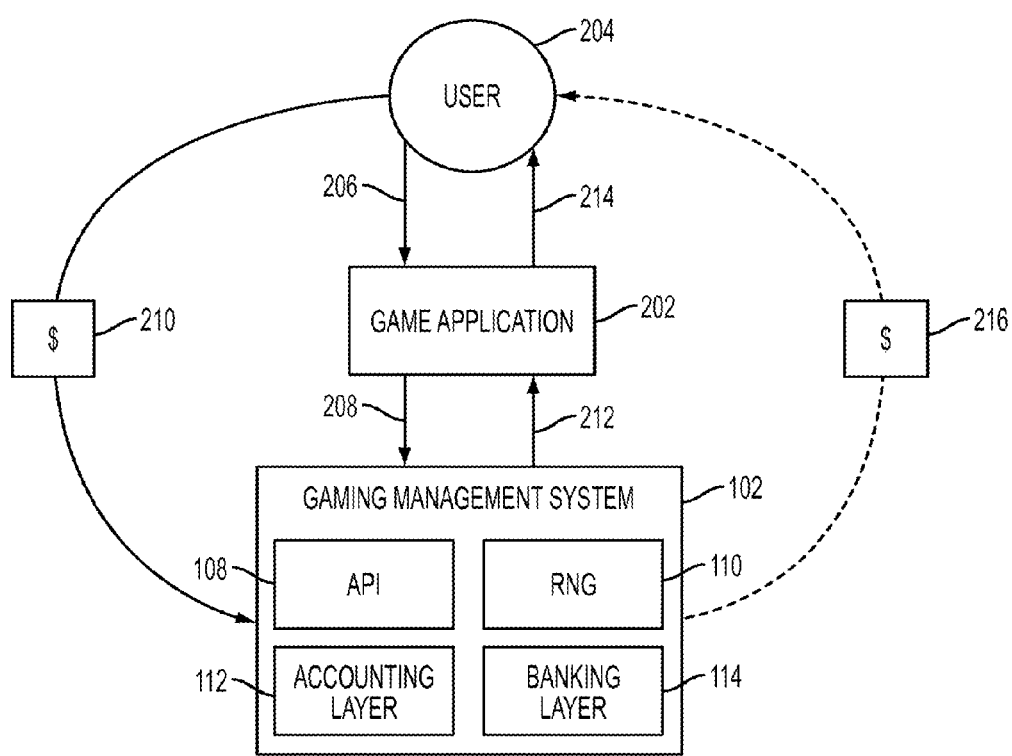
FIG. 2 is a diagram showing one example embodiment of the gaming management system in communication with a gaming application and a user of the gaming application demonstrating a basic work flow for resolving a contingent game event.

FIG. 2 is a diagram showing one example embodiment of the gaming management system 102 in communication with an application 202 and a user 204 of the application 202 demonstrating a basic work flow for resolving a contingent event. The user 204 may have a preexisting account with the gaming management system 102 and/or may open such an account. For example, to facilitate the opening of an account, the gaming management system 102 may provide the user 204 with an interface through which the user may provide user information describing the user such as the user's age, geographic location, e-mail, bank account and/or credit card information for receiving winnings and covering losses, etc. Based on the user information, the gaming management system 102 may determine whether the user 204 is eligible to place bets with the gaming management system 102 (e.g., via the application 202). User eligibility may depend on regulations associated with the user's jurisdiction, policies of the gaming management system 102, etc. Provided that the user 204 is eligible, the account may be opened. When an account is opened, the user 204 may deposit money to the account at 210. (When the user 204 has a pre-existing account with the gaming management system 102, it may not be necessary to open a new account for each application 202 used by the user 204.) The deposit 210 may include a request from the user 204 to the gaming management system 102 to transfer funds to the user's account. The gaming management system 102 (e.g., the accounting layer 112 and/or banking layer 114) may transfer the requested funds from a credit card or bank account of the user 204 to an account maintained by the gaming management system 102. The accounting layer 112 may credit the deposit to the user's account.

During game play, the application 202 may encounter a contingent event. As described herein, the application 202 may provide the user 204 with an opportunity to place a wager on the contingent event. At 206, the user 204 may place a wager or take another gambling action. The application 202 may pass the contingent event as well as the wager of the user 204 and any other parameters for resolving the contingent event to the gaming management system 102 at 208 (e.g., via the API 108). The gaming management system 102 may resolve the contingent event as described herein (e.g., utilizing the RNG 110). Based on the outcome of the contingent event, the gaming management system 102 may determine the results of one or more bets placed on the contingent event. Winnings or losses to be attributed to the user 204 and the house (e.g., utilizing the accounting layer 112). At 216, the gaming management system 102, for example utilizing the banking layer 114, may initiate account transfers to realize the results of the one or more bets. For example, winnings and/or losses may be transferred to and/or from accounts of the user 204 and/or the house. The outcome of the contingent event and results of the one or more bets may be communicated to the application 202 at 212. The application 202 may, in turn, communicate the outcome and results to the user 204 at 214.

Figure 3:
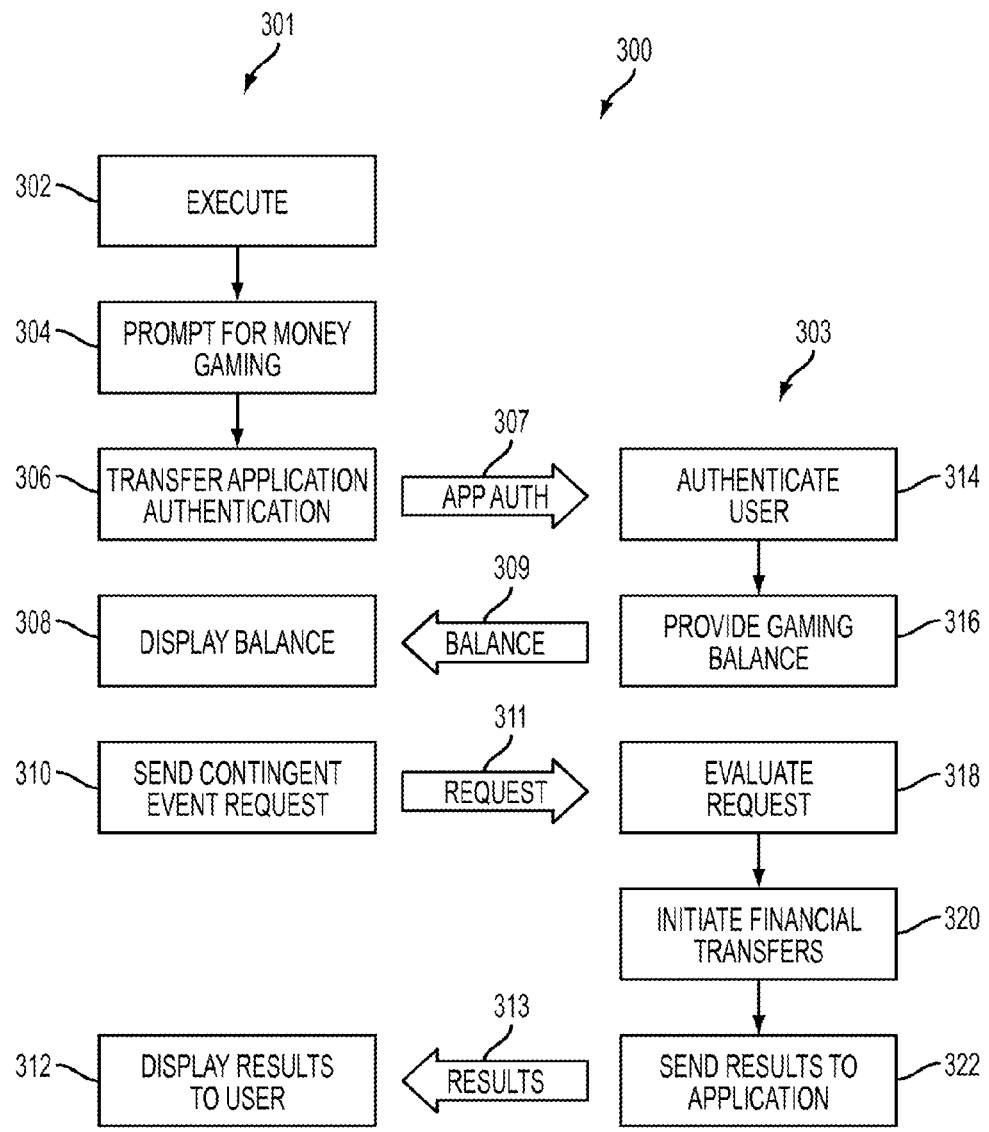
FIG. 3 is a flow chart illustrating one example embodiment of a process flow demonstrating an example interaction between an application and the gaming management system.

FIG. 3 is a flow chart illustrating one example embodiment of a process flow 300 demonstrating an example interaction between an application, such as 202, and the gaming management system 102. The process flow 300 includes two columns 301 and 303. Column 301 includes actions that may be taken by the application, while column 303 includes actions that may be taken by the gaming management system 102, including the various layers and modules therein. At 302, the application may execute. The application may execute at a computer device of the user. In some example embodiments, the application may be completely or partially executed at a remote server associated with the developer 106 of the game.

At 304, the application 202 may optionally prompt the user to wager real money (e.g., prompt for money gaming). For example, some applications may have a virtual-only mode, where the user can earn only virtual currency and goods. In the virtual-only mode, contingent event resolution and the distribution of winnings and/or losses may be handled by the application (without the gaming management system 102) and/or by the gaming management system 102. For example, the gaming management system 102 may also be configured to handle virtual wagers on contingent events. When a virtual wager is made, contingent event resolution may be handled by the RNG 110 and accounting layer 112 as described above. Virtual currency or other goods, in some example embodiments, may be recorded in a user's virtual account separate from the user's real money account. Also, for virtual wagers, it may not be necessary to utilize the banking module 114 to transfer funds, as no real money may change hands. The prompt at 304 may be triggered by various different in-game events. For example, the user may be prompted to wager real money automatically upon execution of the application. Also, in some example embodiments, applications may be configured to prompt the user to wager real money after the user has won a virtual wager, won a threshold amount of virtual currency (e.g., non-zero) or goods, etc. Also, in some example embodiments, wagers for virtual goods, currency, etc. may be handled by the application itself and/or by a server operated by and/or associated with the developer of the application. For example, gambling licenses may not be required to promote wagers for virtual goods.

At 306, the application may transfer an application authentication 307 to the gaming management system 102 (e.g., provided that the user chooses to wager real money). The application authentication may be, for example, an API credential or other way of identifying and authenticating the application to the gaming management system 102. It will be appreciated that the application may have previously been configured and integrated with the gaming management system 102 as described herein below. For example, the authentication 307 may indicate that at least one contingent event associated with the application has been approved, for example, as described below with respect to FIG. 10. Upon receiving the application authentication 307, the gaming management system 102 may verify the application authentication, thereby confirming that the application is configured to operate with the gaming management system 102. In various example embodiments, communications between the application and the gaming management system 102 may be secured. For example, the communications may be encrypted according to any suitable encryption method including, for example, a public key infrastructure (PKI). In some example embodiments, the user device or other computer device executing the application may be in communication with the gaming management system 102 via a secure connection, such as a Secure Sockets Layer (SSL), Transport Layer Security (TLS) and/or Hypertext Transfer Protocol Secure (HTTPS) connection.

At 314, the gaming management system 102 may authenticate the user of the application. Authentication of the user may comprise various actions to ensure that the user is eligible to wager via the application, that the user is registered with the gaming management system 102 and that the user has accounts and funds including money for wagering. For example, in some example embodiments, the gaming management system 102 may provide the user with an authentication interface through the application itself. An example of such an interface is described below with respect to FIGS. 4-9. For example, determining whether the user is eligible to wager may involve verifying that the user is above a minimum gambling age, that the user is in a jurisdiction that allows gambling, etc. In some example embodiments, the gaming management system may determine a user's location, for example, based on an Internet Protocol (IP) address of the user.

Upon authentication, the gaming management system 102 may optionally provide the user's gaming balance 309 to the application at 316. The gaming balance 309 may represent an amount of money that the user has deposited under management of the gaming management system 102 that is available to wager. The gaming balance 309 may be a balance specifically dedicated to the application or in some example embodiments may be the user's total available balance or total balance dedicated to a class of applications including the application. The application may display the gaming balance 309 at 308. It will be appreciated that some jurisdictions may require that the gaming balance be displayed to the user prior to wagering. If the user is present in such a jurisdiction, the gaming management system 102 may not permit wagering on contingent events until or unless the balance is displayed.

The application may implement a game or other functionality directed to the user. Upon encountering a contingent event, the application may, at 310, direct a contingent event request 311 to the gaming management system 102. The contingent event request 311 may include information about the type of contingent event and the wager placed on the event by the user. If the event is parameterized, the contingent event request may also include parameters for the contingent event. The gaming management system 102 may evaluate the contingent event request 311 at 318. Evaluating the contingent event request 311 may comprise, for example, resolving the contingent event utilizing the RNG 110 and determining any winnings and/or losses from the outcome utilizing the accounting layer 112. Any financial transfers resulting from the outcome of the contingent event may be initiated at 320 (utilizing the banking layer 114). At 322, the gaming management system 102 may send results 313 of the contingent event to the application. The results may include, for example, the outcome of the contingent event and any transfers executed to distribute winnings and/or losses. In some example embodiments, the results may also include a new balance or balance of the user's account with the gaming management system. The application 312 may display the results to the user at 312. The results including, for example, the outcome of the contingent event, may be factored in to subsequent game play.

FIGS. 4-9 are screen shots illustrating various example embodiments of an interface that may be provided by the gaming management system 102 to a user for creating and maintaining a user account with the gaming management system. The interface shown in FIGS. 4-9 may be provided directly to the user, for example, via a website of the gaming management system 102. In some example embodiments, the interface shown in FIGS. 4-9 may be provided to the user via an application, for example, as described above with respect to user authentication at 314.

Figure 4:
FIG. 4 is a screen shot showing one embodiment of an interface screen that may be shown to a user to set up a user account with the gaming management system.

FIG. 4 is a screen shot showing one example embodiment of an interface screen 1000 that may be shown to a user to set up a user account with the gaming management system 102. The screen 1000 comprises a logo section 1002. The logo section 1002 may comprise a logo of the facilitating entity implementing the gaming management system 102, for example, when the screen 1000 is provided directly to a user. When the screen 1000 is associated with a specific application, for example, when the screen 1000 is provided to a user through the specific application, a logo of the application and/or application developer may be displayed at 1002. Users who have a pre-existing account may transfer from the screen 1000 to a log-in screen, such at the screen 1014 shown in FIG. 6, by selecting Log-in button 1006. Users who do not have a pre-existing account may initiate an account set-up process by providing user information at field 1004. Field 1004 may also comprise boxes to be checked by the user indicating that the user is old enough to legally place wagers and that the user will comply with various terms. Upon completion of the information requested at field 1004, the user may initiate an account set-up process by selecting the Sign-up button 1008.

Figure 5:
FIG. 5 is a screen shot showing one embodiment of an interface screen that may be shown to a user to confirm initiation of the account set-up process initiated at screen.
Figure 6:
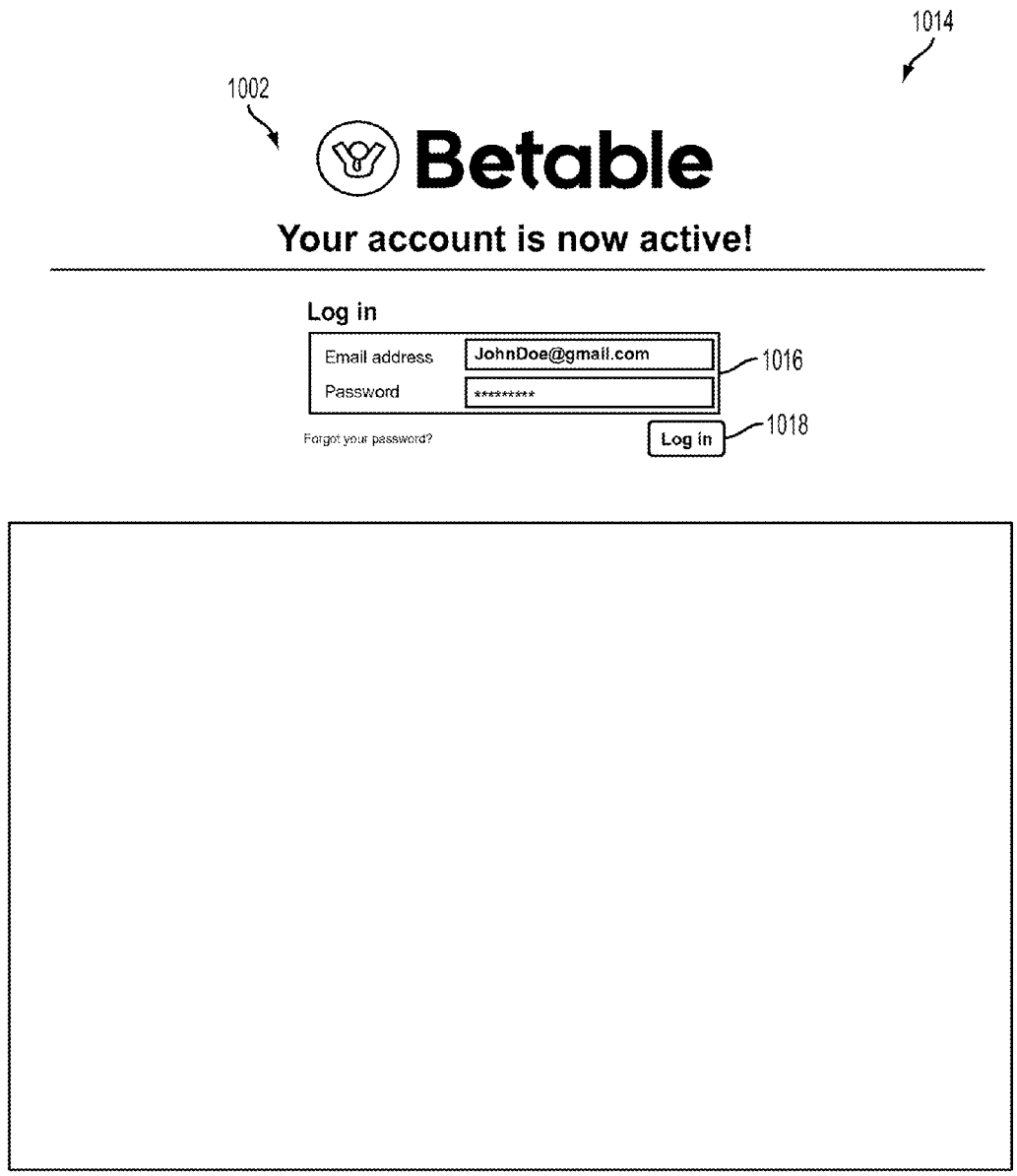
FIG. 6 is a screen shot showing one embodiment of an interface screen that may be shown to a user to receive log-in information.

FIG. 5 is a screen shot showing one embodiment of an interface screen 1010 that may be shown to a user to confirm initiate of the account set-up process initiated at screen 1000. The screen 1010 includes a confirmation field 1012. The confirmation field 1012 indicates to the user that an e-mail has been sent to the user's account and that the set-up process can continue after the user receives the e-mail and selects a link included in the e-mail. The steps of sending an e-mail to the user and holding the account set-up process until the user selects a link in the e-mail are optional and may be used to authenticate the user. FIG. 6 is a screen shot showing one embodiment of an interface screen 1014 that may be shown to a user to receive log-in information. The screen 1014 may have a log-in information field 1016 for receiving a user's log-in identifier (e.g., a username and/or e-mail address) as well as a password. Upon entering the information requested at the log-in information field 1016, the user may initiate log-in by selecting the log-in button 1018. The screen 1014 may be shown to a user upon selection of the button 1006 from screens 1000 or 1010. In some example embodiments, the screen 1014 may also be shown to a user when the user selects the link included in the e-mail described above with respect to the screen 1010. In this case, the password requested by field 1016 may also be provided by the e-mail. A password sent to the user via the e-mail may be temporary and the user may be prompted to change the password upon log-in, for example, via screen 1030 shown in FIG. 9.

Figure 8:
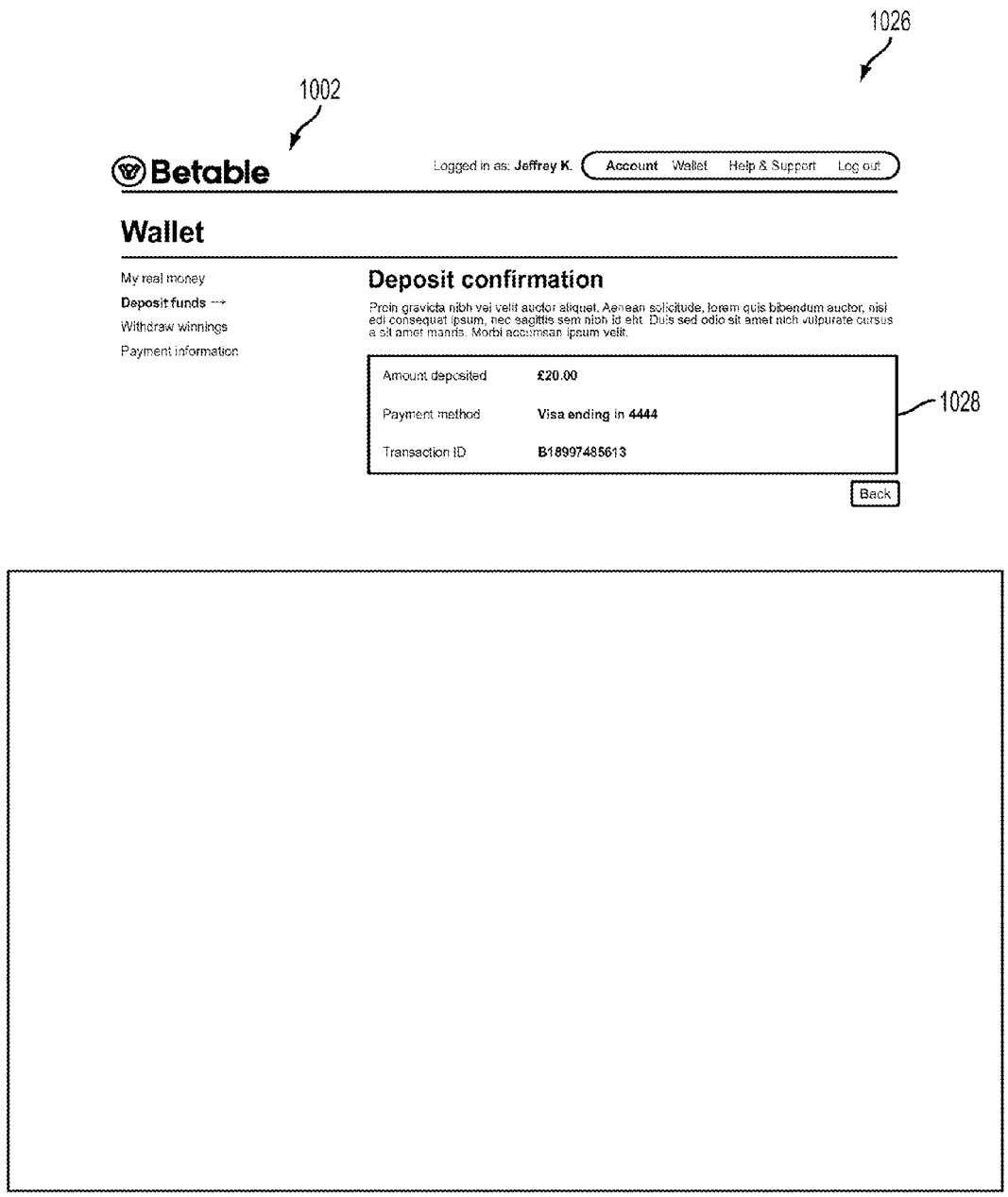
FIG. 8 is a screen shot showing one embodiment of an interface screen that may be shown to a user to confirm a fund deposit.

FIG. 7 is a screen shot showing one embodiment of an interface screen 1020 that may be shown to a user to receive a fund deposit from the user. The screen may comprise fields 1022 for receiving information about the fund deposit including, for example, an amount, a payment method, credit card information, billing information, etc. Funds received via the screen 1020, for example, may be deposited in an account of the user (e.g., at a financial institution and managed by the gaming management system 102). Such funds may be available to wager on contingent events, as described herein. It will be appreciated that the type of information solicited by field 1022 may depend on the selected payment method. For example, FIG. 7 as illustrated is configured to receive payment by credit card. The gaming management system 102, however, may be configured to receive payment from other sources including, for example, by direct deposit from a checking or other bank account, money order, wire transfer, etc. The user may initiate the fund deposit by selecting Deposit button 1024. In some example embodiments, the Deposit Button 1024 may also list the amount of the transfer, as shown. A user that already has funds on deposit, or would like to browse the interface before providing funds may select a deposit later button 1021 to skip the screen 1020. FIG. 8 is a screen shot showing one embodiment of an interface screen 1026 that may be shown to a user to confirm a fund deposit. The screen 1026 comprises a Deposit confirmation field 1028 providing the user with details of a completed deposit. The field 1026 may indicate an amount of the deposit and a payment method utilized to complete the deposit. Optionally, the field may also indicate a transaction identification that may be used for accounting purposes to verify the transfer.

Figure 9:
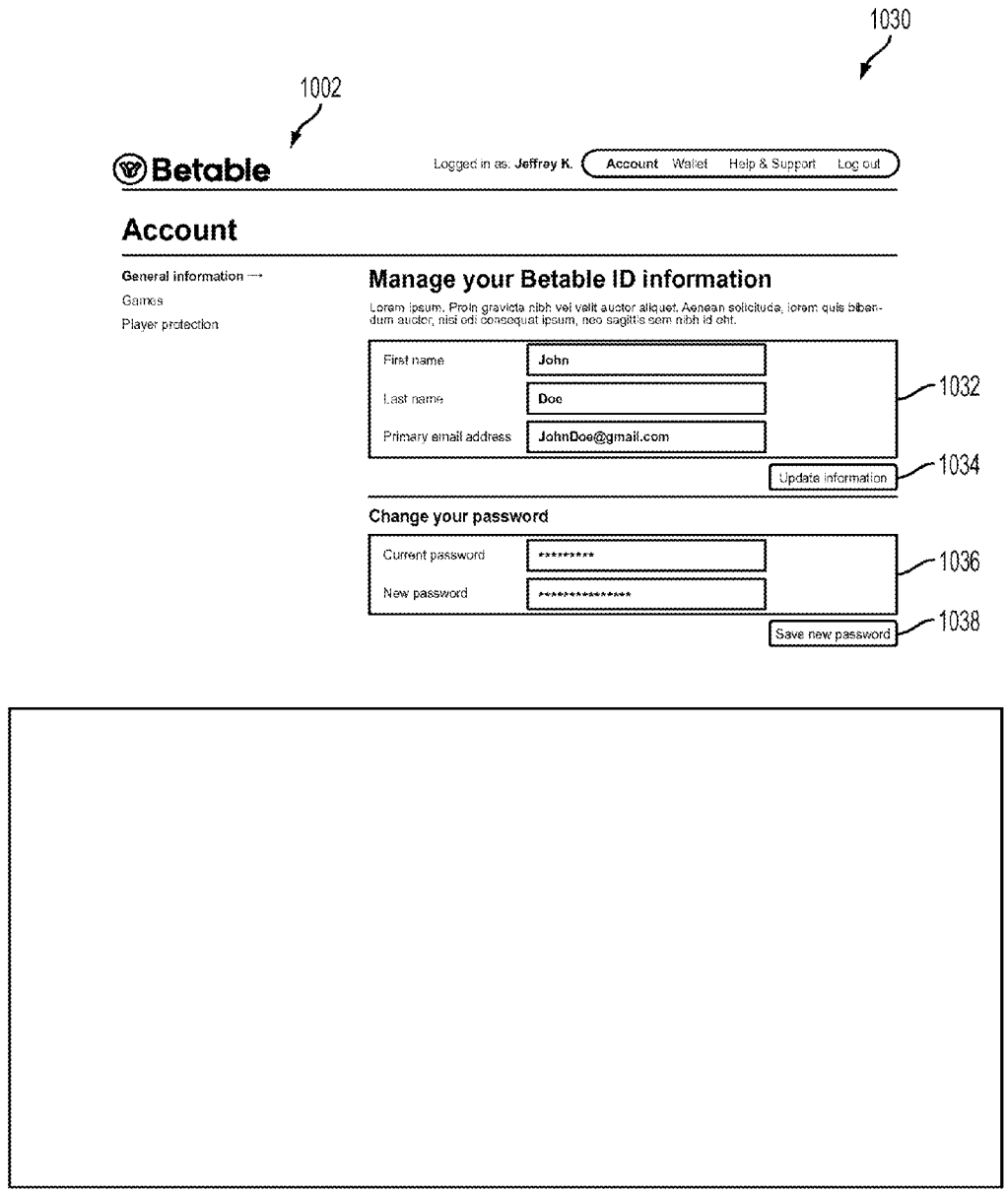
FIG. 9 is a screen shot showing one embodiment of an interface screen that may be shown to a user to allow the user to manage his or her account identification information.

FIG. 9 is a screen shot showing one embodiment of an interface screen 1030 that may be shown to a user to allow the user to manage his or her account identification information. User name and address field 1032 include fields allowing the user to view and modify the name and e-mail account associated with the user's account. Selecting Update information button 1034 may finalize any changes made at field 1032. A password field 1036 may allow the user to change his or her password by entering the old and new passwords. Selecting the Save new password button 1038 may finalize the new password.

In various example embodiments, the gaming management system 102 is also programmed with functionality for configuring applications to offer wagering on contingent events and integrating the applications with the system 102. For example, the system may provide a parameterized generic framework for configuring contingent events. The form and characteristics of the contingent events and allowable wager types may be controlled by the gaming management system 102. For example, the gaming management system 102 may allow only contingent events and wager types that comply with appropriate regulations, including regulations specific to a gambling license or licenses held by the facilitating entity.

Figure 10:
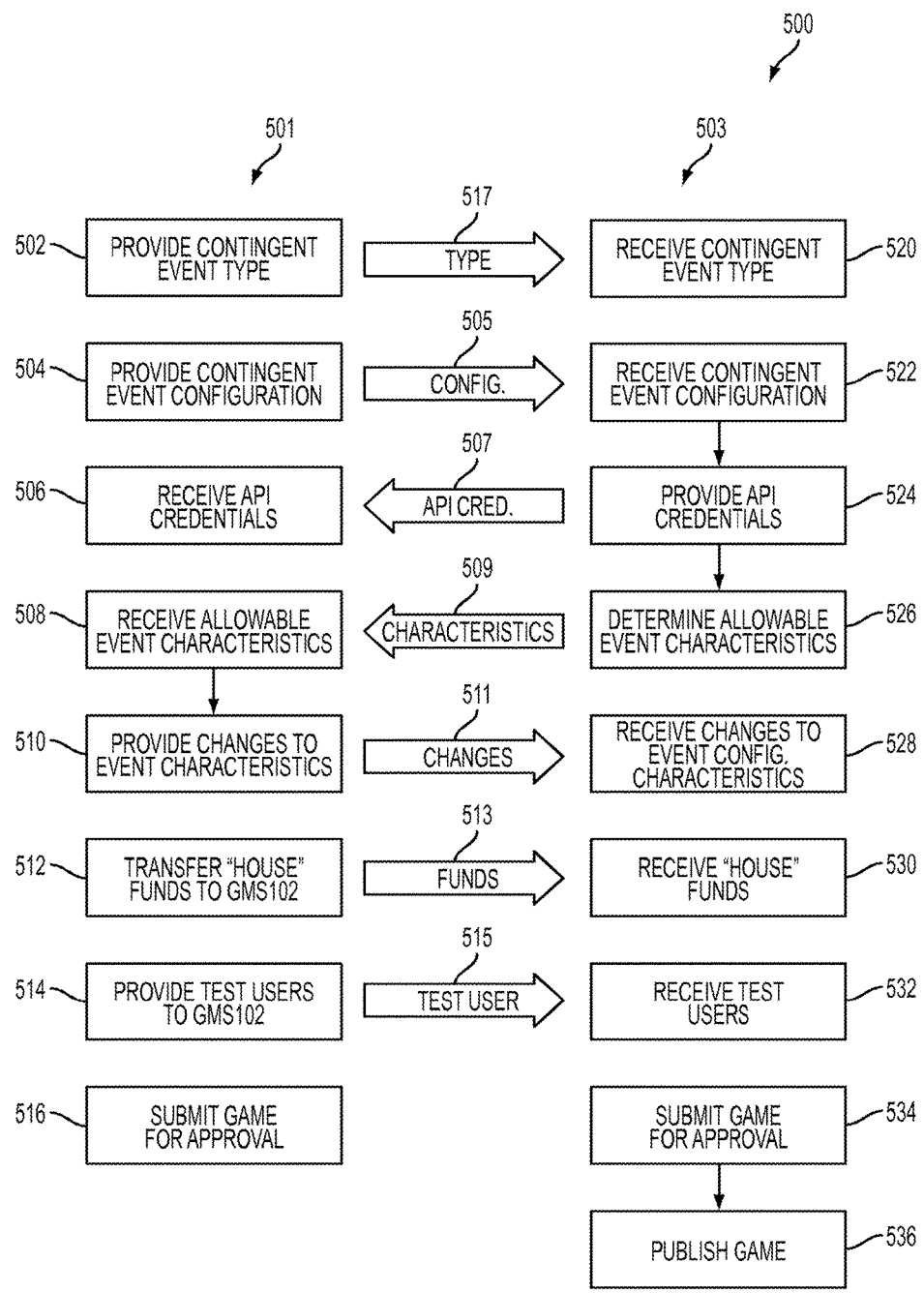
FIG. 10 is a flow chart illustrating one example embodiment of a process flow that may be implemented by the gaming management system to configure and integrate an application to the system.

FIG. 10 is a flow chart illustrating one example embodiment of a process flow 500 that may be implemented by the gaming management system 102 to configure and integrate an application to the system 102. FIG. 10 also includes two columns 501, 503. The column 501 corresponds to actions of an example developer selected from the developers 106 of FIG. 1. The column 503 corresponds to actions of the gaming management system 102. In various embodiments, the gaming management system 102 may provide the developer with an interface, such as the example interfaces illustrated by the screens shown in FIGS. 11-43 described herein. The process flow 500 may be implemented with the example interfaces described in FIGS. 11-43, with another interface, and/or with no interface.

At 502, the developer may provide the gaming management system 102 with a contingent event type 503. In example embodiments where each application or game has a single contingent event type the contingent event type 503 may also be referred to as a game type. The contingent event type 503 may be one of a select number of predetermined contingent event types supported by the gaming management system 102. The predetermined contingent event types may be configured by the gaming management system 102 and/or a programmer thereof to comply with applicable regulations. Examples of predetermined contingent event types may include, for example, a slot machine event type, a generic event type, a poker event type, a blackjack event type, a keno event type, a roulette event type, a pay table event type, etc. The gaming management system 102 may receive the contingent event type 503 at 520.

At 504, the developer may provide a configuration 505 for the contingent event type indicated at 504. The gaming management system 102 may receive the configuration 505 at 522. The configuration 505 may define characteristics of the contingent event for resolving the contingent event and settling any wagers made on the contingent event. For example, a contingent event configuration may indicate the potential outcomes for the contingent event, a probability for each potential outcome, parameters for wagers on the contingent event, etc. In some example embodiments, the configuration 505 may indicate parameters that are to be passed to the gaming management system 102 to determine probabilities of some or all of the potential outcomes of the contingent event. Such parameters may include, for example, characteristics of the user within a game (skill points, experience points, weapons possessed, etc.). In some example embodiments, the predetermined contingent event types may be supported by a framework for receiving configuration characteristics. According to the framework, the gaming management system 102 may prompt the developer for specific configuration characteristics corresponding to each contingent event type. For example, upon selecting a slot machine configuration type, the developer may be prompted for a number of reels, positions for the symbols on each reel, likelihoods of each reel returning specific symbols, etc. Also, for example, upon selecting a poker configuration type, the developer may be prompted for a game variation (e.g., five-card-draw, Texas hold-em, etc.), an ante amount, etc. As indicated above, some applications may have multiple contingent event types. For such applications, 502, 504, 520, 522, as described above, may be repeated for each contingent event type to be utilized by the application.

Upon receiving contingent event configurations for each contingent event in the application, the gaming management system 102 may provide the developer with an API credential 507, which may be received at 506. The API credential 507 may be incorporated into the application and may be provided to the gaming management system 102 during game play to indicate that the application is eligible to provide contingent event requests to the gaming management system 102. For example, referring back to FIG. 3, the API credential 507 may be all or part of the application authentication 307 transferred to the gaming management system 102 at 306. In some example embodiments, the received event configurations may be analyzed and tested before the API credential 507 is provided to the developer. For example, the received event configurations may be analyzed to determine contingent event parameters, such as the return to player, the variance, the overall win percentage, etc. These calculated values may be compared to allowable values. The allowable values may correspond to contingent events that meet regulatory criteria of one or more gambling licenses (e.g., held by the party implementing the gaming management system 102) and/or by contingent event forms that have already been approved by applicable regulators and/or otherwise cleared for regulatory approval. Provided that the calculated values meet the allowable values, the API credential 507 may be provided to the developer.

At 526, the gaming management system 102 may determine allowable event configuration characteristics 509 and provide the allowable configuration characteristics 509 to the developer, which receives the same at 508. The allowable configuration characteristics 509 may express the limits of characteristics that the contingent event or events may have while still being in compliance with applicable regulations. For example, determining allowable configuration characteristics 509 may comprise calculating configuration characteristics corresponding to the limits indicated by applicable regulations and/or by contingent event forms already approved by applicable regulators. It will be appreciated that the developer may desire to change the characteristics indicates at 504 upon seeing the full range of allowable characteristics. Accordingly, the developer may provide contingent event characteristic changes 511 at 510. The changes may be received at 528. It will be appreciated that the various actions of the process flow 500 may be performed in any suitable order. For example, the actions 526, 508, 510 and 528 may, in some example embodiments, be performed before the API credential 507 is generated and provided at 524 and 506. Upon receiving the API credential 507, the developer may create the application. The application may be coded in any suitable language capable of generating messages according to the API 108 utilizing the received API credential. Example languages that may be used include Objective-C, Java and Javascript. As described above, the application may be configured to submit contingent event requests, such as 311, to the gaming management system 102 during game play, as described herein above with respect to FIG. 3.

Optionally, at 512, the developer may transfer house funds 513 to a developer account maintained by the gaming management system 102. The gaming management system 102 (e.g., the accounting layer 112 and/or the banking layer 114) may receive the funds at 530 and transfer the funds to the developer's developer account. For example, the developer account may be held by a financial institution and controlled by the gaming management system 102 (e.g., the banking layer 114 thereof) via the payment gateway 107. A minimum quantity of house funds 513 may be determined by the gaming management system 102, for example, based on the characteristics of the one or more contingent event types to be included with the system. In some example embodiments, the developer may not provide house funds. Instead, the facilitating entity may provide house funds for wagers. In return for providing the house funds itself, the facilitating entity may lower its compensation to the developer. The compensation may take the form of a percentage of the house edge for each wager. For example, when house funds are provided by the facilitating entity, the developer may receive a lower percentage of the house edge than when the developer provides the house funds itself.

Optionally, at 514, the developer may provide identities for one or more test users 515 to the gaming management system 102. The test users may be users associated with the developer that may be authorized by the gaming management system 102 to place wagers on contingent events prior to approval of the application. For example, the test users may be users associated with the developer. In some example embodiments, test users may be limited to wagering with funds of the developer (e.g., funds in a developer account). Upon receiving the identities of the test users at 532, the gaming management system 102 may configure itself to receive wagers on contingent events associated with the application from the test users.

At 516, the developer may request that the application be submitted for approval. For example, the developer may provide the gaming management system 102 with a copy of the application. Upon receiving the request, and/or upon completion of the configuration process, the gaming management system 102 may submit the application for approval at 534. Review and approval may be provided automatically and/or manually. For example, in some example embodiments a set of predetermined business rules are applied against the contingent event or events and its/their characteristics to determine if the contingent event complies with applicable regulations and/or a previously-cleared contingent event form. Also, in some example embodiments, a battery of simulated wagers is made to test the response of the contingent events in the application according to their characteristics. Manual review and approval may comprise review of the application, its contingent event or events and associated characteristics by appropriate legal and/or compliance personnel of the facilitating entity.

Optionally, and upon approval, the gaming management system 102 may publish the application at 536. Publishing the application may comprise placing an indication of the application and, in some example embodiments, a download link at a web page of the facilitating entity. For example, the web page may be accessible to users who have preexisting accounts with the gaming management system 102. In this way, the gaming management system 102 may provide additional advertising for the application.

Figure 11:
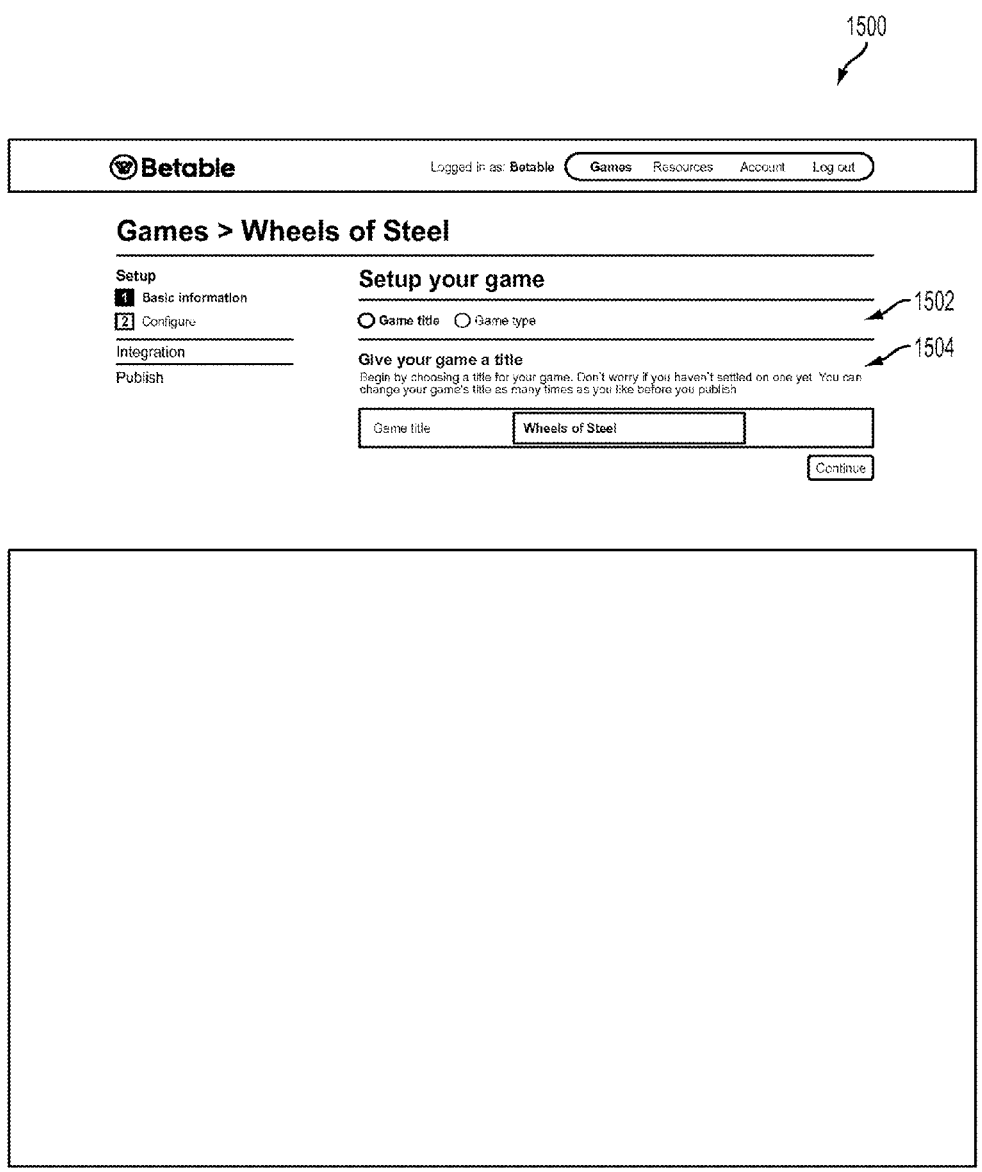
FIG. 11 is a screen shot showing one embodiment of an interface screen that may be provided to a developer to receive a name of an application or game for configuration and approval.
Figure 12:
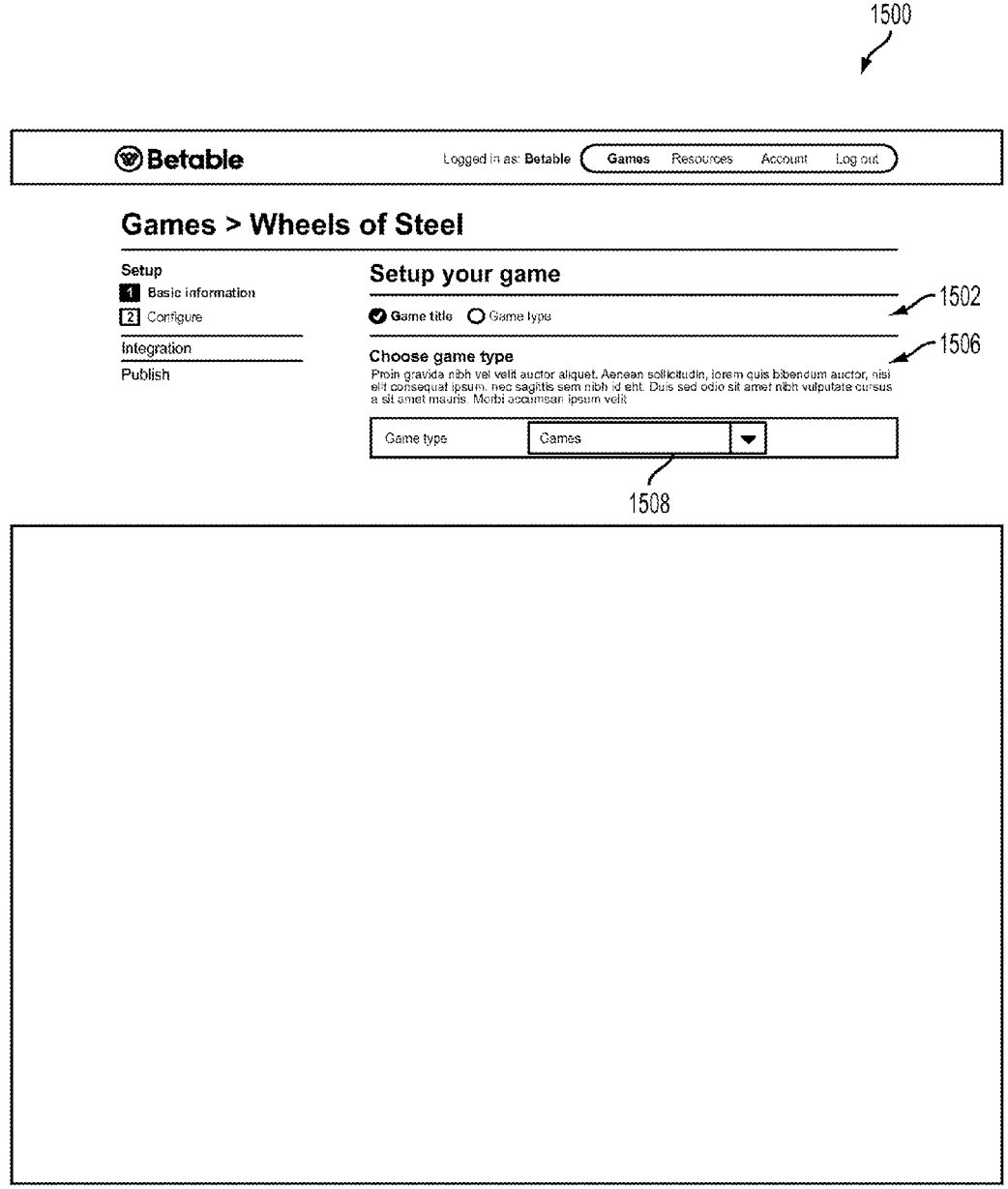
FIG. 12 is a screen shot showing one embodiment of the interface screen of FIG. 11 that may be provided to a developer to receive a game or contingent event type.

FIGS. 11-39 are screen shots illustrating various example embodiments of an interface that may be provided by the gaming management system 102 to a developer for configuring and approving an application including contingent events. FIG. 11 is a screen shot showing one embodiment of an interface screen 1500 that may be provided to a developer to receive a name of an application or game for configuration and approval. The screen 1500 comprises a field 1502 from which the developer may select whether to provide a game or application name or a game or contingent event type. In FIG. 11, the Game title option is selected. Accordingly, screen 1500 also comprises a game title field 1504 into which the developer may enter a title for the game or application being configured. FIG. 12 is a screen shot showing one embodiment of the interface screen 1500 that may be provided to a developer to receive a game or contingent event type. In FIG. 12, the game type option is selected from field 1502. Accordingly, a game type field 1506 is displayed. The game type field 1506 may comprise a drop-down menu 1508 or other suitable selection mechanism for allowing the developer to select a game or contingent event type. It will be appreciated that, in some example embodiments, the application comprises a single type of contingent event, rendering the contingent event type indicated at 1506 to be an application or game contingent event type. In FIGS. 12 and 13 the selected contingent event type is "slot machine." Additional screens demonstrating contingent event types "keno," "roulette" and "pay table" are provided below with respect to FIGS. 28-33.

As described above, each contingent event type indicated at field 1506 and/or drop down menu 1508 may be associated with a configuration framework. For example, FIG. 13 is a screen shot showing one embodiment of the interface screen 1500 that may be provided to the developer to describe the selected contingent event type. As shown in FIG. 13, the screen 1500 comprises a contingent event type field 1510 including information for the developer about the selected contingent event type including, for example, a description of the configuration necessary for the selected contingent event.

Figure 14:
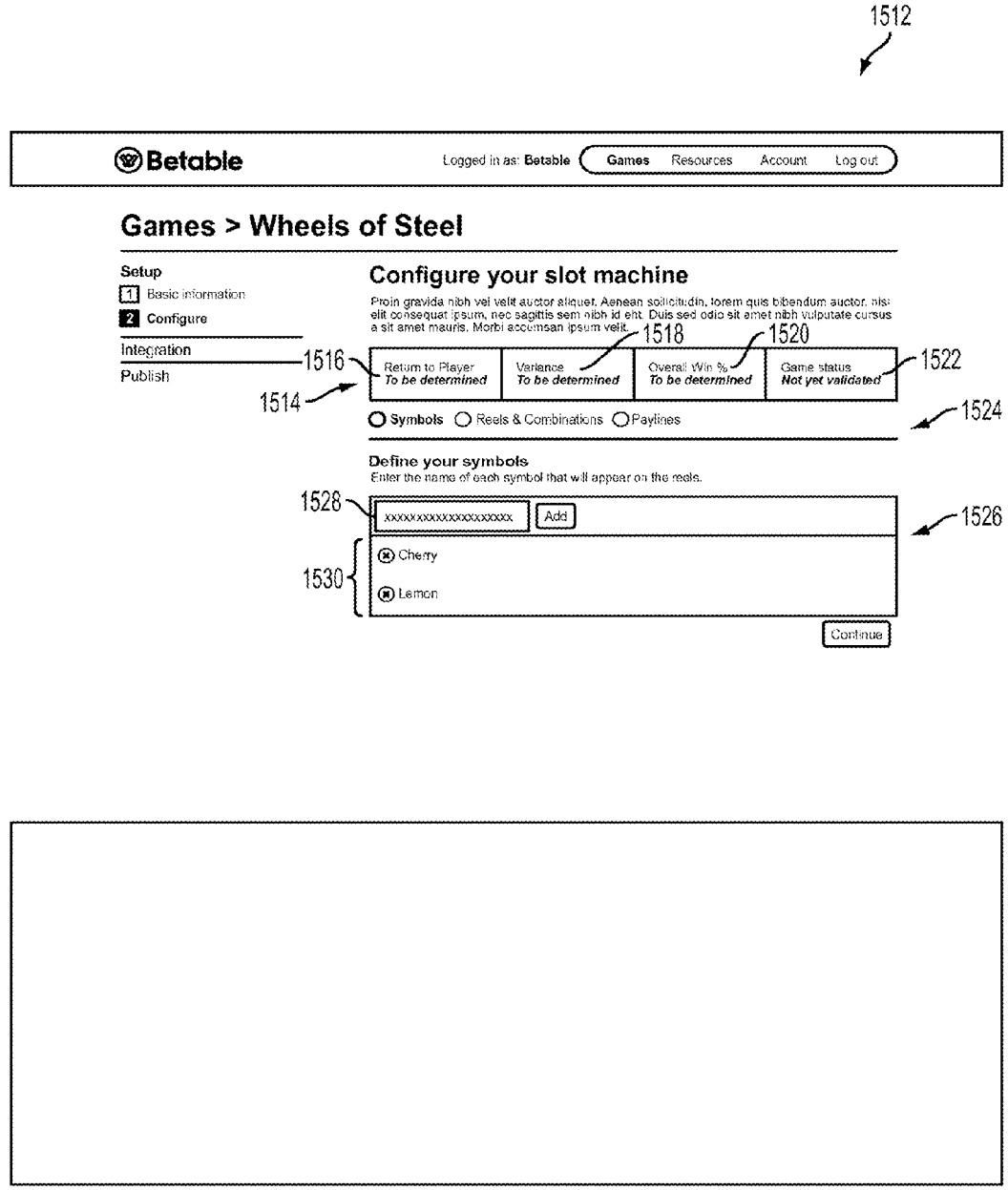
FIG. 14 is a screen shot showing one embodiment of an interface screen that may be provided to a developer to receive contingent event configuration characteristics according to a framework for "slot machine" type contingent events.

FIG. 14 is a screen shot showing one embodiment of an interface screen 1512 that may be provided to a developer to receive contingent event configuration characteristics according to a framework for "slot machine" type contingent events. The screen 1512, as illustrated, comprises a statistics field 1514 describing statistics of the contingent event being configured. A field 1516 indicates a return to player (RTP) for the contingent event. A field 1518 indicates a variance of the contingent event. A field 1520 indicates the overall win percentage of the contingent event (e.g., the overall percentage of time that the user wins anything). A field 1522 indicates a game or application status (e.g., a status of the application in the configuration and approval process). A field 1524 indicates categories of configuration parameters available for a "slot machine" type contingent event type. An indication for "Symbols" is selected. Accordingly, a field 1526 may comprise prompts for receiving from the developer configuration characteristics defining the symbols to be placed on the slot machine reels. A field 1528 may allow the developer to enter a name of a symbol. Field 1530 shows symbols that have already been added.

Figure 15:
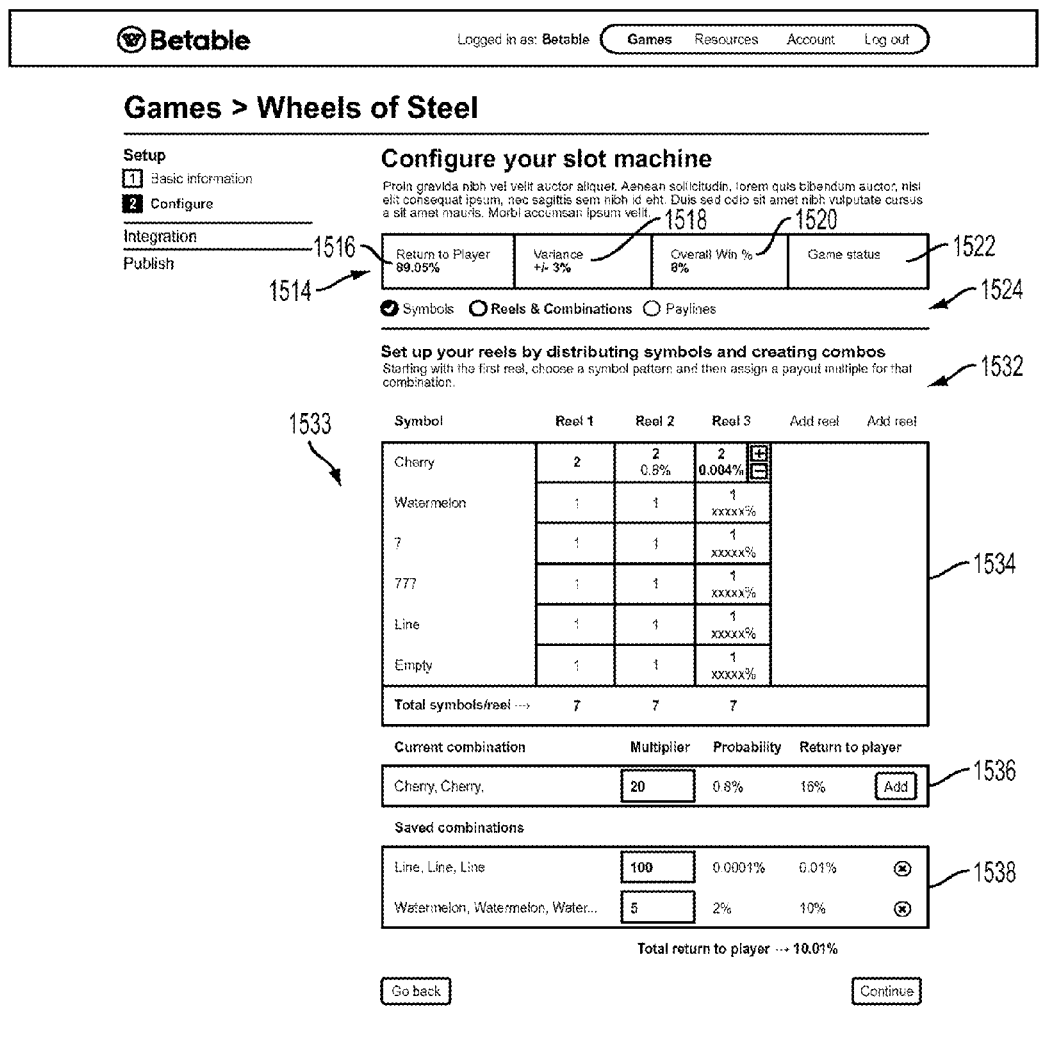
FIG. 15 is a screen shot showing one embodiment of the interface screen of FIG. 14 that may be provided to a developer to receive additional contingent event configuration characteristics.
Figure 16:
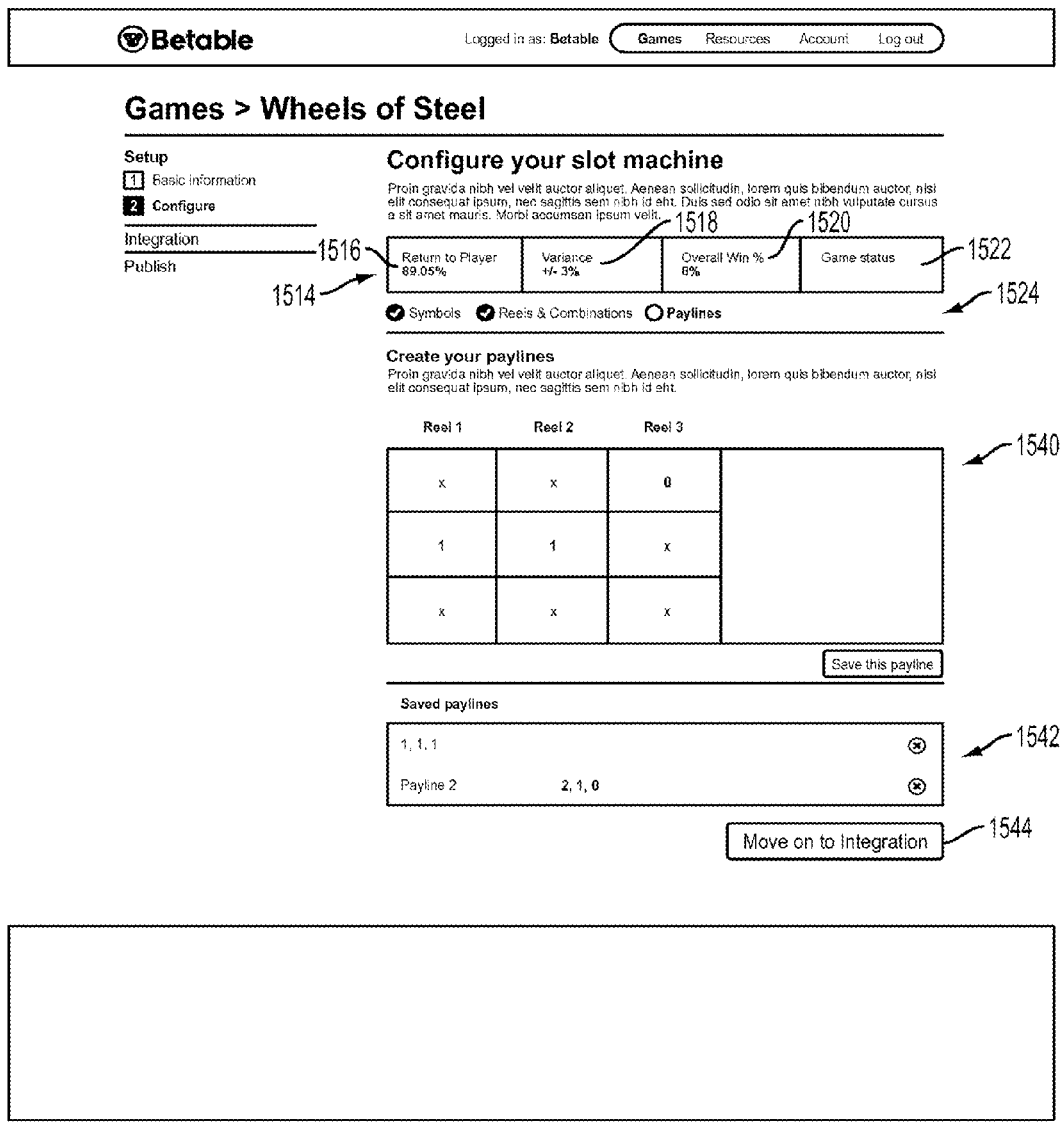
FIG. 16 is a screen shot showing one embodiment of the interface screen of FIG. 14 that may be provided to a developer to receive additional contingent event configuration characteristics.

FIG. 15 is a screen shot showing one embodiment of the interface screen 1512 that may be provided to a developer to receive additional contingent event configuration characteristics. For example, the value "Reels & Combinations" may be selected from field 1524. "Reels & Combinations" may be a second category of configuration parameters available for the "slot machine" type contingent event. A field 1533 may receive from the developer values for the "Reels & Combinations." For example, at 1534, the developer may enter a number of reels to be included in the slot machine. Also at 1534 the developer may enter, for each symbol entered at 1526, a number of times that the symbol appears on each reel. As shown, 1534 also indicates for each symbol and reel a probability that the symbol will be returned by the reel after a spin. For example, the probability may be determined by the total number of symbols on the reel. At a field 1536, the developer may enter a combination of symbols across one or more of the reels (e.g., at a payline). The gaming management system 102 may also provide at 1536 a probability that the entered combination will occur. In some example embodiments, the developer may also enter at 1536 a winning multiplier. The winning multiplier may represent a multiple of the user's wager that may be "won" by the user upon occurrence of the selected combination. A field 1538 may indicate combinations that have been completed, as well as a total return to the player across all combinations. As illustrated in FIG. 16, the field 1514 may update as contingent event configuration parameters are entered. For example, with the contingent event configuration parameters shown in FIG. 15, the return to player is 89.05%, the variance is +/−3% and the overall win percentage is 8%.

Figure 15A:
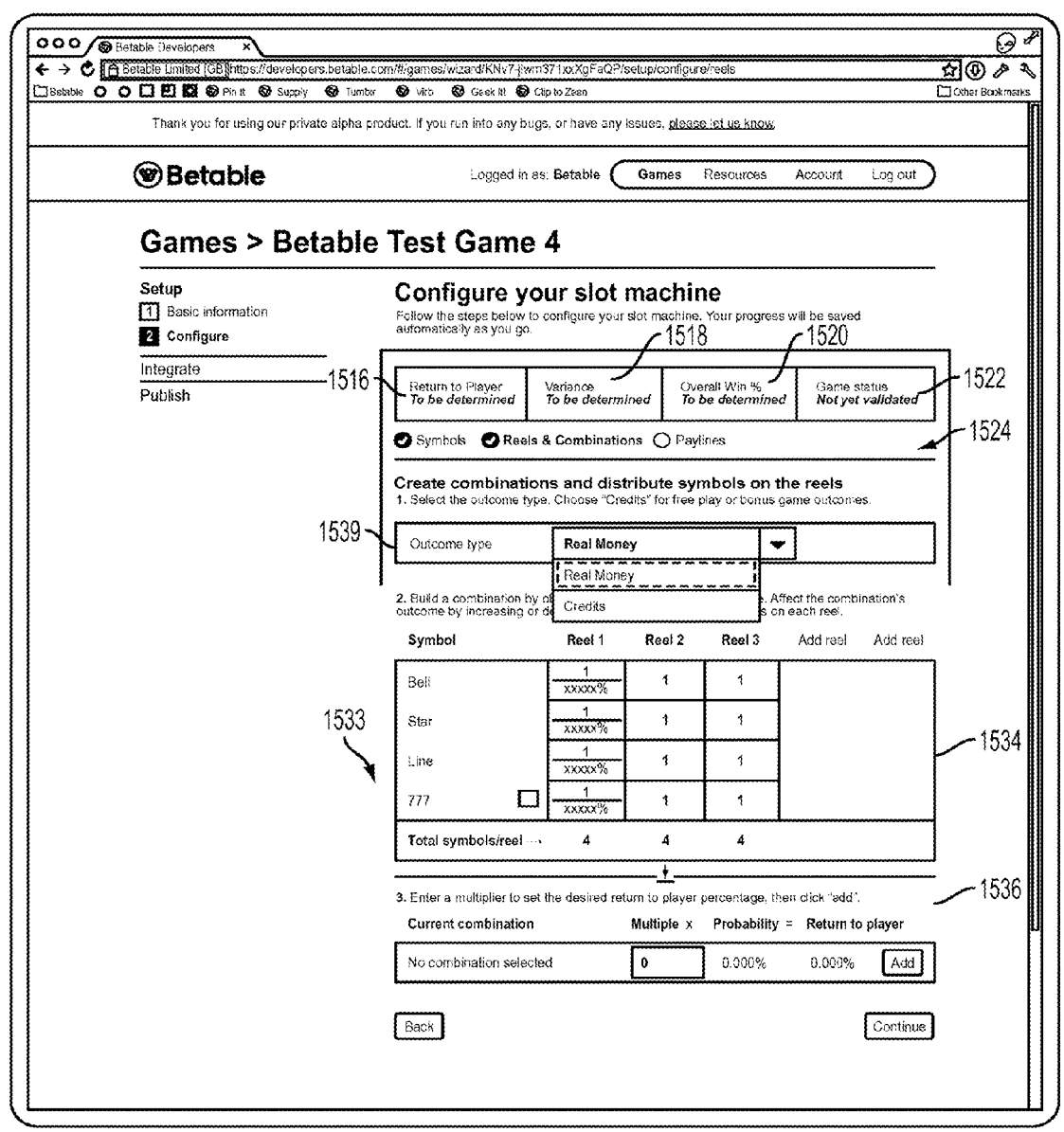
FIG. 15A is a screen shot showing one embodiment of the interface screen of FIG. 15 including an outcome type field.

FIG. 15A is a screen shot showing one embodiment of the interface screen 1512 of FIG. 15A including an outcome type field 1539. The developer may enter at the outcome type field 1539 an indication of what the user will win upon winning a wager based on the contingent event. In some embodiments, the developer chooses between a "real money" outcome and a "credit" outcome. According to a "real money" outcome, the user may wager for and win real money, for example, in amounts otherwise entered by the developer via the interface. According to a "credit" outcome, the user may wager for and win "credits" or virtual currency. The virtual currency may simply be a measure of the user's performance in the game or, in some embodiments, may be used for real or virtual goods such as, for example, additional game play, virtual items within a game, purchasing pre-selected merchandise, etc.

FIG. 16 is a screen shot showing one embodiment of the interface screen 1512 that may be provided to a developer to receive additional contingent event configuration characteristics. In FIG. 16, "Paylines" is selected from field 1524, indicating a third category of configuration parameters available for the "slot machine" type contingent event. A field 1540 allows the developer to enter different pay lines for the contingent event where paylines correspond to lines indicating potential winning combinations of symbols. Field 1542 indicates paylines that have already been entered. FIGS. 11-16 demonstrate the configuration of one contingent event. It will be appreciated that the screens of 11-16 may be provided again to configure additional contingent events for applications that are programmed to utilize multiple contingent events.

Figure 17:
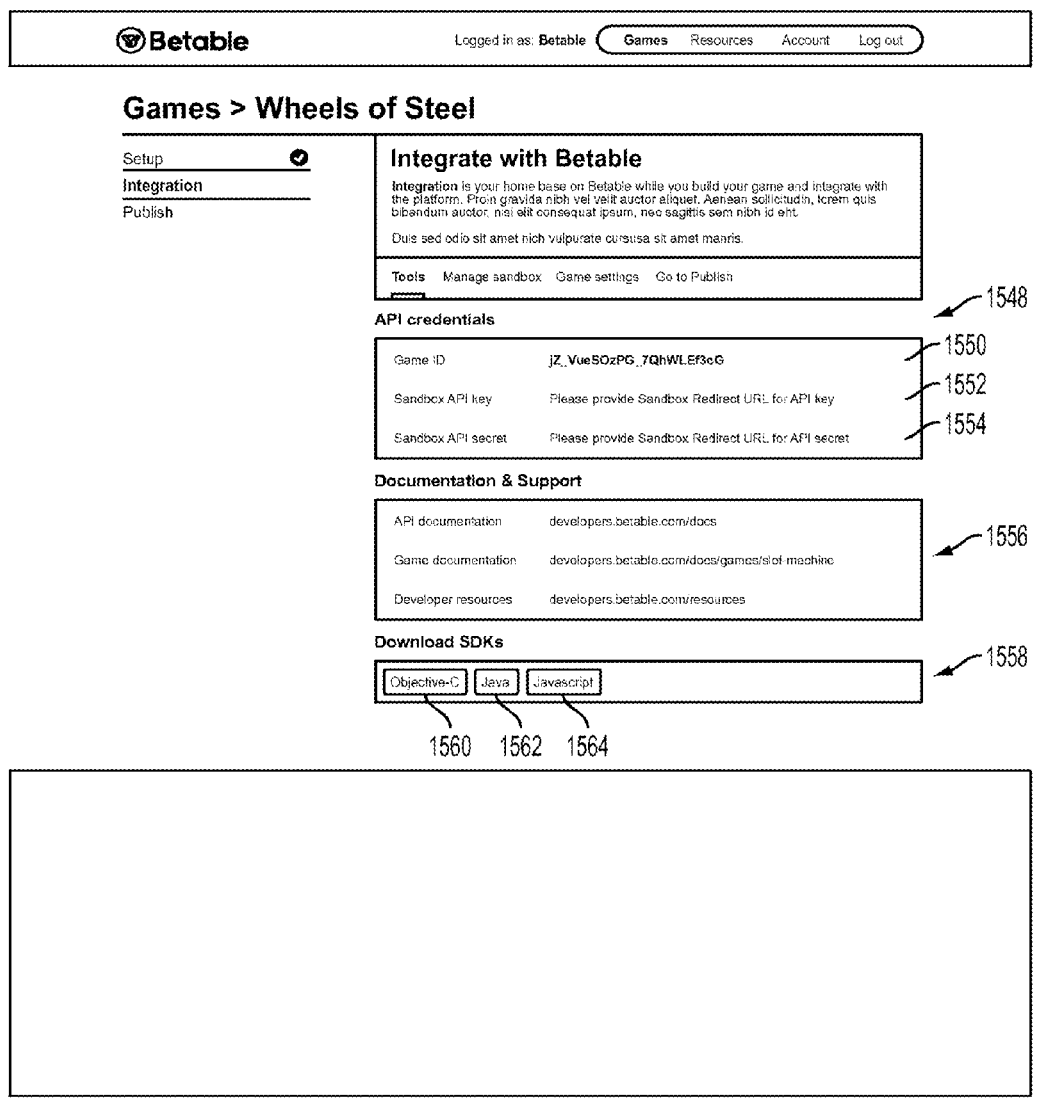
FIG. 17 is a screen shot showing one embodiment of an interface screen that may be provided to a developer to provide the developer with API credentials, documentation and other information for coding the application.

FIG. 17 is a screen shot showing one embodiment of an interface screen 1546 that may be provided to a developer to provide the developer with API credentials, documentation and other information for coding the application. For example, the interface screen 1546 may be provided to the developer to implement action 524 of the process flow 500, as described herein above. The screen 1546 may comprise an API credential field 1548. The field 1548 comprises a game ID sub-field 1550 that may comprise a unique key or other identifier of the game or other application being configured. The game ID may be part of the API credentials 507 and may be provided by the application to the gaming management system 102, for example as all or part of the application authentication 307 described herein above with respect to the process flow 300. An API key and API secret may be provided at sub-fields 1552 and 1554, respectively. In some example embodiments, and as indicated in FIG. 17, the developer may be prompted to provide a redirect Universal Resource Indicator (URI) before receiving the API key and API secret. In some example embodiments, the API key and API secret may also be part of the API credentials 507 and application authentication 307 described above.

The screen 1546 also comprises additional resources that are optionally provided to the developers. For example, API Documentation & Support field 1556 includes links to documentation describing the API 108, the selected contingent event type or types and general developer resources. A Download SDK's field 1558 may provide the developer with links 1560, 1562, 1564 to software development kits including tools for developing applications compatible with the API 108. In the example shown in FIG. 17, SDK's are available for Objective-C, Java and Javascript. It will be appreciated, however, that more, fewer and/or different languages may be supported depending on the embodiment.

FIG. 18 is a screen shot showing one embodiment of an interface screen 1566 that may be provided to the developer to provide the developer with test environment API credentials, receive house funds from the developer, and/or provide test users. In various embodiments, the screen 1566 may be utilized to set-up a sandbox or development environment for testing the eventual application. The screen 1566 comprises a field 1568 indicating a sandbox or development environment redirect URI. The redirect URI may be a URI to which the application directs contingent event requests 311 and communications between the gaming management system 102 and user that are facilitated via the application. In various embodiments, the sandbox or development environment redirect URI is utilized in a non-production development environment. As described above, the developer, in some example embodiments, may also utilize the redirect URI to obtain aspects of the API credentials 507, as described above. An Add funds field 1570 may allow the developer to add funds to the development environment. An amount may be selected at field 1570. Funds may be added by selecting the Add funds button 1571. It will be appreciated that selecting the Add funds button 1571 may launch suitable additional screens for receiving payment information from the developer. Funds received via the field 1570 may be used for any suitable purpose. For example, the funds may be used as a house fund for development purposes and/or as player funds for test users. A test user field 1572 may allow the developer to invite test users to play the application in a development environment. E-mail addresses for the test users may be entered at 1572. The Send invite button 1573 may be selected to send an invitation to the entered user. The field 1572 as shown also indicates previously invited users as well as the users' statuses (e.g., active or inactive). The developer may also have the option to re-invite an inactive test user. With the API credentials provided at 1548 and 1568, the application may be tested with the indicated test users prior to approval and optional publication.

FIG. 19 is a screen shot showing one embodiment of an interface screen 1574 that may be provided to the developer to provide the developer with production environment API credentials and allowable contingent event characteristics and receive from the developer changes to the contingent event characteristics. A production redirect URI 1576 may provide a redirect URI to be used by the application in the production environment. A Game setup details field 1578, as illustrated, provides contingent event configuration characteristics that are selected, as well as an allowable range for characteristics. For example, the field 1578 indicates the return to player, variance and overall win percentage resulting from the contingent event configuration entered via screens 1500 and 1512. Field 1578 also shows a maximum allowable wager and minimum operating funds. These values may be determined based on the entered contingent event characteristics and relevant regulations. A geographic availability field 1580 indicates jurisdictions that are not legally eligible to make real-money wagers on the contingent event. The jurisdictions listed at field 1580 may include jurisdictions that do not permit on-line gambling, jurisdictions having regulations inconsistent with the contingent event or its configuration, etc. A field 1582 may allow the developer to provide additional excluded jurisdictions. Additional jurisdictions to be excluded may be entered at field 1582 and added to the set of excluded jurisdictions by selecting button 1584. The additional jurisdictions may be selected by the developer for legal and/or business purposes.

Figure 20:
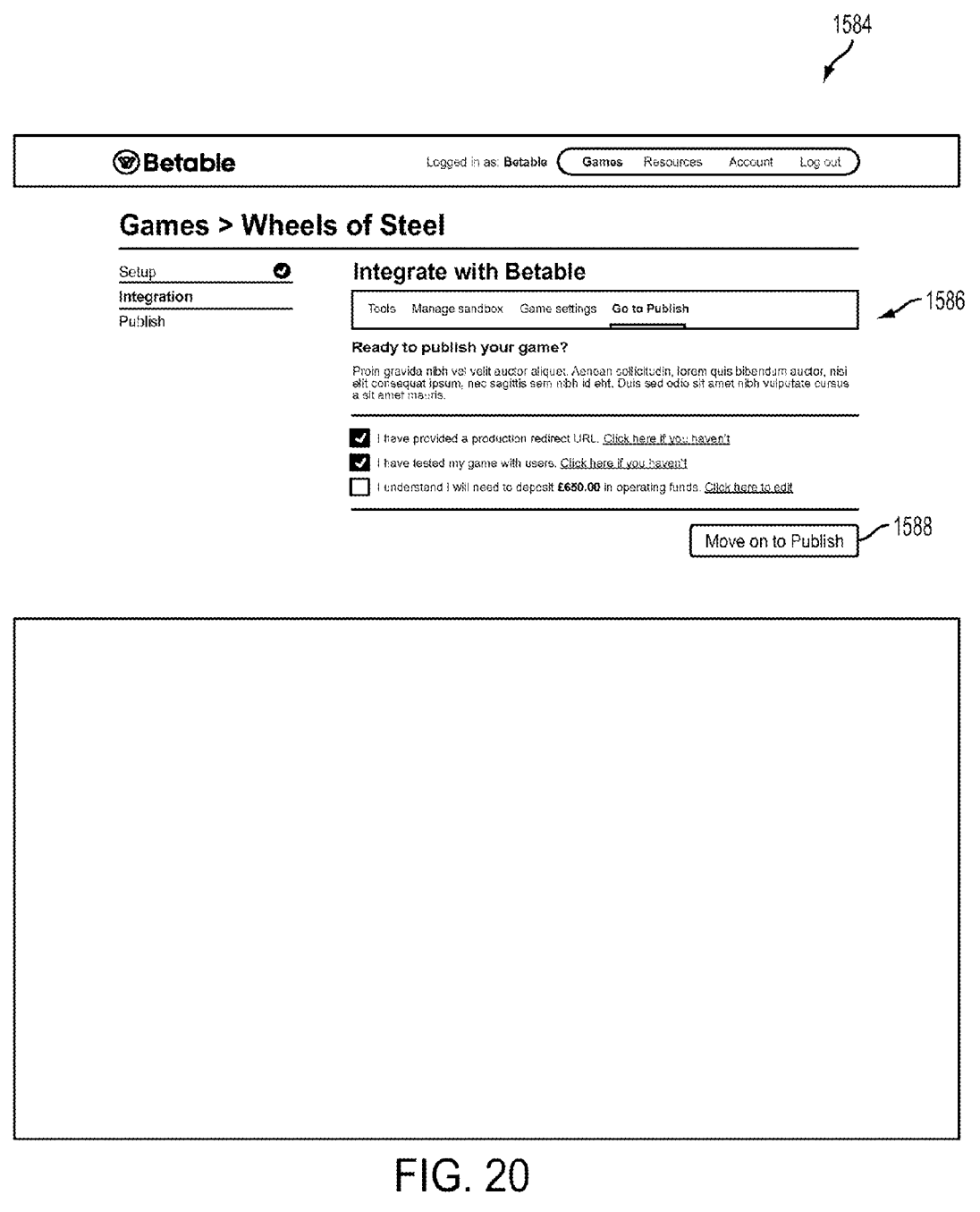

FIG. 20 is a screen shot showing one embodiment of an interface screen 1584 that may be provided to the developer to confirm that appropriate steps have been taken to integrate the developer's application with the gaming management system 102. The screen 1584 comprises a status field 1586 noting steps that must be taken by the developer to complete integration of the application with the gaming management system 102. For example, the field 1584 may require that the developer confirm that (i) the developer has provided and/or received a production redirect URI. (see field 1576 of screen 1574); (ii) the developer has tested the application with test users (see screen 1566); and (iii) that the developer has deposited adequate operating funds (e.g., to cover house funds for the contingent events in the application). Provided that all three steps are completed, the developer may select the "Move on to Publish" button 1588.

Figure 21:
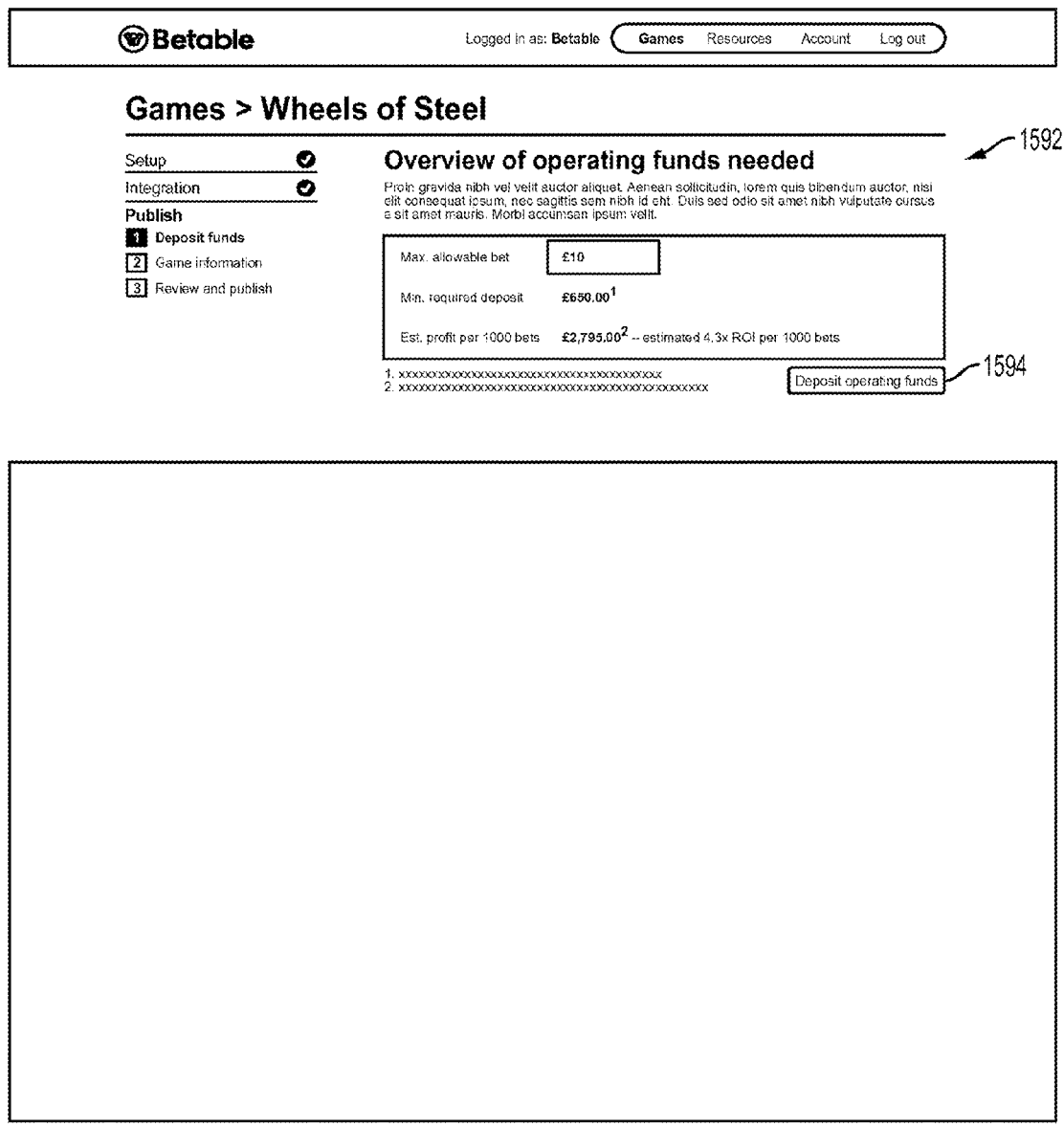
FIG. 21 is a screen shot showing one embodiment of an interface screen that may be provided to the developer to provide an overview of operating funds (e.g., "house funds") required to run the application.

FIG. 21 is a screen shot showing one embodiment of an interface screen 1590 that may be provided to the developer to provide an overview of operating funds (e.g., "house funds") required to run the application. An operating funds field 1592 may receive a maximum allowable bet or wager. In some example embodiments, the maximum allowable bet or wager may be limited by relevant regulations. Based on the maximum allowable bet, the gaming management system 102 may determine a minimum required deposit or minimum level of house funds. The minimum required deposit may be determined based on applicable regulations and/or the policies of the facilitating entity. In embodiments where some or all of the house funds are provided by the facilitating entity, the minimum required deposit may be less than the minimum house fund amount required by regulation and/or zero (e.g., if the facilitating entity is providing all house funds). In some example embodiments, the operating funds field 1592 also provides an estimated profit per 1000 wagers or bets. If additional operating funds are needed, the developer 1594 may select Deposit operating funds 1594 to launch a screen 1596.

Figure 22:
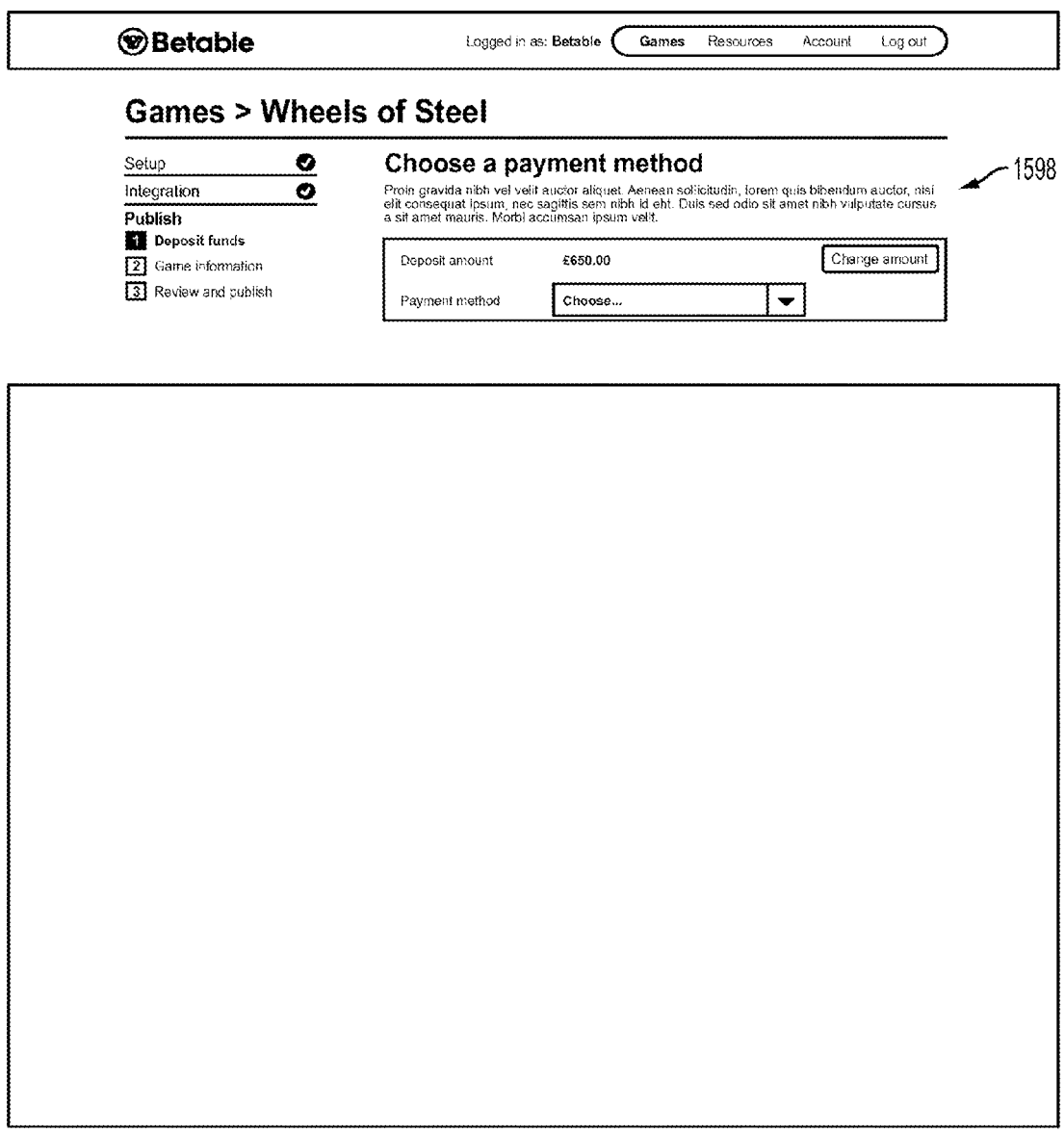
FIG. 22 is a screen shot showing one embodiment of an interface screen that may be provided to the developer to receive operating funds.
Figure 23:
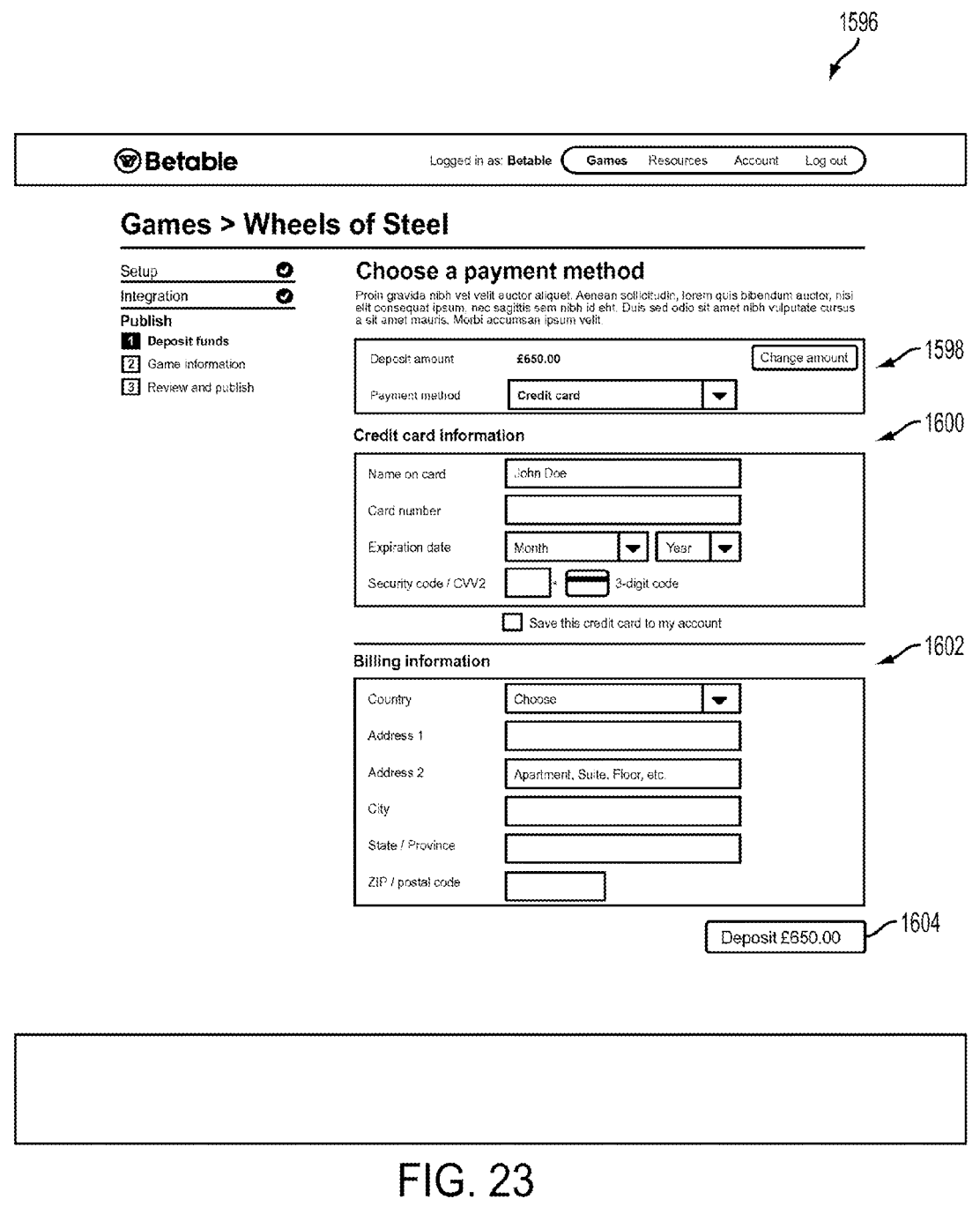
Figure 24:
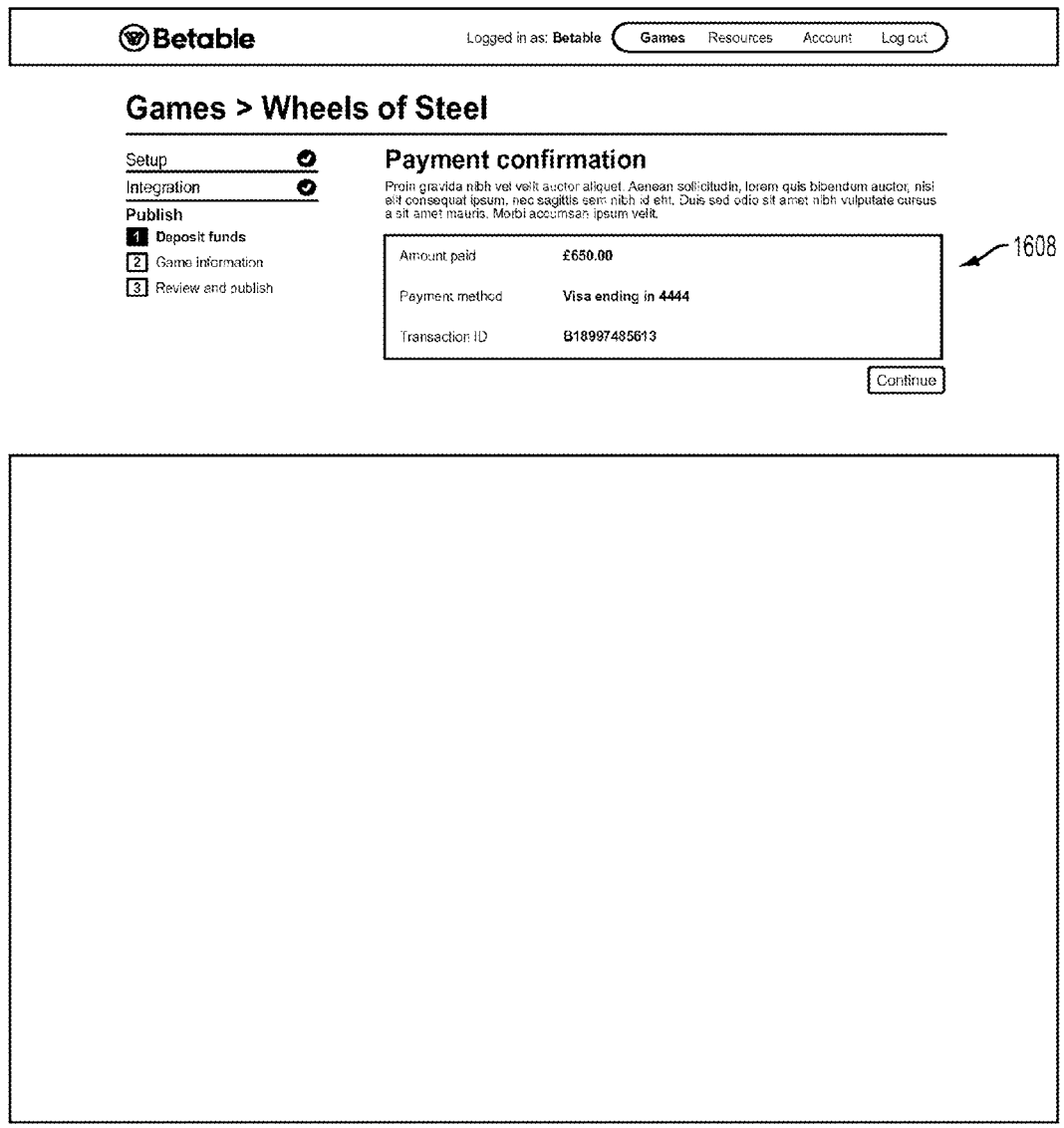
FIG. 24 is a screen shot showing one embodiment of an interface screen showing payment confirmation information for the developer.

FIG. 22 is a screen shot showing one embodiment of the interface screen 1596 that may be provided to the developer to receive operating funds. The screen 1596 includes Choose payment method field 1598 into which the developer may provide a deposit amount and select a payment method. FIG. 23 is a screen shot showing one embodiment of the interface screen 1596 including additional developer payment information fields. For example, when the developer selects a payment method of "credit card" at field 1598, field 1600 may receive from the developer information describing the selected credit card. Field 1602 may receive billing information associated with the credit card. FIG. 24 is a screen shot showing one embodiment of an interface screen 1606 showing payment confirmation information for the developer. The field 1608 comprises a Payment confirmation field confirming to the developer an amount paid, a payment method and a transaction identifier or ID. It will be appreciated that operating funds may be received from the developer according to any other suitable method as well. For example, the developer may provide operating funds by direct deposit from an account with a financial institution, by money order, by wire transfer, etc.

Figure 25:
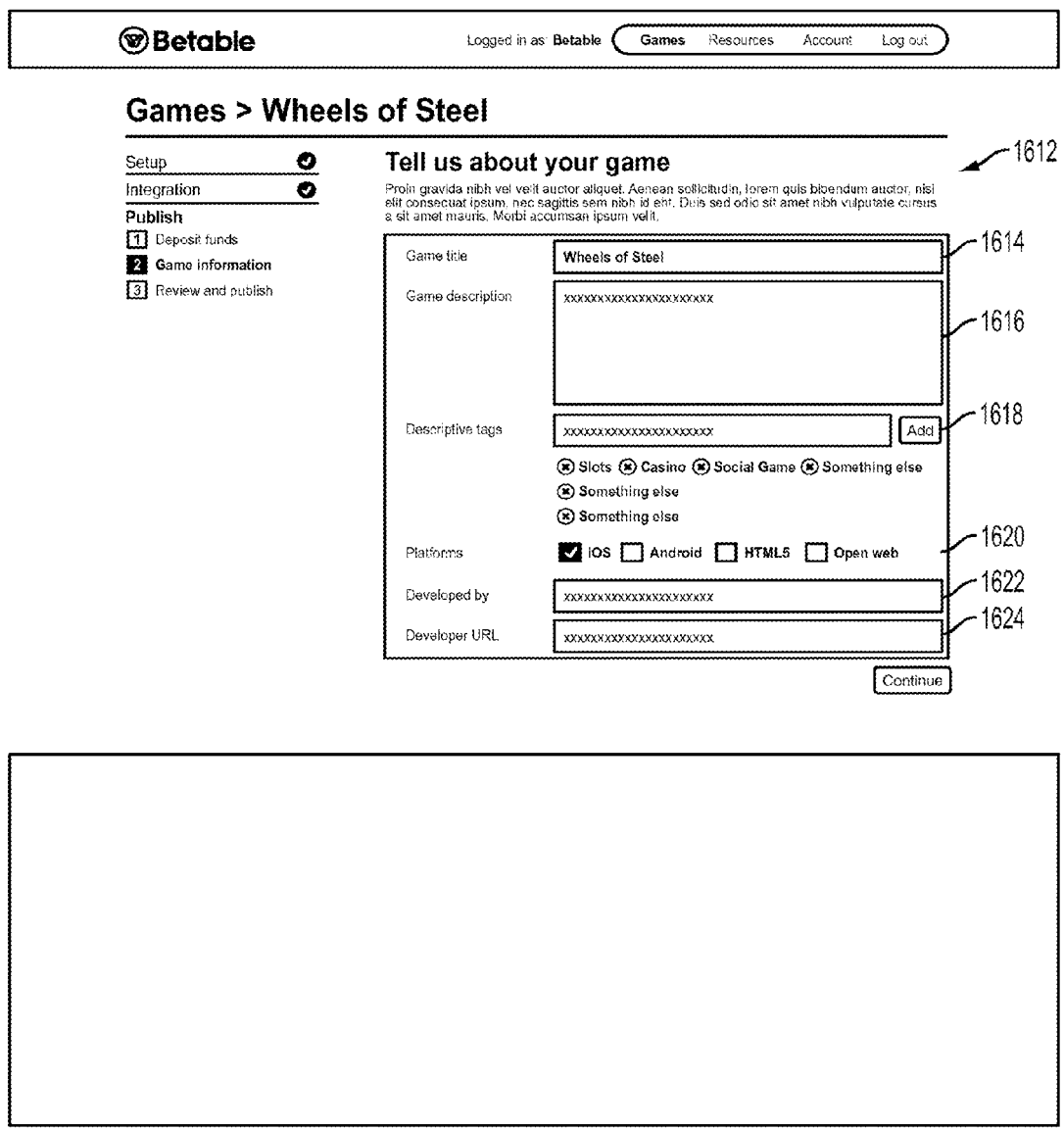
FIG. 25 is a screen shot showing one embodiment of an interface screen that may be provided to a developer to receive from the developer information describing the application.

FIG. 25 is a screen shot showing one embodiment of an interface screen 1610 that may be provided to a developer to receive from the developer information describing the application. For example, application information received through the screen 1610 may be utilized by the gaming management system 102 to describe the application for publication (e.g., 536 of the process flow 500). Screen 1610 includes an information field 1612. A title sub-field 1614 receives a title of the application. In some example embodiments, the title is pre-populated based on information previously received from the developer. A description field 1616 may provide a text field for the developer to provide text describing the application. A descriptive tags field 1618 may allow the developer to provide text tags that describe the application. The field 1618 also lists tags that have already been selected. The descriptive tags may be used, for example, to facilitate key words searches for the application. A platform(s) field 1620 may allow the developer to provide an indication of platforms with which the application is compatible. It will be appreciated that the gaming management system 102 may be compatible with applications developed for any suitable platform. The example platforms indicated at field 1620 include IOS from APPLE, INC., ANDROID from GOOGLE, INC., HTML5 and Open Web. A developer name field 1622 may receive a name of the developer. A developer universal resource locator (URL) field 1624 may receive a URL of a website of the developer.

Figure 26:
FIG. 26 is a screen shot showing one embodiment of an interface screen that may be provided to a developer to confirm information describing the application and request approval and publication of the application.
Figure 27:
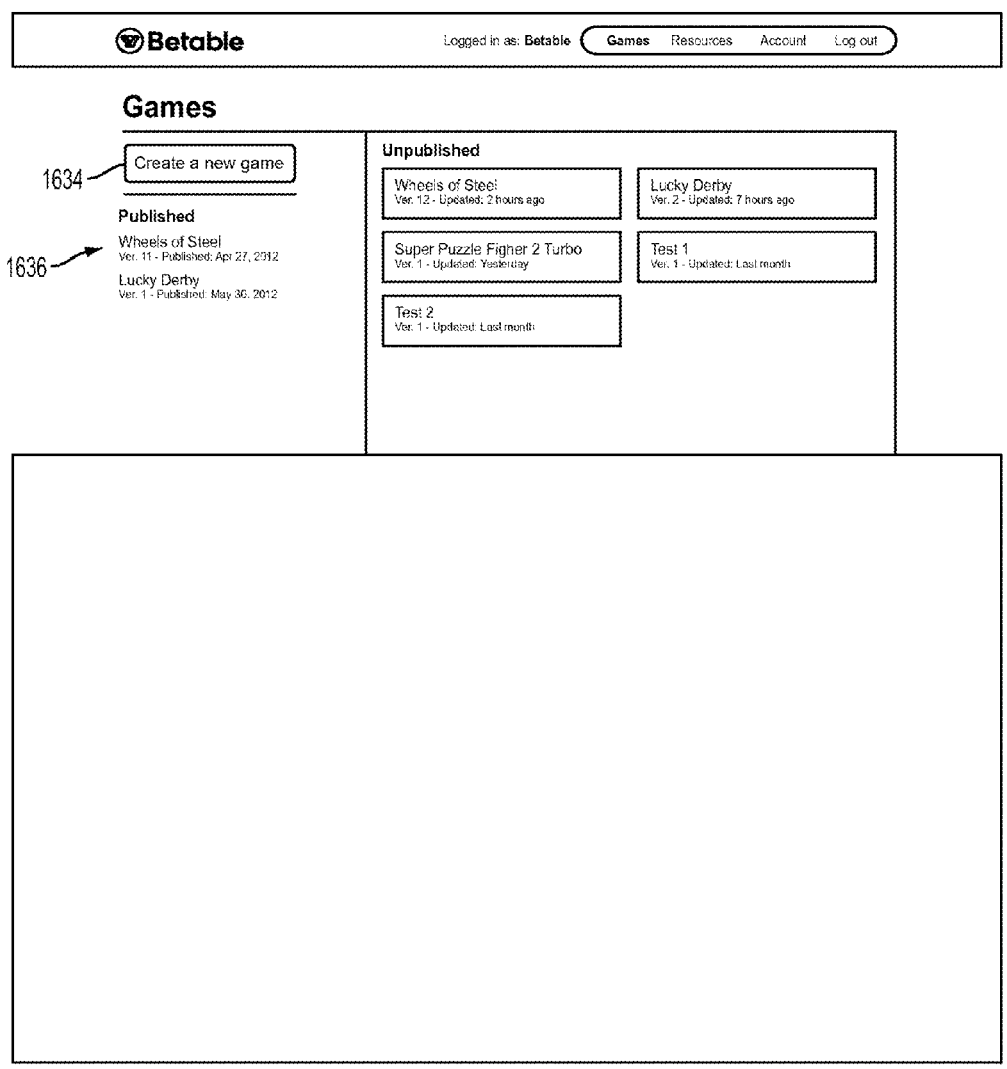
FIG. 27 is a screen shot showing one embodiment of an interface screen that may be provided to the developer to indicate approval and publication of the application.

FIG. 26 is a screen shot showing one embodiment of an interface screen 1626 that may be provided to a developer to confirm information describing the application and request approval and publication of the application. A game information field 1628 may identify the application information provided via screen 1610. Upon verifying the accuracy of the information at the field 1628, the developer may submit the application for approval (e.g., 516 of the process flow 500) by selecting the button 1630. Upon selection of the button 1630, the gaming management system 102 may review the application for approval, for example, as described herein with respect to 534 of the process flow 500. Provided that the application is approved, it may be published, for example, as described herein with respect to 536 of the process flow 500. FIG. 27 is a screen shot showing one embodiment of an interface screen 1632 that may be provided to the developer to indicate approval and publication of the application. The screen 1632 includes a Published field 1636 indicating that the application described in FIGS. 11-26 (e.g., "Wheels of Steel") is approved and published. Upon approval, instances of the application executed by and/or on behalf of users may communicate with the gaming management system 102, for example, as described above with respect to FIGS. 2 and 3. A Create a new game button 1634 may return the developer to the screen 1500, restarting the process of application and contingent event configuration.

Figure 28:
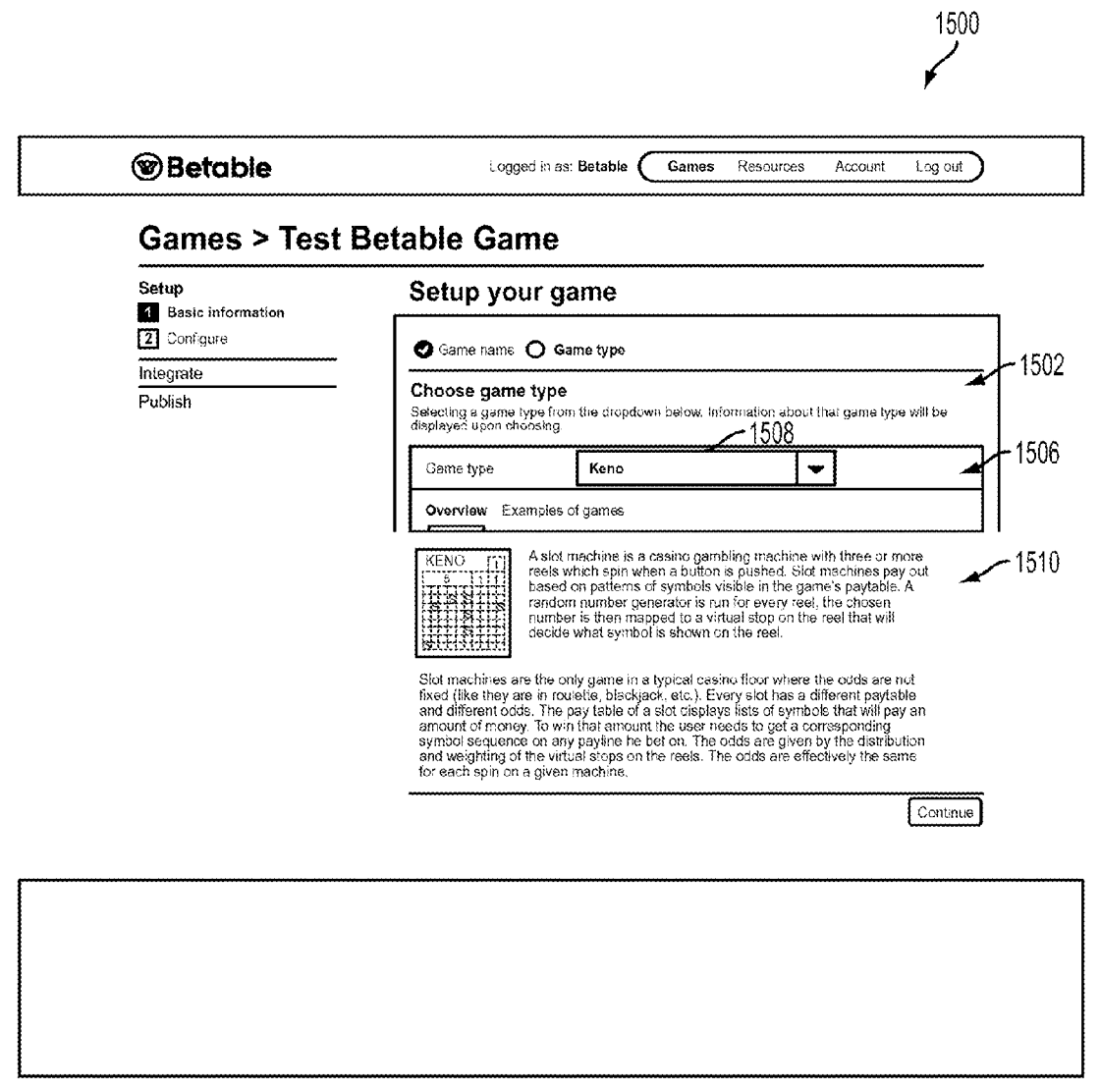
Figure 29:
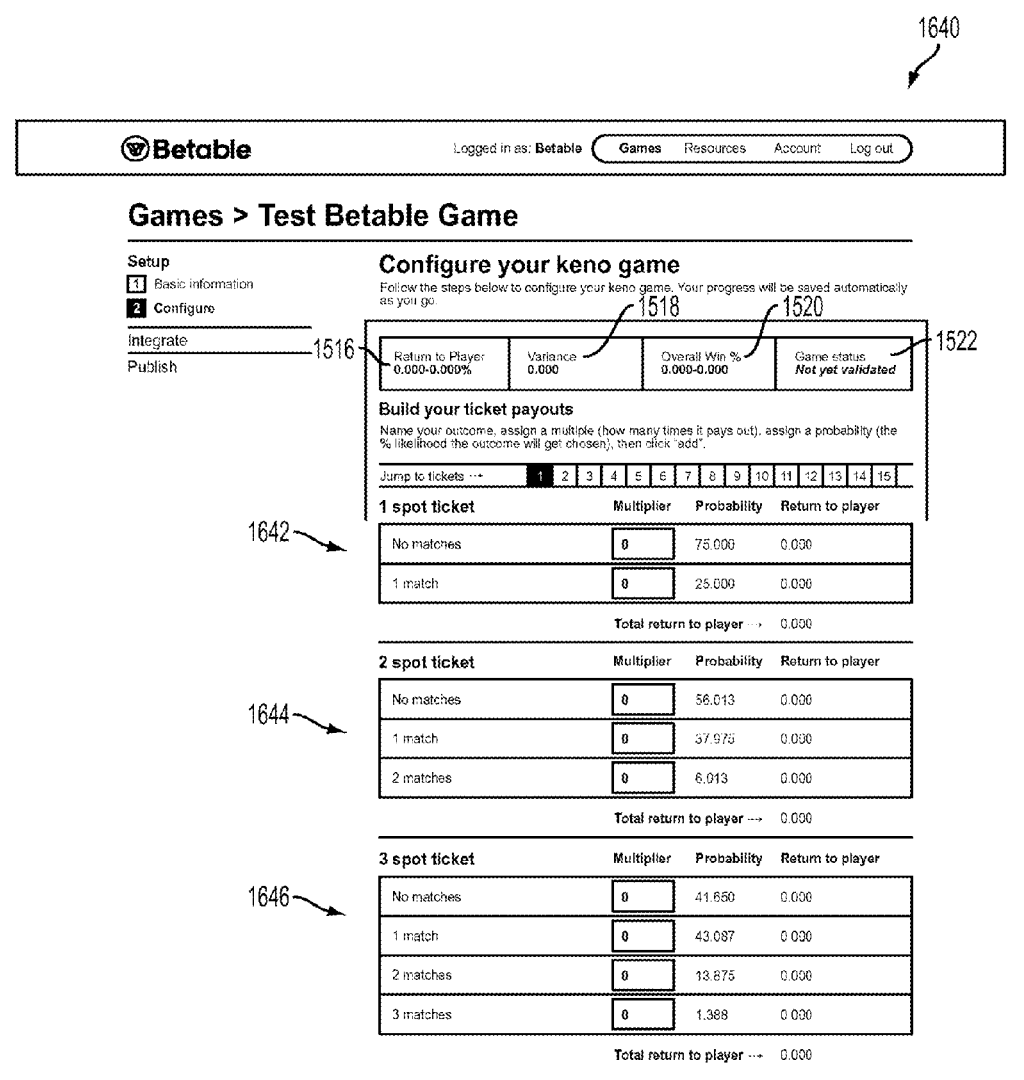

FIGS. 28-33 are screen shots illustrating various additional example event types and screens through which a developer can enter information about the other additional events types. For example, FIG. 28 is a screen shot showing one embodiment of the interface screen 1500 of FIG. 13 with the "keno" event type selected at field 1508. The contingent event type field 1510 is shown to include a description of a "keno" type event including a description of contingent events that may be created from the "keno" type event. FIG. 29 is a screen shot showing one embodiment of an interface screen 1640 that may be provided to a developer to receive contingent event configuration characteristics according to a framework for "keno" type contingent events. According to a "keno" type contingent event, the random number generator 110 may generate a predetermined number of random numbers according to a certain range. The user may select and/or be provided with a set of numbers within the range. In some embodiments, the user's set of numbers may be represented as a card or ticket. If one or more of the random numbers matches one or more of the numbers on a user's card or ticket, the user wins the wager, with the amount of the win depending on the number of matches. In some embodiments, multiple users may wager on a "keno" type contingent event together in a manner similar to that of a bingo game.

Referring back to the screen 1640, the developer may specify different ticket types. For example, field 1642 illustrates a configuration for a one-spot ticket comprising a single number. At field 1642, the developer may enter a probability of each potential outcome for a one-spot ticket (e.g., no matches or one match). At field 1644, the developer may enter a probability for each potential outcome on a two-spot ticket (e.g., no matches, one match, two matches). At field 1646, the developer may enter a probability of each potential outcome on a three-spot ticket (e.g., no matches, one match, two matches, etc.). Additional fields for additional ticket types may also be provided. In some embodiments, the number of random numbers selected for a "keno" type event is predefined in the gaming management system 102 and the gaming management 102 system may automatically calculate the probability of each outcome based on the predefined values. Also, in some embodiments, the developer enters a multiplier for each potential outcome. The multiplier may determine a payout for each outcome. For example, the multiplier may indicate a multiple of the probability that is paid out upon the occurrence of each potential outcome. Upon completion of the screen 1640, the developer may be shown the integration and publishing screens shown in FIGS. 17-27 above.

Figure 30:
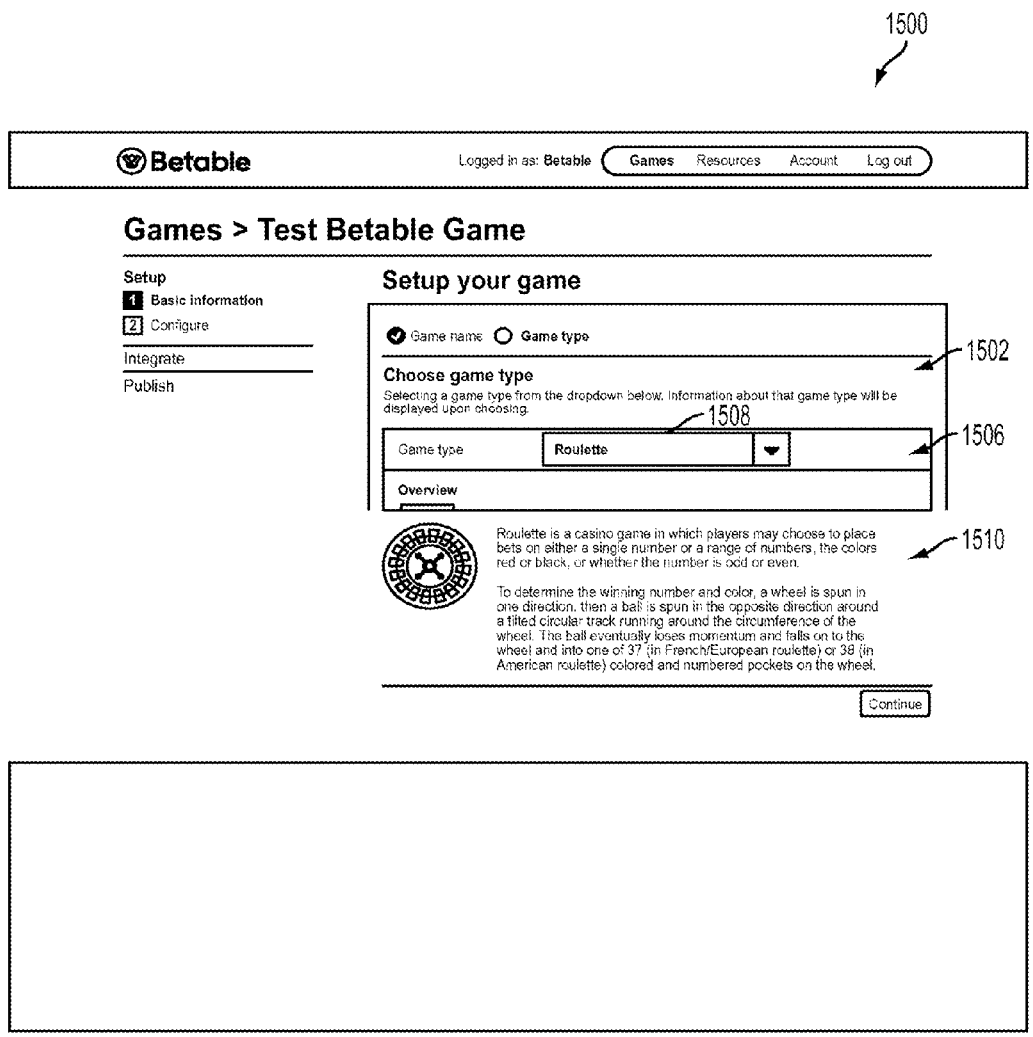
FIG. 30 is a screen shot showing one embodiment of the interface screen of FIG. 13 with the "roulette" event type selected.
Figure 31:
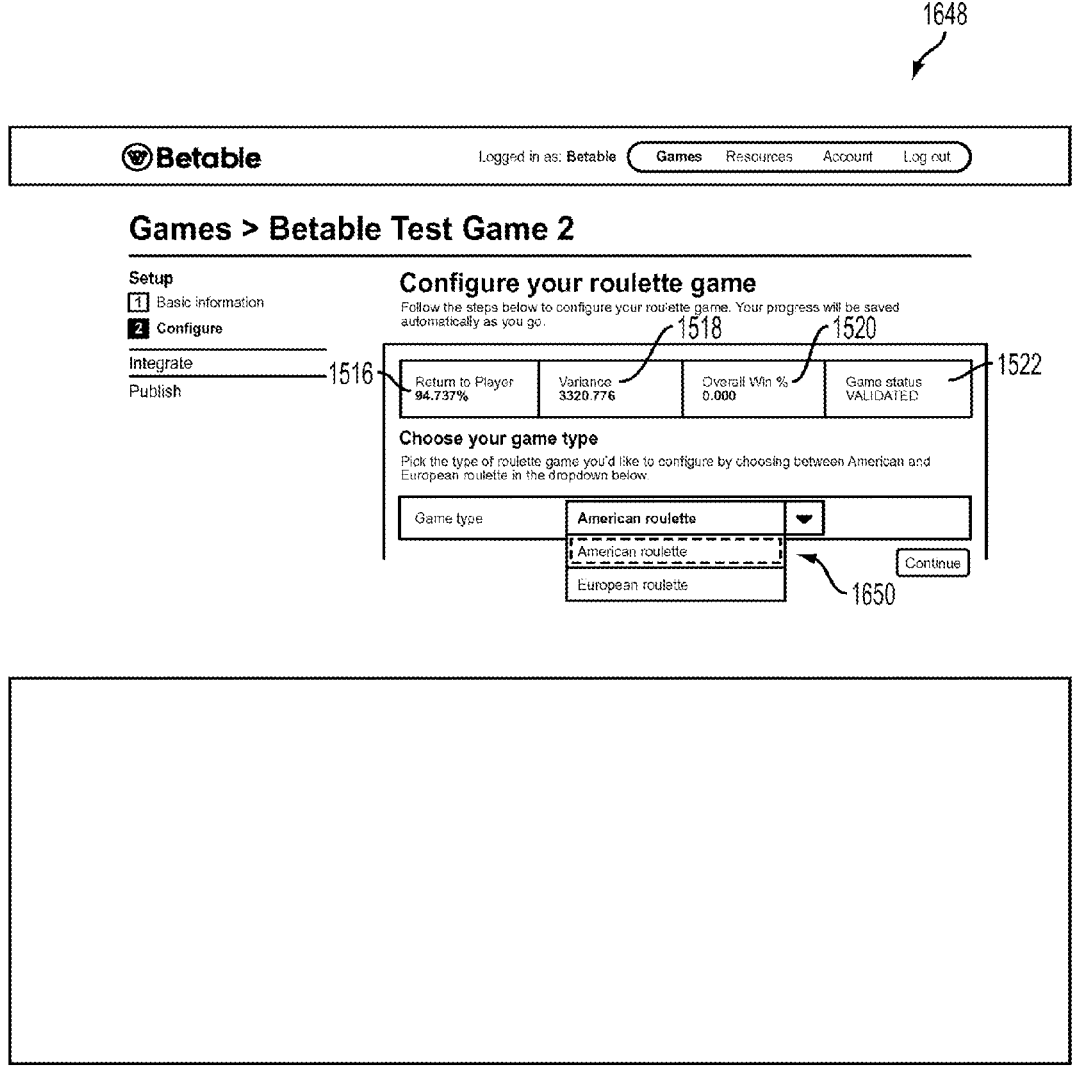
FIG. 31 is a screen shot showing one embodiment of an interface screen that may be provided to a developer to receive contingent event configuration characteristics according to a framework for "roulette" type contingent events.

FIG. 30 is a screen shot showing one embodiment of the interface screen 1500 of FIG. 13 with the "roulette" event type selected at field 1508. The field 1510 is shown to include a description of a "roulette" type event including a description of contingent events that may be created from the "roulette" type event. According to a "roulette" type contingent event the random number generator 110 generates a random number within a predetermined range. The user selects or is assigned a number that is also within the predetermined range. If the user's number matches the randomly generated number, the user wins the wager. Otherwise, the user loses. FIG. 31 is a screen shot showing one embodiment of an interface screen 1648 that may be provided to a developer to receive contingent event configuration characteristics according to a framework for "roulette" type contingent events. The screen 1648 comprises a field 1650 from which the developer may select American or European style roulette. In some embodiments, American style roulette involves a set of 37 numbers (e.g., a wheel with 37 slots) while European style roulette utilizes a set of 38 numbers (e.g., a wheel with 38 slots). In some embodiments, the field 1650 may allow the developer to enter an arbitrary size for the set of numbers. Upon completion of the screen 1648, the developer may be shown the integration and publishing screens shown in FIGS. 17-27 above.

Figure 32:
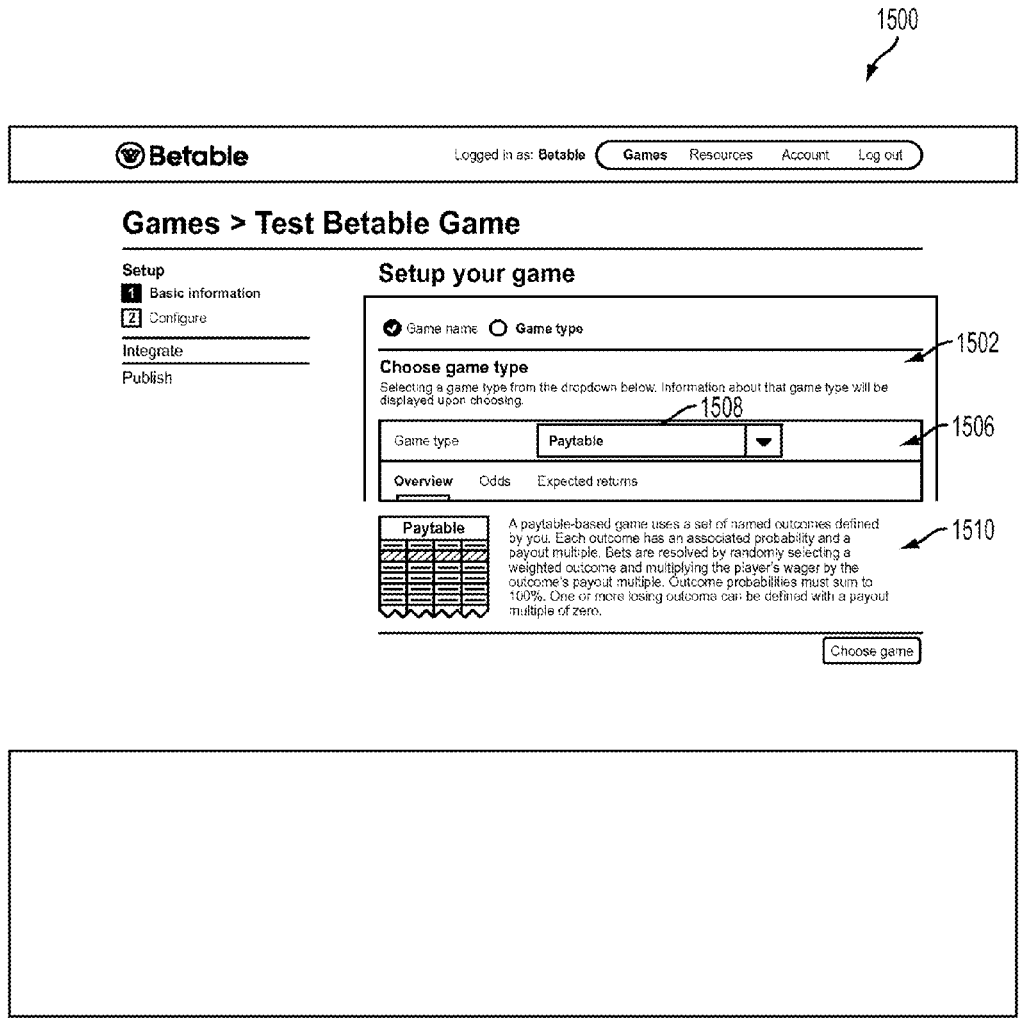
FIG. 32 is a screen shot showing one embodiment of the interface screen of FIG. 13 with the "pay table" event type selected.
Figure 33:
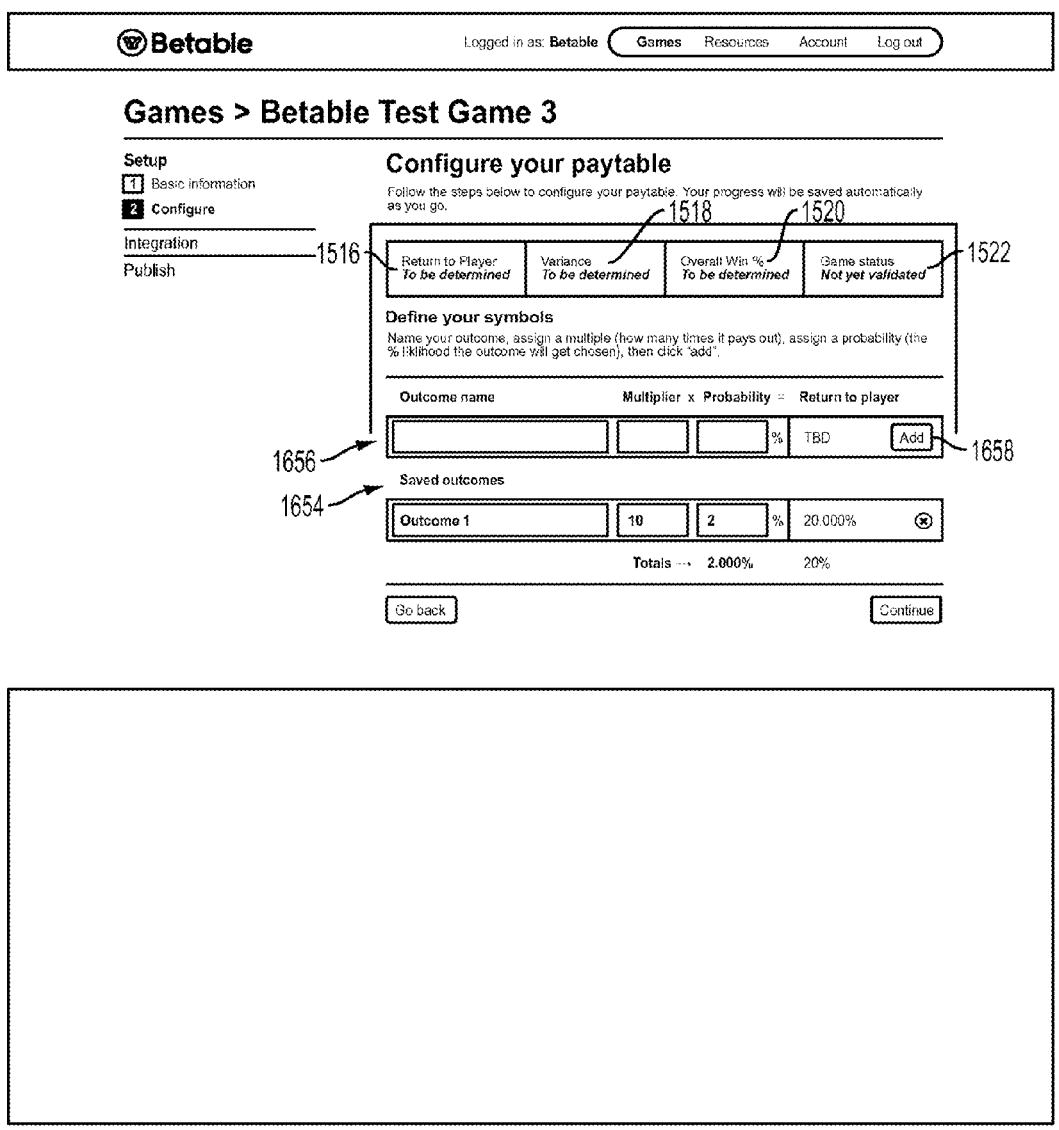
FIG. 33 is a screen shot showing one embodiment of an interface screen that may be provided to a developer to receive contingent event configuration characteristics according to a framework for "pay table" type contingent events.

FIG. 32 is a screen shot showing one embodiment of the interface screen 1500 of FIG. 13 with the "pay table" event type selected. The field 1510 is shown to include a description of a "pay table" type event including a description of contingent events that may be created from a "pay table" type event. According to a "pay table" type event, the developer may specify a set of potential outcomes and a probability of the occurrence of each outcome. FIG. 33 is a screen shot showing one embodiment of an interface screen 1652 that may be provided to a developer to receive contingent event configuration characteristics according to a framework for "pay table" type contingent events. The screen 1652 comprises a field 1656 that may receive from the developer information describing potential outcomes. Information received about each potential outcome may include an outcome name, a multiplier or other payout factor, and a probability of the outcome's occurrence. A Saved outcomes field 1654 may indicate previously entered outcomes for the "pay table" type contingent event. The developer may add additional outcomes by selecting the Add button 1658. Upon completion of the screen 1652, the developer may be shown the integration and publishing screens shown in FIGS. 17-27 above.

Figure 34:
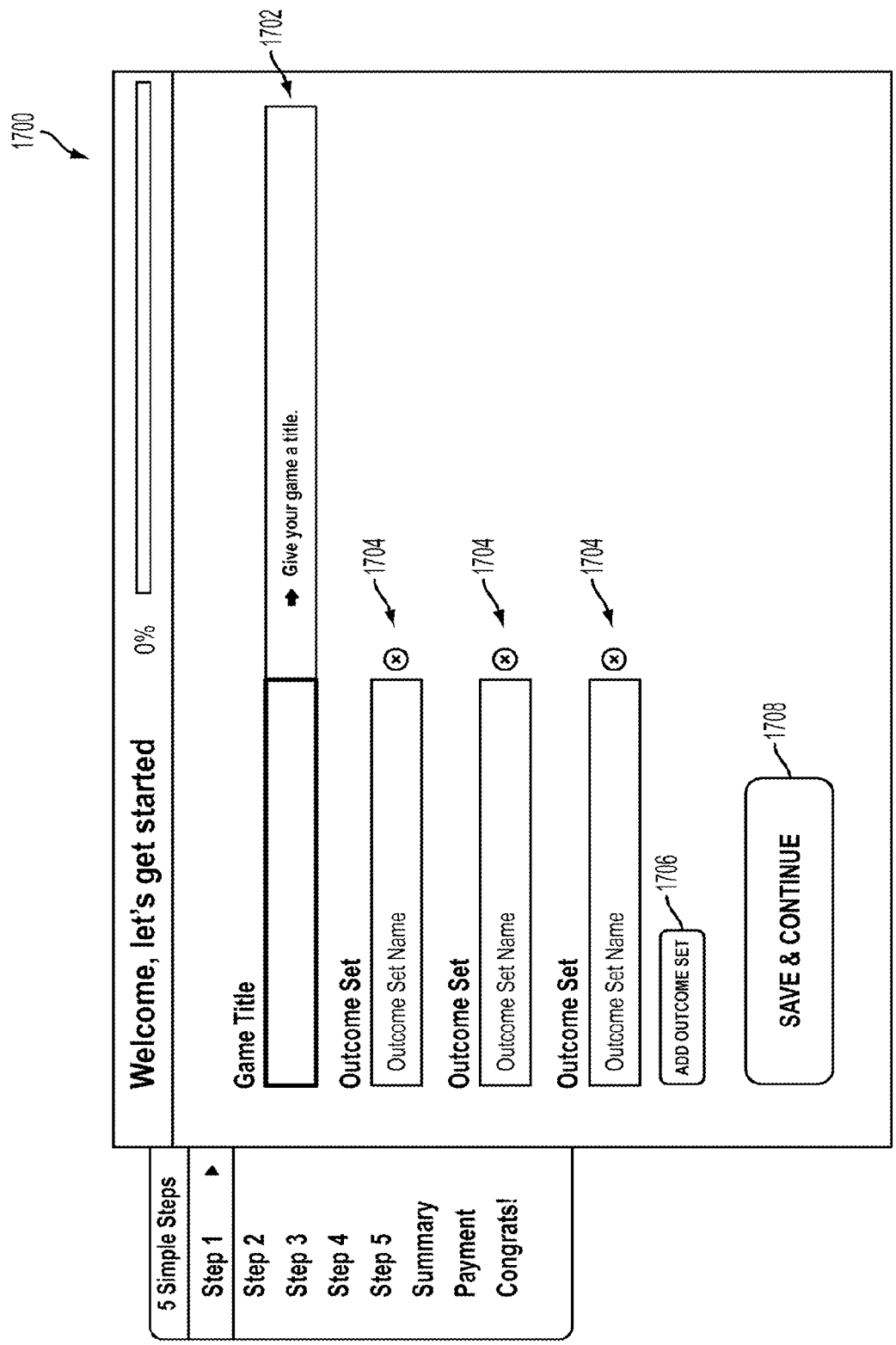
FIG. 34 is a screen shot showing one embodiment of an interface screen that may be provided to a developer to receive a name of an application and various contingent events associated with the application.
Figure 35:
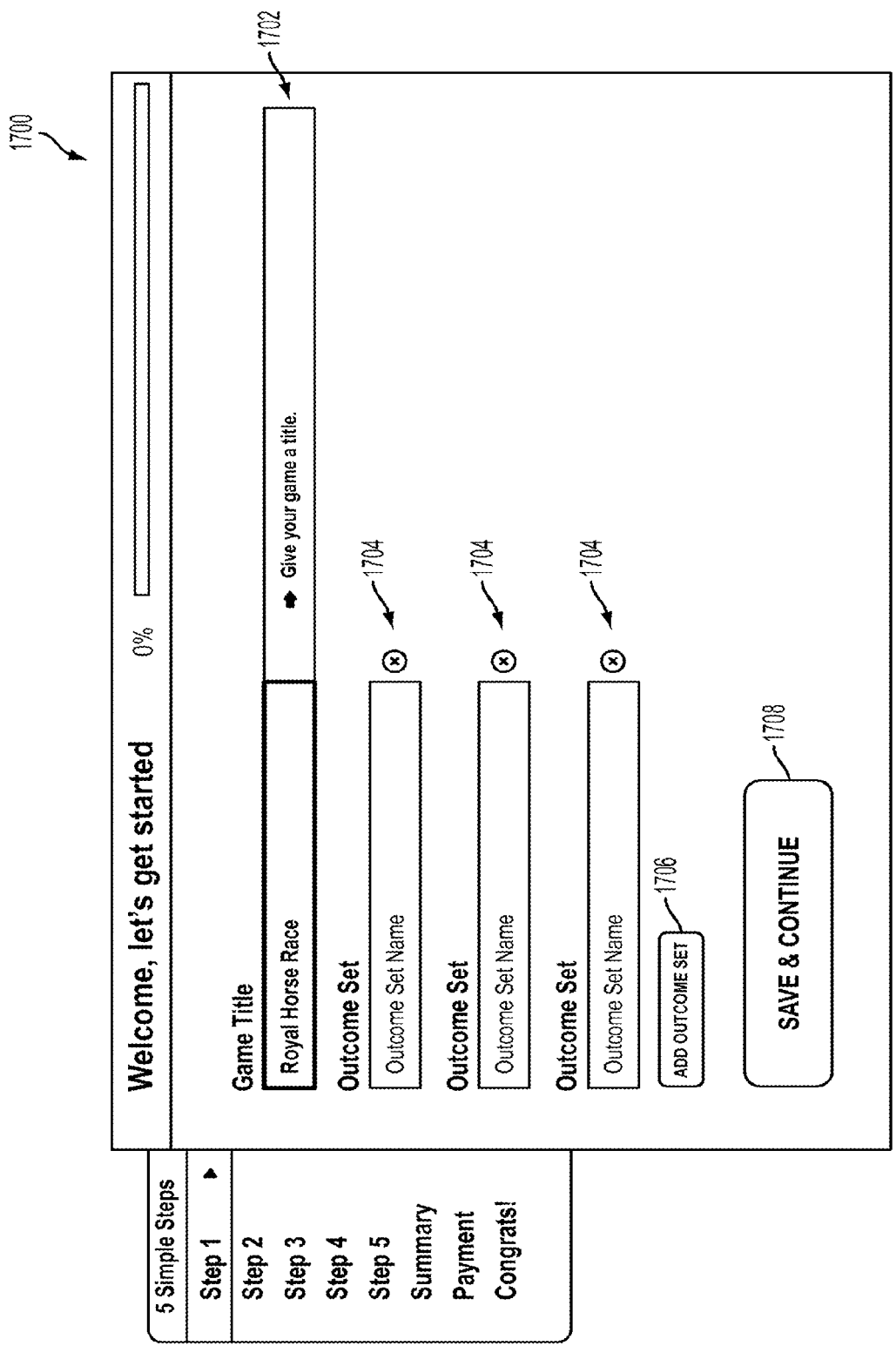
FIG. 35 is a screen shot showing one embodiment of the interface screen of FIG. 34 with an application title entered.
Figure 36:
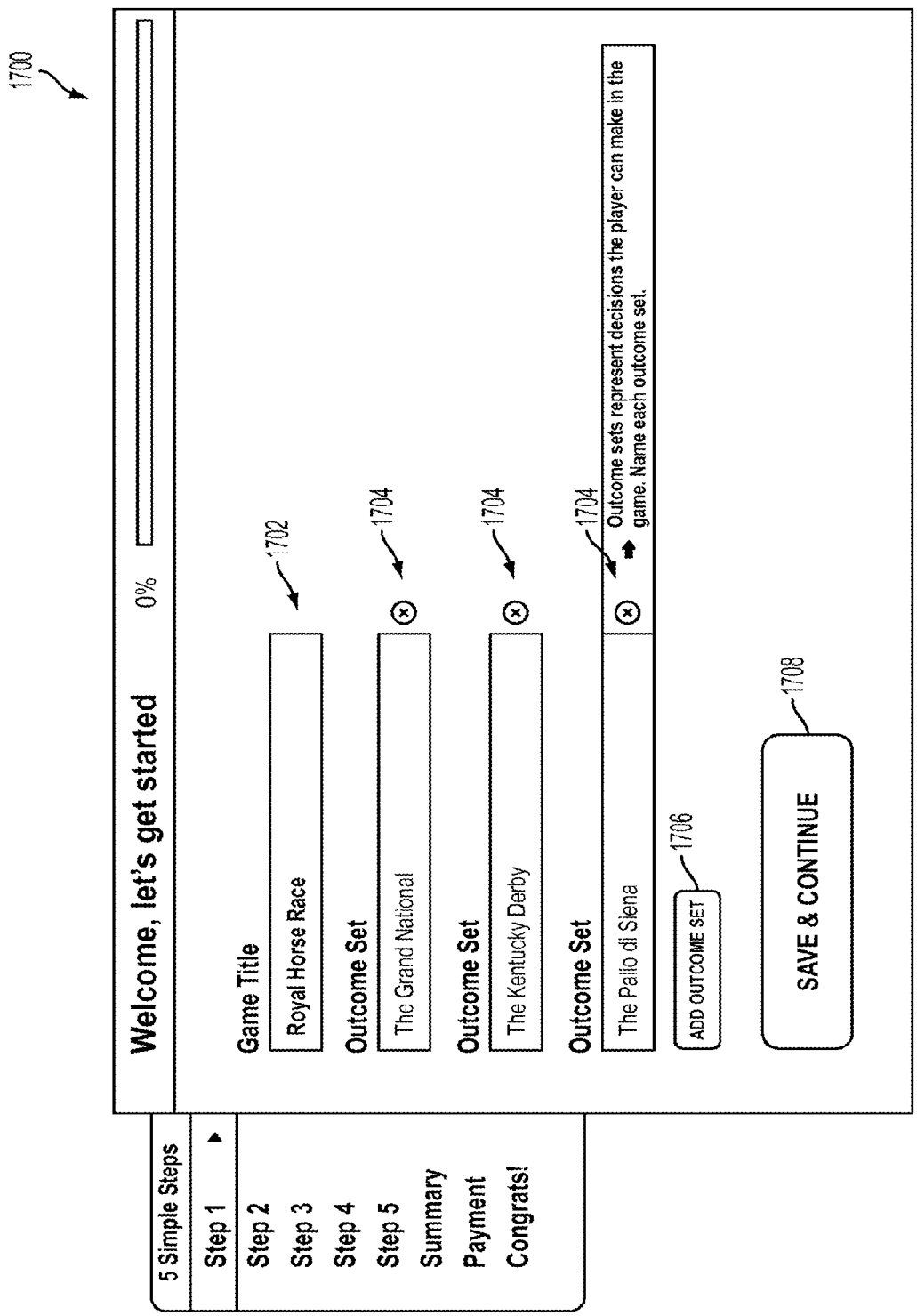
FIG. 36 is a screen shot showing one embodiment of the interface screen of FIG. 34 with three contingent events entered.

FIGS. 34-43 are screen shots illustrating various example embodiments of an alternate interface that may be provided by the gaming management system 102 to a developer for configuring and approving an application including contingent events. FIG. 34 is a screen shot showing one embodiment of an interface screen 1700 that may be provided to a developer to receive a name of an application and various contingent events associated with the application. A field 1702 may receive a name of the application (e.g., game title). Fields 1704 (referred to as Outcome Set fields in FIG. 34) may receive indications of contingent events that may be encountered in the application. For example, the developer may enter information describing the contingent events at fields 1704. Three contingent event fields 1704 are shown in FIG. 34, although additional fields may be added by selecting button 1706. The developer may select button 1708 to save the entered contingent event properties and continue. FIG. 35 is a screen shot showing one embodiment of the interface screen 1700 with an application title entered at field 1702. The title of the example application indicated in FIG. 35 is "Royal Horse Race." FIG. 36 is a screen shot showing one embodiment of the interface screen 1700 with three contingent events entered at fields 1704. The three contingent events are called "The Grand National," "The Kentucky Derby," and "The Palio di Siena." In the example application described by FIGS. 34-43, the contingent events are horse races. The contingent event type may be a horse-race specific event type and/or a generic contingent event type where the developer provides each potential outcome and the probabilities of each. Also, for example, entering of the contingent events into the fields may be equivalent to the action 507 of the process flow 500 shown in FIG. 10.

Figure 37:
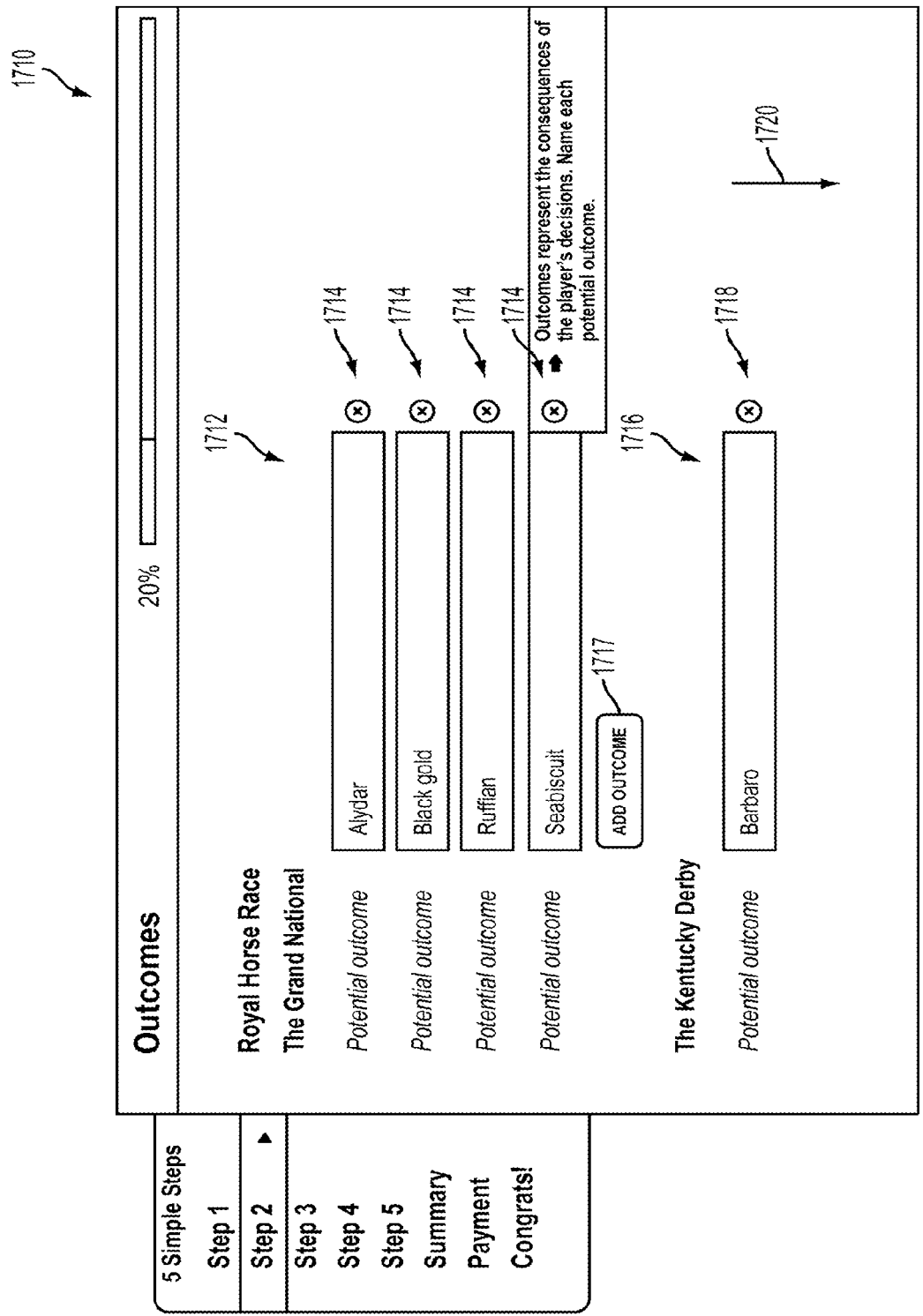
FIG. 37 is a screen shot showing one embodiment of an interface screen that may be provided to the developer to receive contingent event configuration characteristics in the form of potential outcomes.

FIG. 37 is a screen shot showing one embodiment of an interface screen 1710 that may be provided to the developer to receive contingent event configuration characteristics in the form of potential outcomes. The screen 1710 includes a field 1712 corresponding to the "The Grand National" contingent event indicates at screen 1700. The field 1712 comprises sub-fields 1714. Each sub-field 1714 may receive a potential outcome corresponding to the contingent event indicated by field 1712. For example, FIG. 37 indicates four potential outcomes for the contingent event called "The Grand National." The potential outcomes indicate the names of horses that may win the race. The potential outcomes listed in FIG. 37 are "Alydar," "Black gold," "Ruffian," and "Seabiscuit." Additional potential outcome sub-fields for receiving additional potential outcomes may be displayed by selecting the Add Outcome button 1716. The screen 1710 may comprise an additional field 1716 corresponding to the contingent event called "The Kentucky Derby" at screen 1700. One potential outcome sub-field 1718 is shown in FIG. 37. It will be appreciated that additional potential outcome sub-fields 1718 as well as additional contingent event fields may be a part of screen 1710 and may be visible by scrolling in the direction of arrow 1720.

Figure 38:
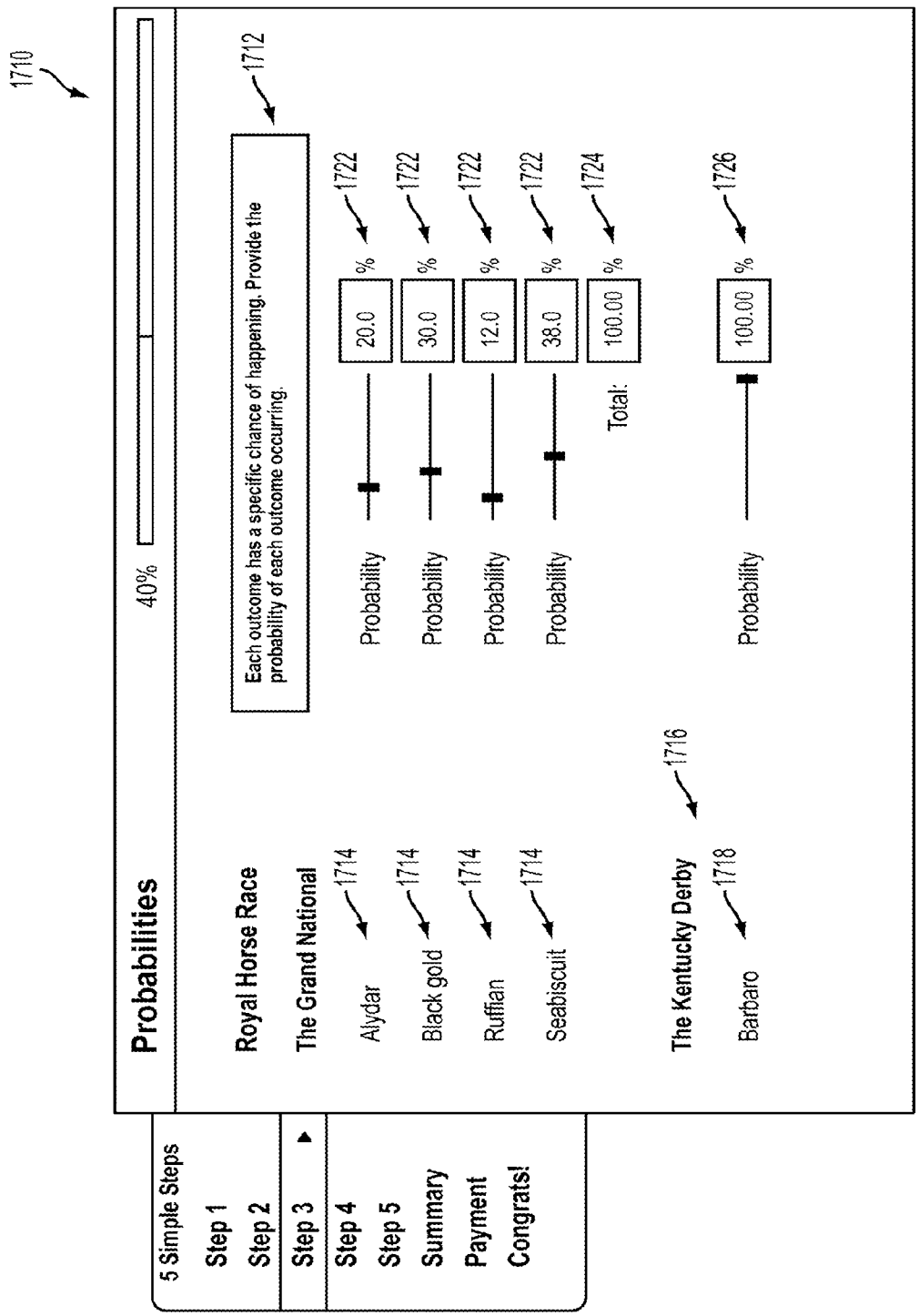
FIG. 38 is a screen shot showing one embodiment of the interface screen of FIG. 37 including fields to receive contingent event configuration characteristics in the form of probabilities associated with potential outcomes.

FIG. 38 is a screen shot showing one embodiment of the interface screen 1710 including fields to receive contingent event configuration characteristics in the form of probabilities associated with potential outcomes. Fields 1722 may correspond to the potential outcomes indicated at corresponding fields 1714. Each field 1722 may receive an indication of the probability of its corresponding potential outcome. A field 1724 indicates the sum of the probabilities of the different potential outcomes. In FIG. 38, the probabilities are expressed as percentages and the sum of all of the probabilities corresponding to the different potential outcomes is 100%. In some example embodiments, the probabilities may be expressed as fractions where the sum of all of the fractions corresponding to the different potential outcomes is 100%. A field 1726 may be used to receive from the developer a probability for the potential outcome "Barbaro" indicated at field 1718 for the contingent event "The Kentucky Derby" indicated at field 1716. It will be appreciated that additional potential outcomes and probabilities may be represented at the screen 1710, for example, by scrolling down.

Figure 39:
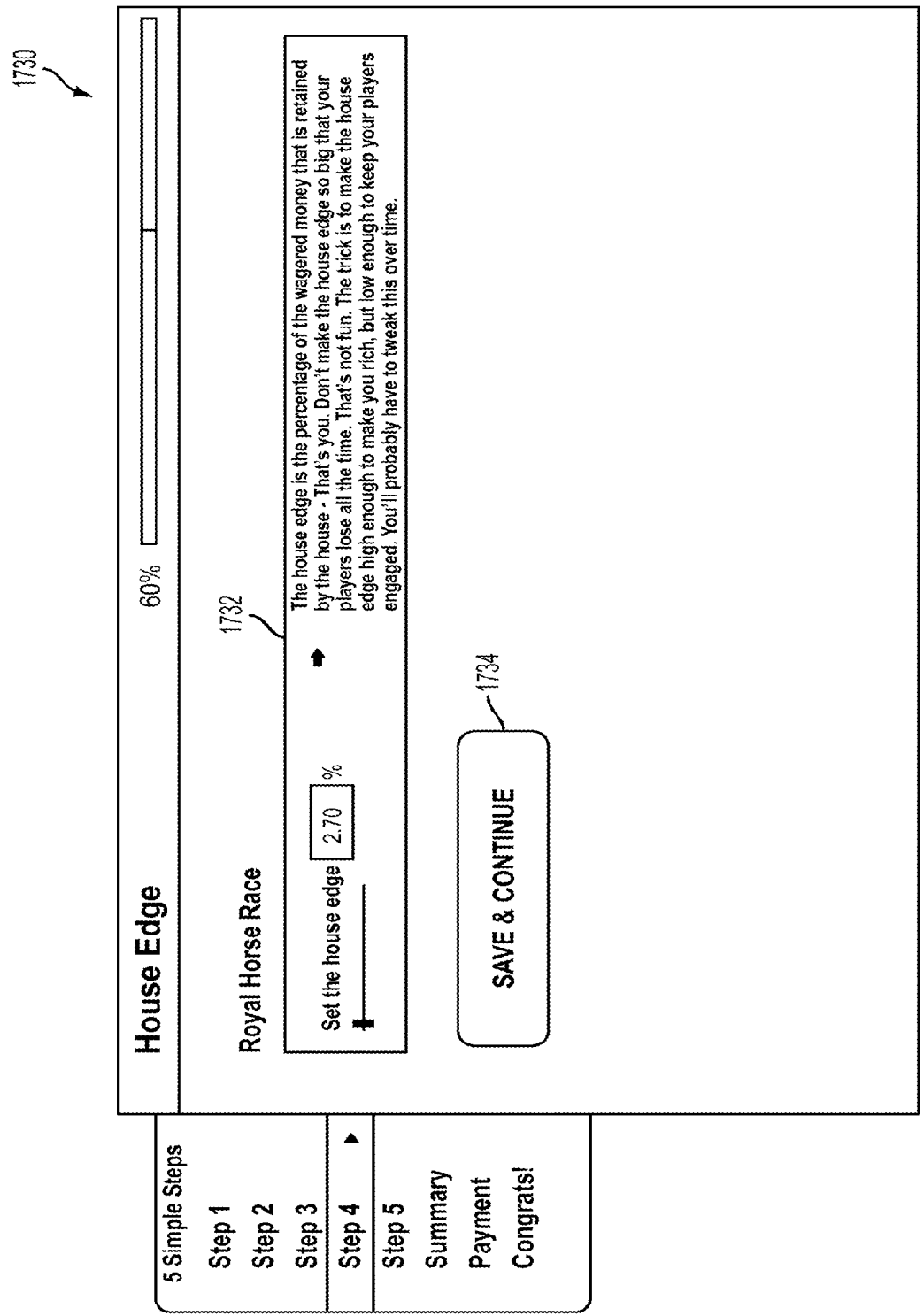
FIG. 39 is a screen shot showing one embodiment of an interface screen that may be provided to the developer to receive from the developer contingent event configuration characteristics in the form of a house edge.

FIG. 39 is a screen shot showing one embodiment of an interface screen 1730 that may be provided to the developer to receive from the developer contingent event configuration characteristics in the form of a house edge. The house edge may be a portion (e.g., percentage) of the wagered money that is retained by the house. A field 1732 may allow the developer to modify the house edge. In some example embodiments, the gaming management system may automatically set payouts for individual contingent events based on the desired house edge. In various example embodiments, as described above, the developer and the facilitating entity may split the earnings from the house edge. The house edge selected at field 1732 may apply to some or all of the contingent events entered in previously described screens. Upon selection of a house edge, the developer may select the Save & Continue button 1734 to proceed.

Figure 40:
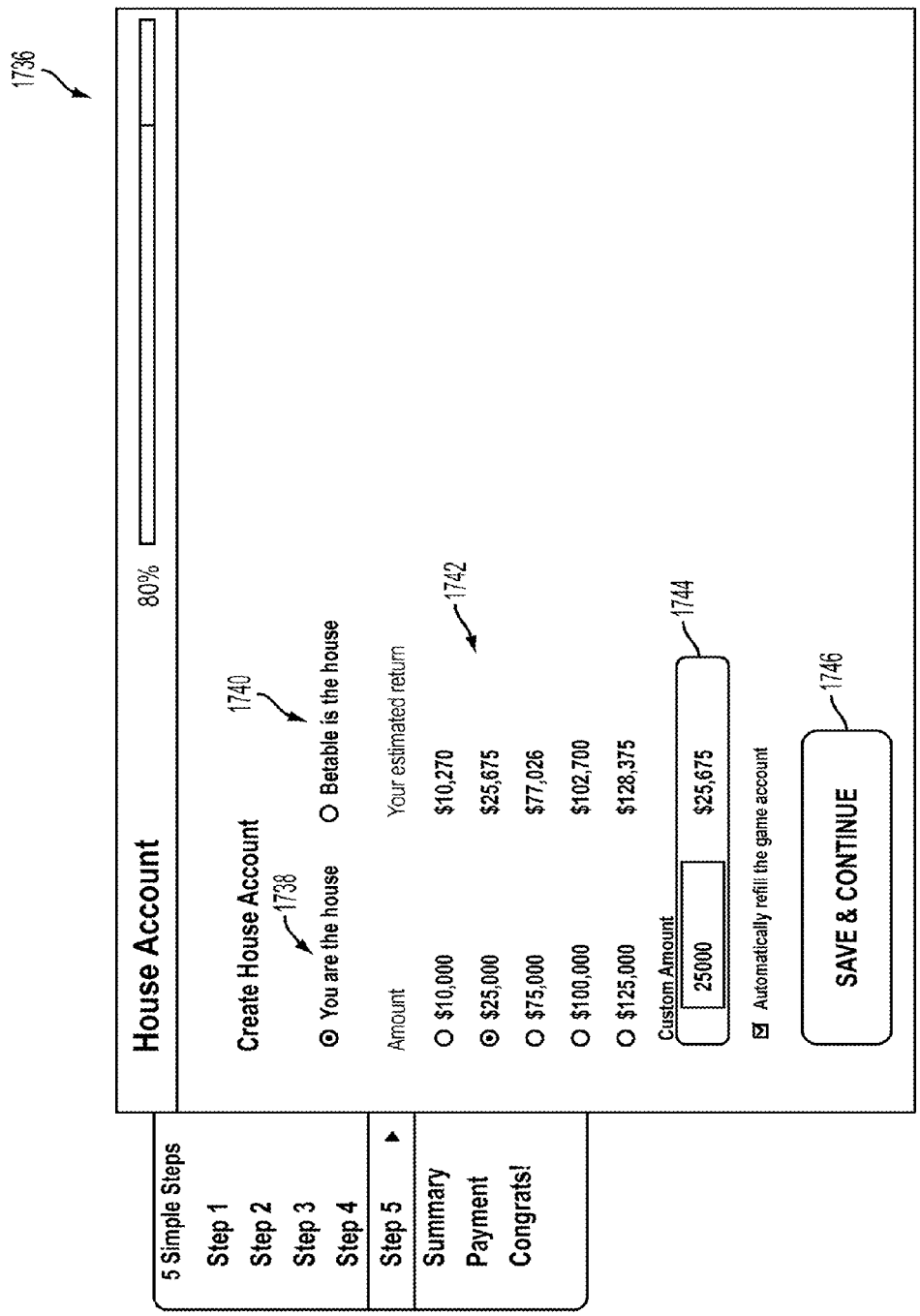
FIG. 40 is a screen shot showing one embodiment of an interface screen that may be provided to the developer to receive from the developer contingent event configuration characteristics describing the house account for the application.

FIG. 40 is a screen shot showing one embodiment of an interface screen 1736 that may be provided to the developer to receive from the developer contingent event configuration characteristics describing the house account for the application. It will be appreciated that the size of the house account may determine the number of concurrent bets that can be covered. A field 1740 may be selected by the developer to indicate that the facilitating entity will provide house funds for the application. In some example embodiments, the facilitating entity may require a larger percentage of the house edge in return for providing the house funds. A field 1738 may be selected by the developer to indicate that the developer will deposit funds to cover the house funds. A field 1742 may receive from the developer an indication of a predetermined amount at which the house account will be funded. Each predetermined amount may be listed in conjunction with an estimated return for each time that the house account turns over. In some example embodiments, a field 1744 may allow the developer to enter a custom amount for the house account. In some example embodiments, the user may check a box at field 1744 that will configure the gaming management system 102 to automatically re-fill the house account upon exhaustion of the account. The developer may continue by selecting the Save & Continue button 1746.

Figure 41:
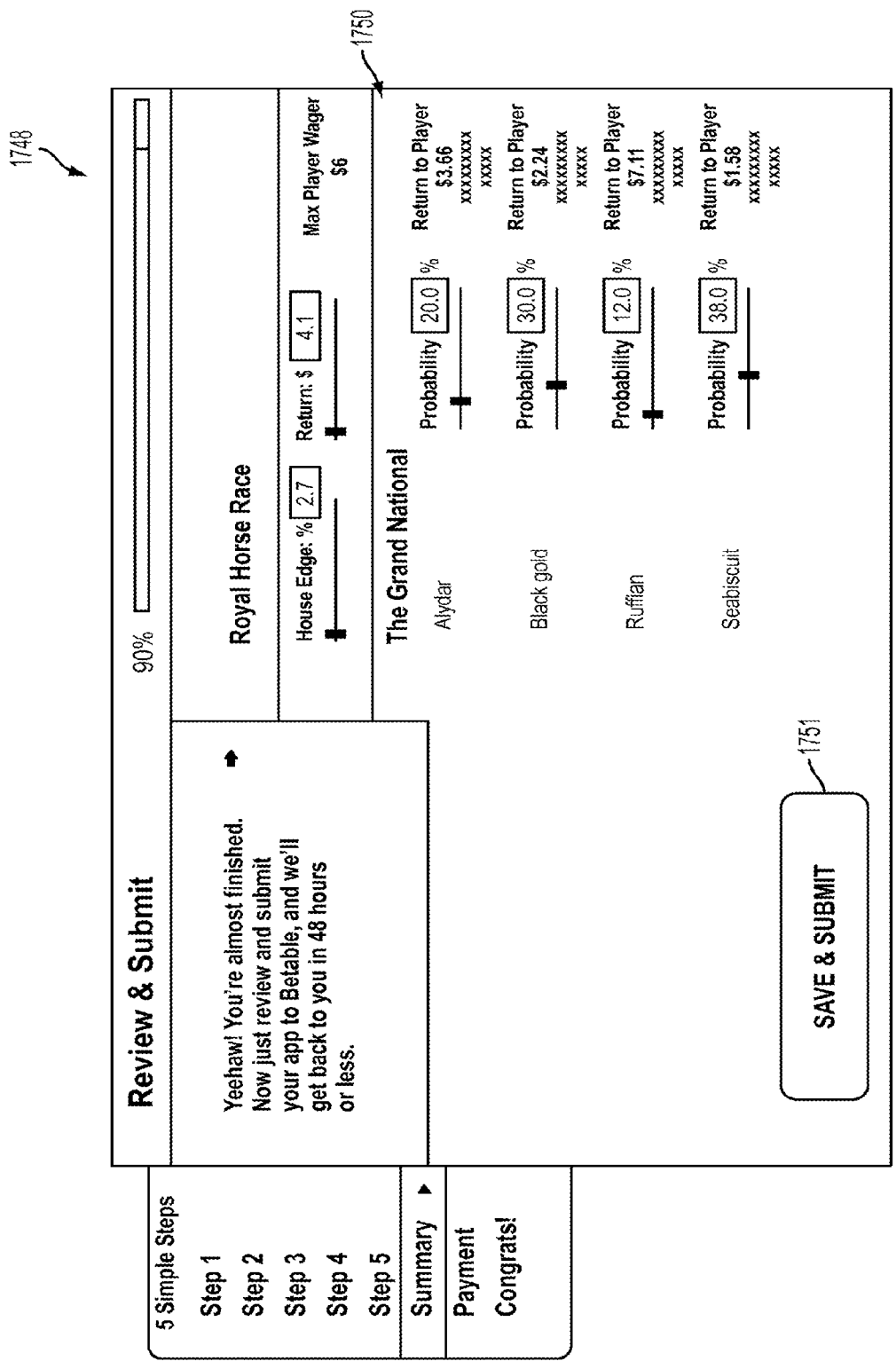
FIG. 41 is a screen shot showing one embodiment of an interface screen that may be provided to a developer to confirm a received contingent event configuration or configurations.
Figure 42:
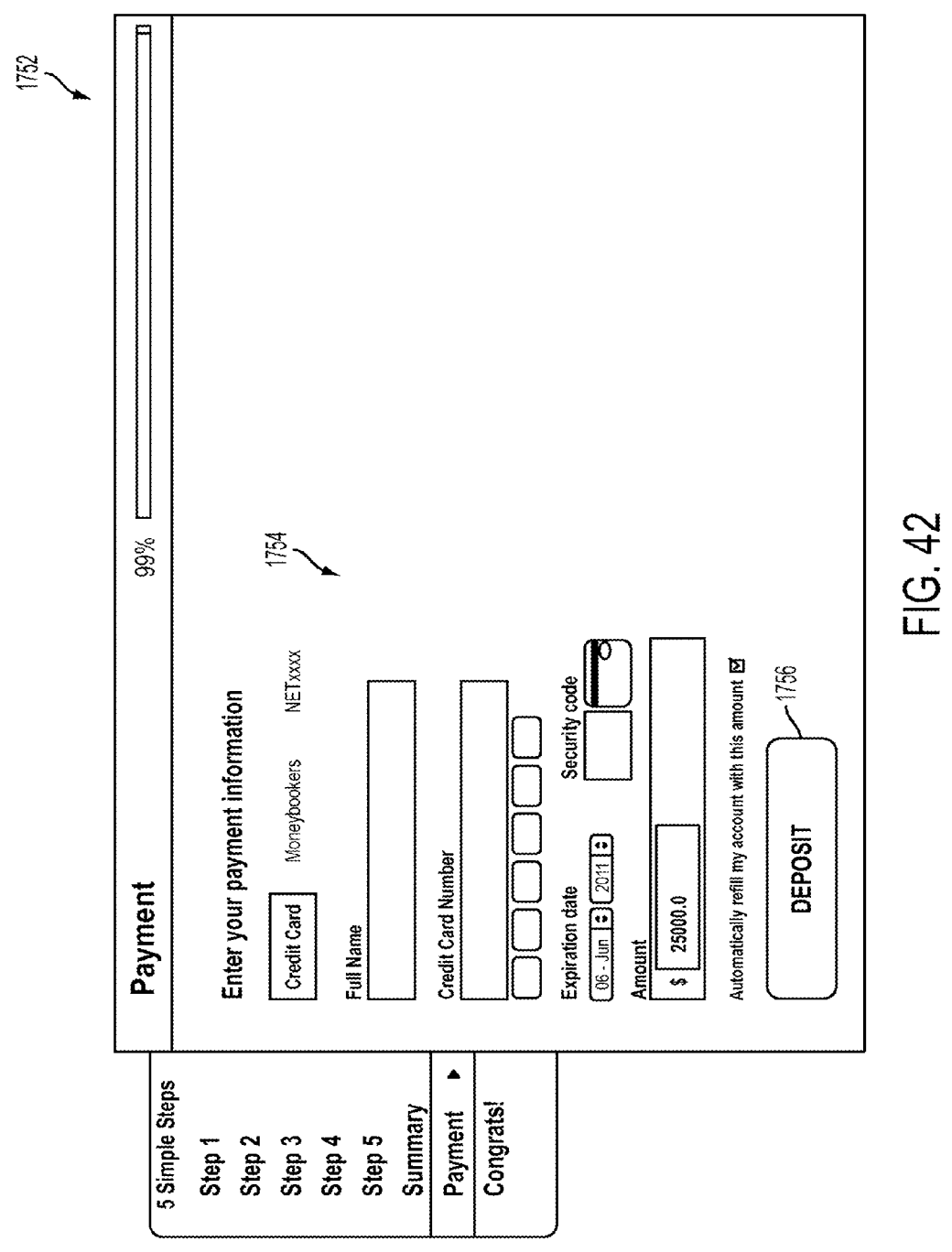
Figure 43:
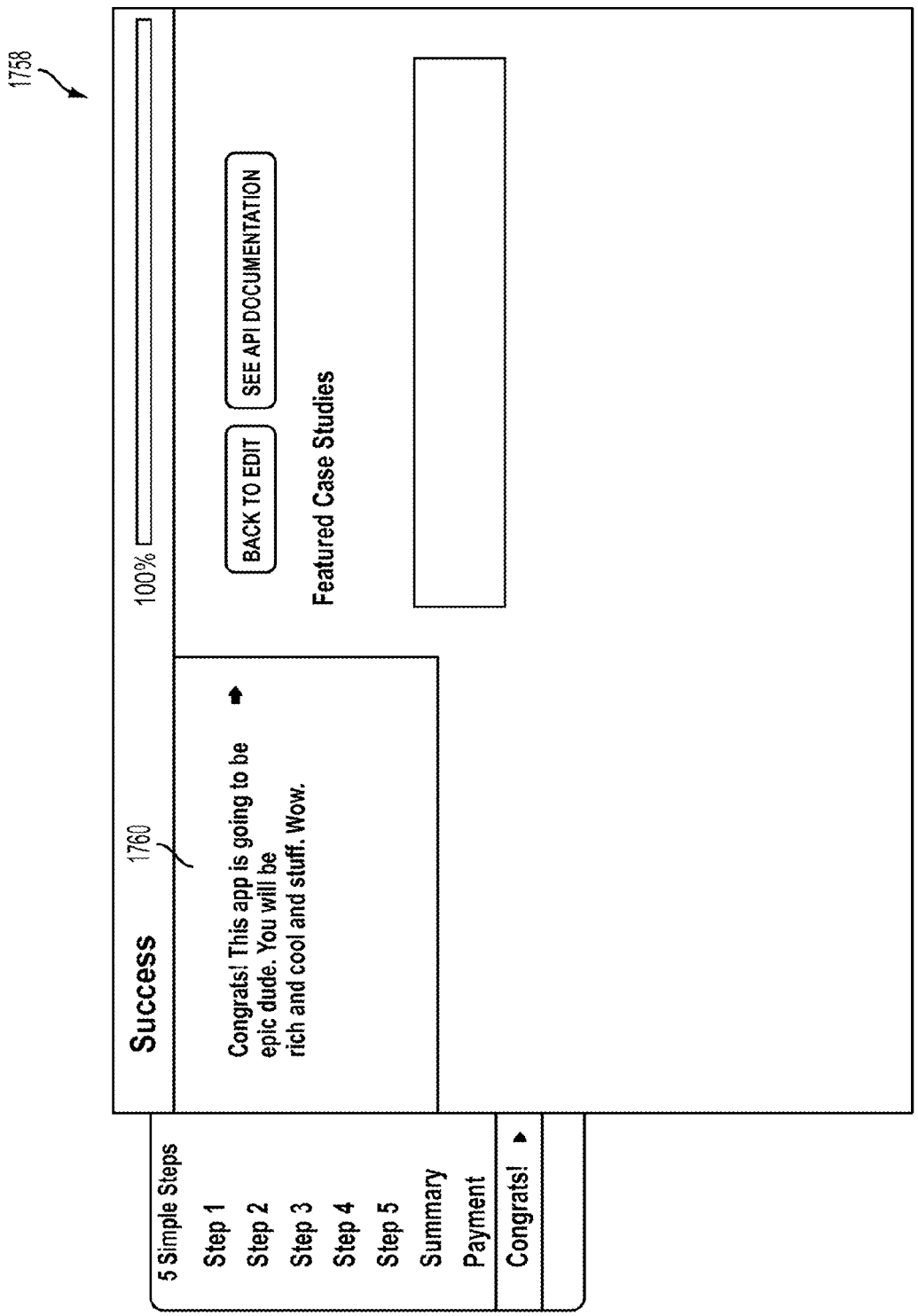
FIG. 43 is a screen shot showing one embodiment of an interface screen that may be provided to a developer to indicate to the developer that the application has been accepted.

FIG. 41 is a screen shot showing one embodiment of an interface screen 1748 that may be provided to a developer to confirm a received contingent event configuration or configurations. A field 1750 may include previously entered contingent event configuration data such as, identified contingent events, identified potential outcomes, probabilities for the identified potential outcomes, etc. The field 1750 may also indicate an expected payout for each potential outcome of each contingent event, for example, based on the desired house edge. Provided that the contingent event configuration data shown at screen 1748 is acceptable, the developer may select a Save & Submit button 1751 to submit the application for approval, for example, similar to 516 of the process flow 500. FIG. 42 is a screen shot showing one embodiment of an interface screen 1752 that may be provided to a developer to receive payment detail information (e.g., for funding the house account as described with respect to the screen 1736 of FIG. 40). The screen 1752 comprises a field for receiving payment detail information 1754. The payment detail information may include a payment form (e.g., credit cart, money order, wire transfer, NETeller, etc.). The amount to be charged may be as set with respect to screen 1736 above. When the credit card payment form is selected, additional information to be received may include the cardholder name, credit card number, expiration date, security code, etc. The developer may select the Deposit button 1756 to complete the transaction. FIG. 43 is a screen shot showing one embodiment of an interface screen 1758 that may be provided to a developer to indicate to the developer that the application has been accepted. A field 1760 may indicate to the developer that the application has been approved. Upon approval, instances of the application executed by and/or on behalf of users may communicate with the gaming management system 102, for example, as described above with respect to FIGS. 2 and 3.

Referring now back to FIG. 1, the API 108 may be any suitable type of API implemented according to any suitable communication protocol. For example, the API 108 may utilize hypertext transfer protocol (HTTP) and/or hypertext transfer protocol secure (HTTPS). The API 108 may be configured to comply with representational state transfer (RESTful) principles and/or utilize other suitable methods to achieve generality between platforms. In various embodiments, some or all communications between the applications and the API 108 may be secure, for example, utilizing a secure communication protocol such as, HTTPS, secure socket layer (SSL), transport layer security (TLS), etc.

Figure 44:
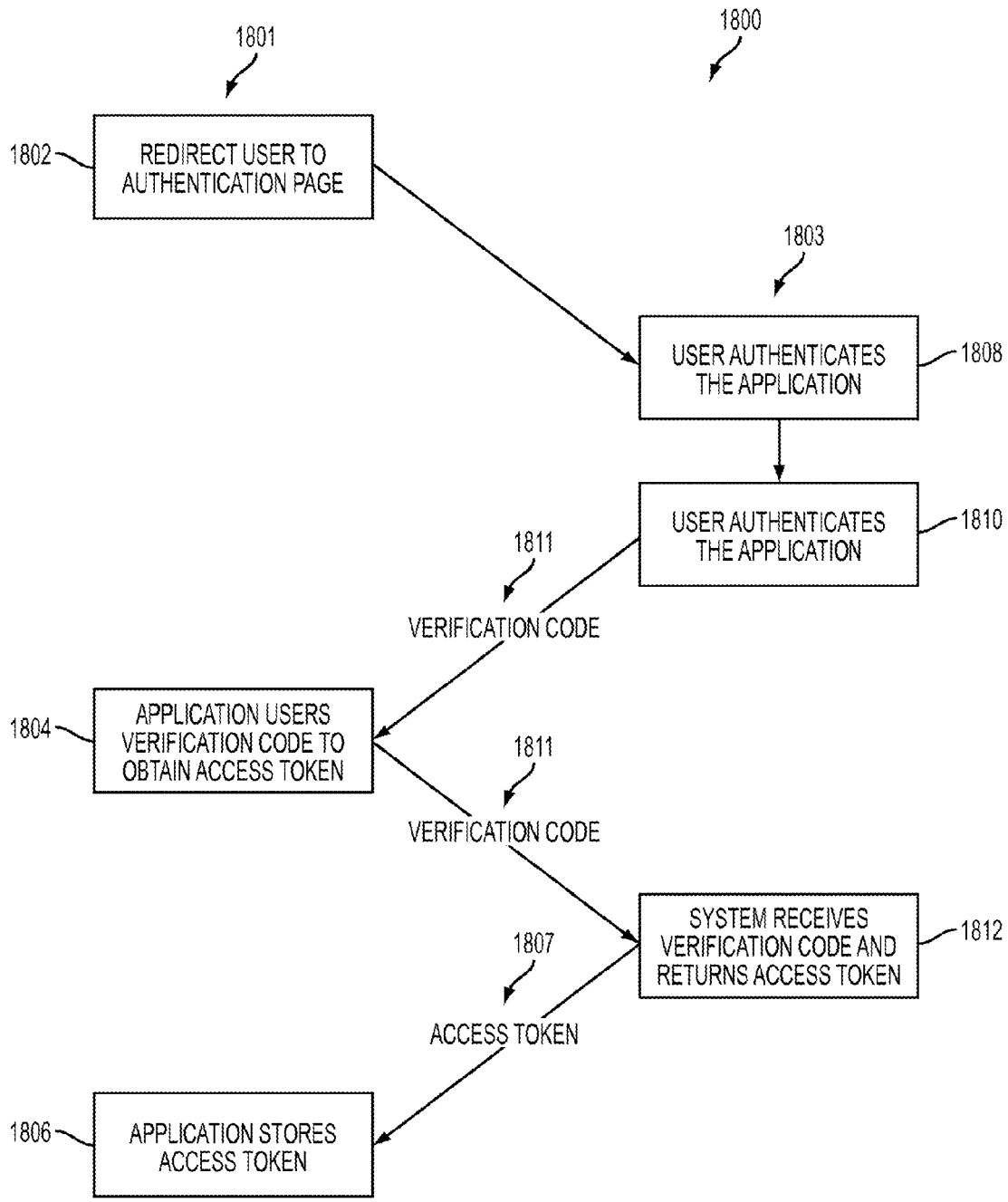
FIG. 44 is a flow chart illustrating one embodiment of a process flow that may be implemented by the gaming management system of FIG. 1 (e.g., the API thereof) and an application to authenticate the application to the API.

Also, in various embodiments, the API 108 may authorize applications to utilize the API 108 using any suitable method. In some example embodiments, the API 108 may authorize applications utilizing OAUTH 2.0 or a similar authentication mechanism. FIG. 44 is a flow chart illustrating one embodiment of a process flow 1800 that may be implemented by the gaming management system 102 (e.g., the API 108 thereof) and an application to authenticate the application to the API 108. For example, the process flow 1800 may represent the actions 306 and 314 of the process flow 300. In FIG. 44, column 1801 corresponds to actions performed by the application, while column 1803 corresponds to actions performed by the gaming management system 102 (e.g., the API 108 thereof). At 1802, the application may redirect the user to an authorization page provided by the API 108. The authorization page may be identified by a universal resource locator (URL) known to the application in conjunction with a custom URI scheme. In some example embodiments, the URL and custom URI scheme may indicate an authorization key or other API credential provided to the application during the configuration and integration described herein with respect to FIGS. 10-43. Also, in some example embodiments, the URI may correspond to the URI provided to the developer for inclusion in the application also during the configuration and integration process, an example of which is described above with respect to FIGS. 17-19.

At 1808, the gaming management system 102 may authenticate the application, for example, based on the API key and on input received from a user of the application. For example, the user may create an account with and/or log-in to the gaming management system 102. In some example embodiments, the user may be authenticated using a third-party account such as an AMERICA ONLINE account, a GOOGLE account, a YAHOO account, an OPENID account, a FACEBOOK account, a TWITTER account, etc. The user may automate future log-ins, for example, by checking an appropriate box. After the user is authenticated, the API 108 may redirect the computer device implementing the application to a URI of the custom URI scheme. For example, the redirect URI may be indicated in the authentication request. In some example embodiments, the redirects may be accompanied by a verification code 1811.

At 1804, the application may utilize the verification code to obtain an access token. For example, the application may provide the verification code to the API 108. In response, the API 108 may, at 1812, return the access token 1807. The application may store the access token at 1806. This access token, sometimes referred to as an OAUTH access token, may be utilized by the application to access the API 108.

In various example embodiments, the API 108 may support a number of commands/message types. Example commands/message types that may be supported are reproduced below:

1. Get User Profile—This method may be used by an application to retrieve a user profile, for example, at or in conjunction with 306 of the process flow 300. For example, the user profile may comprise information describing the user's balance and other information that may be displayed to the user and/or utilized by the application (e.g., during game play to affect game play). In some example embodiments, the Get User Profile method may be implemented as an HTTP GET method. Request parameters for an example Get User Profile method are provided below:

| Parameter | Example | Description |
| --- | --- | --- |
| oauth-token | {oauth token: J0xBJ6lgTgTmRGntyOtluRhI3msbxmhmUHdzJnXd"} | Token obtained by the application after user authorization cycle. The token represents the unique user id. |

Example response data for the example Get User Profile method are provided below: Example response data if the request is successful:

| HTTP Section | Example | Description |
| --- | --- | --- |
| status code | 200 | HTTP status code |
| body | user: { full_name: "John_Doe", email:john@doe.com", dob: "1985-11-01", account:[ { currency: "GBP", balance: "120.0"} ] } | User profile information. |

Response data if the request is unsuccessful/error:

| HTTP Section | Example | Description |
| --- | --- | --- |
| status code | 401 | HTTP status code |
| Body | { message: "Access denied" } | Error message |

2. Place Bet: This method may be utilized by the application to place a bet or wager received from a user on a contingent event. The Place Bet method, in some example embodiments, may correspond to the contingent event request 311 described with respect to the process flow 300. In some example embodiments, the Place Bet method may be implemented as an HTTP POST method. Request parameters for an example Get User Profile method are provided below. The contingent event is referred to as an "outcome_set."

| Parameter | Example | Description |
| --- | --- | --- |
| oauth-token | {oauth token: J0xBJ6lgTgTmRGntyOtluRhI3msbxmhmUHdzJnXd"} | Token obtained by the application after user authorization. |
| bet | { outcome_set: "coin flip", outcome: "heads", currency: "GBP", wager: 15.00 } | Bet details information including identification of the contingent event (i.e. coin flip), the outcome selected (i.e., heads), currency and wager amount |

Example response data for the Place Bet method is provided below: Example response data if the request is successful:

| Key | Example | Description |
| --- | --- | --- |
| status code | 201 | HTTP status code |
| Outcome | { outcome: "heads", currency: "GBP", payout: 25.00 } | Bet result |

Example response data illustrating a security error where the oauth_token from the request is missing or invalid:

| HTTP Section | Example | Description |
| --- | --- | --- |
| status code | 401 | HTTP status code |
| body | { message: "Access denied" } | Error profile message |

Example response data illustrating an error due to a missing or incorrect field is provided below:

| HTTP Section | Example | Description |
| --- | --- | --- |
| status code | 400 | HTTP status code |
| body | { message: "Missing or invalid data", error: {code: "1", details: [ {wager: ["Wager can't be blank"]}, | Error messages. Each field may have multiple error messages. |

-continued

| HTTP Section | Example | Description |
|---|---|---|
| | {outcome_set: ["Invalid outcome set"]} ] } } | |

Example response data indicating that there is not enough money in the user's account to place the bet is provided below:

| HTTP Section | Example | Description |
|---|---|---|
| status code | 400 | HTTP status code |
| body | { message: "Insufficient funds", error: {code: "4", details: [ {wager: ["Your account balance is insufficient"]}, ] } } | Error messages. Each field may have multiple error messages. |

3. Get User Bet: This method may be utilized by the application to retrieve bets placed by the user during a specific period of time. In some example embodiments, it may only return bets placed by the user through the requesting application. Get User Bet requests may utilize the HTTP GET method. In some example embodiments, the application may make a Get User Bet method in response to a query by the user and/or automatically to advise the user of bets that the user has recently placed. Request parameters for an example Get User Bets method are provided below. The contingent event is referred to as an "outcome_set."

| Parameter | Example | Description |
|---|---|---|
| oauth-token | {oauth token: J0xBJ6lgTgTmRGntyOtluRhI3msbxmhmUHdzJnXd"} | Token obtained by the application after user authorization. |
| range (optional) | { from: "2011-01-15 11:05:00", to: "2011-1-25 13:15:00" } | Date range for retrieving the bets |
| page (optional) | 2 | The server may return a total of 10 or any other suitable number of bets per page. This parameter may allow the application to build its own pagination system. |

Example response data for the Get User Bet method is provided below: Example response data if the request is successful:

| Key | Example | Description |
|---|---|---|
| status code | 200 | HTTP status code |
| Outcome | { bets: [ { date: "2011-01-16 14:10:05", outcome_set: "XXX", outcome: "XXX", currency: "GBP", wager: "15.00", payout: "25.00"}, { date: "2011-01-16 15:12:05", outcome_set: "XXX", outcome: "YYY", currency: "GBP", wager: "10.00", payout: "0"} ] } | Set of bets placed by the user in the requested time period |

Example response data illustrating a security error where the oauth_token from the request is missing or invalid:

| HTTP Section | Example | Description |
|---|---|---|
| status code | 401 | HTTP status code |
| body | { message: "Access denied" } | Error profile message |

In the examples provided above, the API 108 may utilize various structured data types, for example, as illustrated below:

| USER - User profile information | | |
|---|---|---|
| Key | Type | Description |
| first_name | string | User first name |
| last_name | string | User last name |
| email | string | User email address |
| dob | string | User date of birth |

| DATE RANGE - Used to represent time periods | | |
|---|---|---|
| from | datetime | Format: "YYYY-MM-DD HH:MM:SS" |
| to | datetime | Format: "YYYY-MM-DD HH:MM:SS" |

| BET HISTORY - Used to represent bets that are already placed and resolved | | |
|---|---|---|
| date | datetime | Date and time when the Bet was placed. Format: "YYYY-MM-DD HH:MM:SS" |
| outcome_set | string | Outcome Set name. |
| outcome | string | Outcome name |
| wager | float | Wagered amount in GBP |

| OUTCOME - Used to represent results of a placed bet | | |
|---|---|---|
| outcome | string | Winning outcome name |
| currency | string | Currency code, e.g., GBP |
| payout | float | Prize earned in indicated currency |

| AMOUNT - Used to represent an amount record | | |
|---|---|---|
| currency | string | Currency code, e.g., GBP |
| amount | float | Amount |

| ERROR - Used to represent an error | | |
|---|---|---|
| code | string | Error code |
| details | hash of error records | A hash containing the errors for each field of the request record. |

In the examples provided above, the API 108 may utilize various different status codes. For example, the code "Error 400" may correspond to an error indicating that a request was not allowed, for example, due to problems with the provided parameters. An "Error 400" code may be received when an incorrect data set is provided in a request. Examples of incorrect data sets may occur, for example, when an application is trying to register a user with an empty or invalid e-mail address. An "Error 401" code may indicate that an operation was not allowed due to authorization problems, for example, caused by a missing token parameter. An "Error 404" code may indicate that a requested resource is not available on the server (e.g., gaming management system 102). An "Error 500" code may indicate that an unknown error has occurred. This error may occur, for example, when data in the request query string is corrupted. Additional example error codes are provided below:

| Code | Message | Description |
|---|---|---|
| 1 | Missing or invalid data | Some request data may be missing or have an invalid value such as an invalid email address or any empty required field. |
| 2 | Unverified user | The user requires an ID verification check. |
| 3 | User verification failed | The user ID verification process failed, for example, because the user provided an invalid or not verifiable address |
| 4 | Insufficient funds | The user does not have enough money in his/her account to perform the operation. |
| 5 | Application not approved | The application is waiting for approval and has not yet been approved. |
| 6 | Payment gateway error | The information provided for the financial operation was rejected by the payment gateway 107. |
| 7 | Network error | The operation failed due to a network problem. |

It will be appreciated that the examples above describe just a single example syntax for the API 108. In practice, any suitable syntax may be used.

In various embodiments, the gaming management system 102 may be programmed with functionality for determining the affinity of a user or group of users to a particular type of game and/or a particular type of wager. Based on this information, the gaming management system 102 may modify a gaming application and/or the presentation of a gaming application to suit the preferences of the user or group of users.

Figure 45:
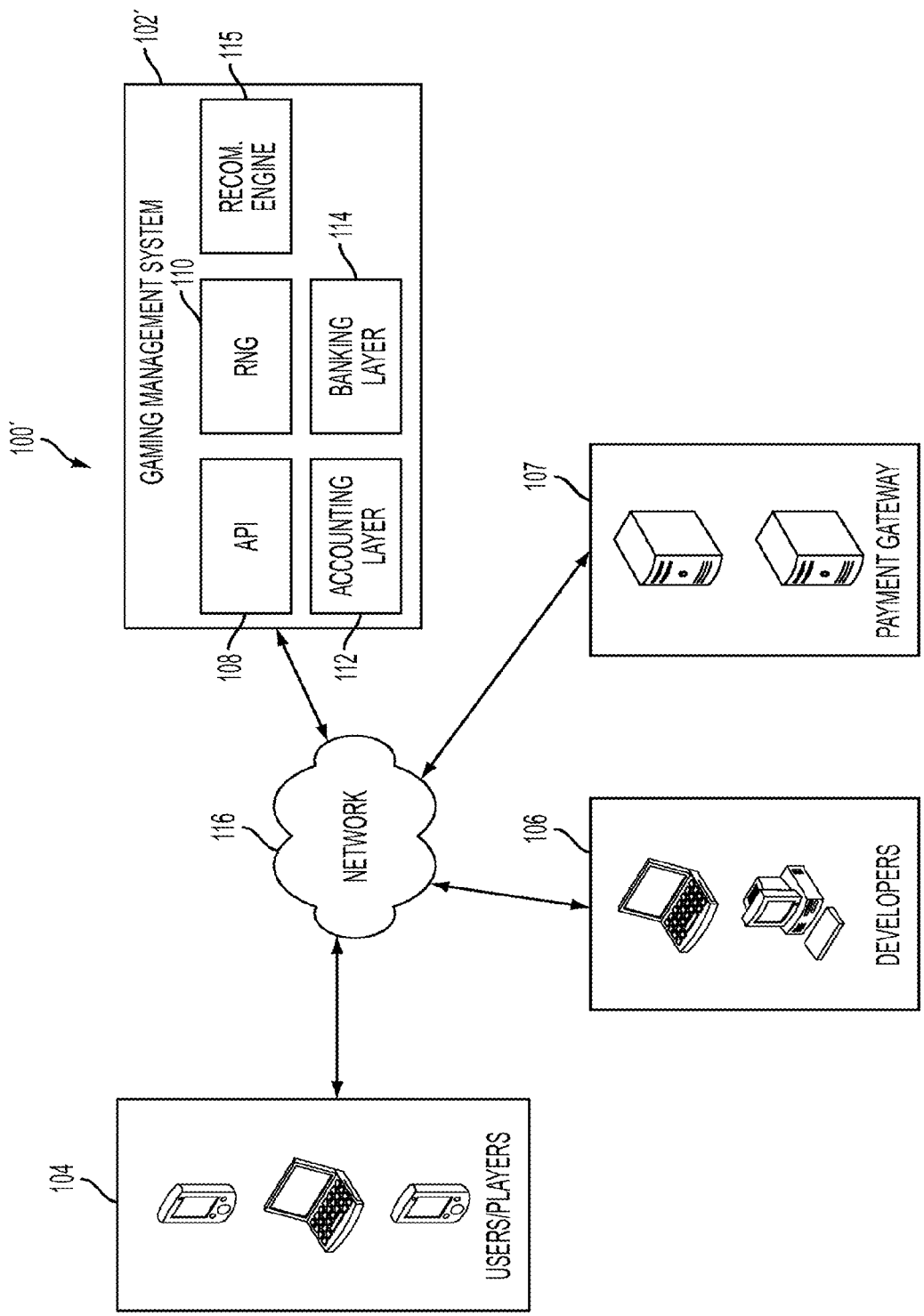
FIG. 45 is a diagram showing one example embodiment of an environment for implementing a gaming management system comprising a recommendation engine.

FIG. 45 is a diagram showing one example embodiment of an environment 100' for implementing a gaming management system 102' comprising a recommendation engine 115. As illustrated in FIG. 45, the gaming management system 102' comprises the API 108, RNG 110, accounting layer 112, and banking layer 114 as described herein above. In some example embodiments, the functionality of the recommendation engine 115 may be implemented outside the context of the other functionality of the gaming management system 102 described herein. For example, gaming applications managed by the gaming management system 102' may include applications created by developers 106 as described herein and/or developed by any other suitable developers utilizing any other suitable method of creation. Also, in some example embodiments, all or parts of gaming applications are executed directly by the gaming management system 102' and provided to users either through an output device of the gaming management system 102' and/or via a user device 104.

Figure 46:
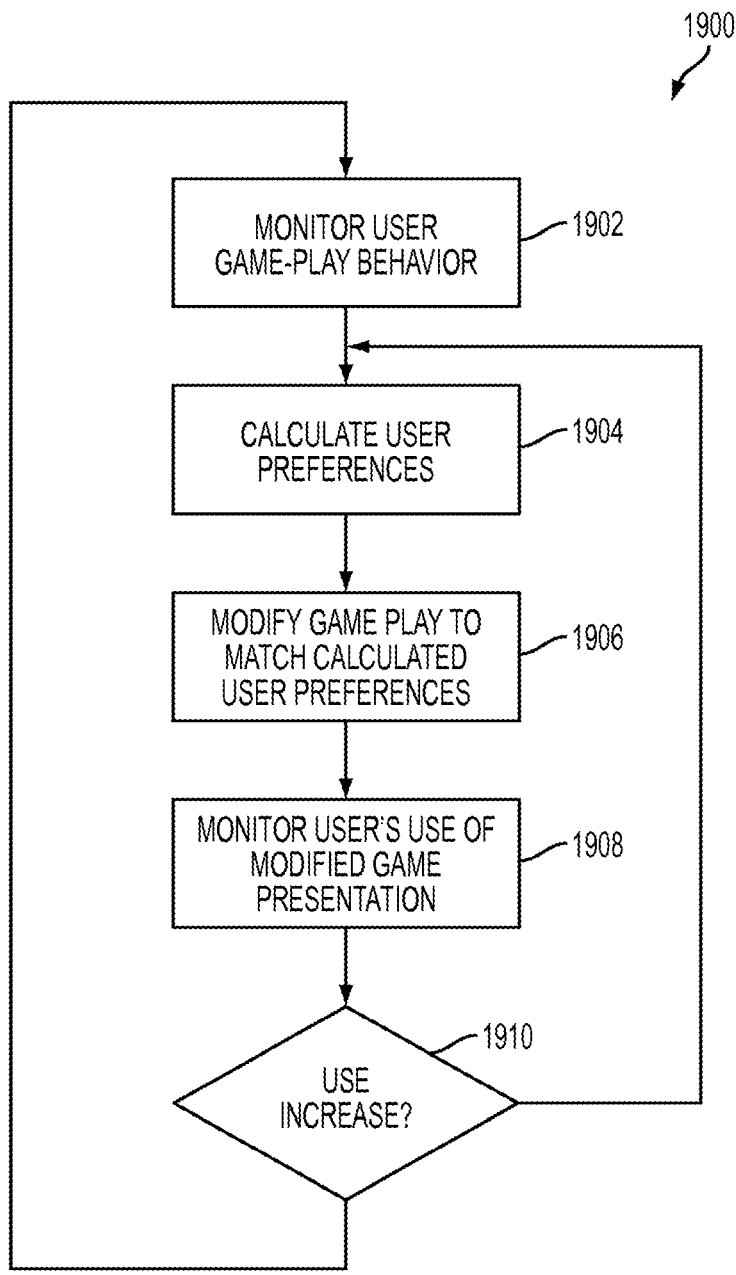
FIG. 46 is a flow chart illustrating one example embodiment of a process flow that may be implemented by the recommendation engine of the gaming management system to generate and implement recommended gaming applications for users.

FIG. 46 is a flow chart illustrating one example embodiment of a process flow 1900 that may be implemented by the recommendation engine 115 of the gaming management system 102' to generate and implement recommended gaming applications for users. At 1902, the recommendation engine 115 may monitor user game-play behavior. For example, the gaming management system 102' may facilitate wagering on contingent events within gaming applications as described above (and regardless of the manner in which the gaming applications were developed). Game-play behavior may include games or game types that a user chooses to play. In some example embodiments, game-play behavior may include decisions made by users within individual games. Such decisions may include, for example, whether to wager on a contingent event, an amount of the wager on contingent events, etc.

The game-play behavior may be monitored using any suitable metric or metrics. In some example embodiments, the recommendation engine 115 monitors the maximum or minimum wager allowed by a game or games selected by the user. In some example embodiments, the recommendation engine 115 monitors an amount of time between the placing of a wager and the resolution of the wager. For example, some users may prefer games where wagers are resolved quickly (e.g., a slot machine-style game), while other users may prefer games where wagers play out longer prior to resolution. The amount of time between the placing of a wager and the resolution of the wager may be related to a particular game or by decisions that the user makes within the game. In some example embodiments, the recommendation engine 115 monitors the win probability of wagers placed by the user as well as the payout amount for the wagers. In some cases, this value may be represented as a ratio of win probability over payout amount. In some example embodiments, the recommendation engine 115 monitors the degree of control that the user has over the outcome wagers that the users places. For example, wagers on a slot machine or roulette type game may provide the user with very little control over the outcome. On the other hand, games where wagers are based, at least in part, on the skill of the user (e.g., blackjack-style games, games of skill as described herein, etc.). In some example embodiments, the recommendation engine 115 monitors a risk tolerance of the user. The risk tolerance may be monitored based on wagers made by the user. For example, risk tolerance may be expressed based on an amalgam of amounts wagered by the use in view of the corresponding potential payouts. In some example embodiments, the recommendation engine 115 monitors a loss tolerance of the user. The loss tolerance may be determined, for example, based on recorded user losses and the user's reaction to the losses. For example, a loss tolerance may indicate that the user typically curtails further wagers upon losing a certain amount or amounts either instantaneously (e.g., in a single wager) or cumulatively (e.g., over two or more wagers).

In some example embodiments, additional game-play behavior metrics are considered by characterizing game play in terms of a decision node or nodes. A decision node within a game may be any point in the play of the game where the user is to provide input or make a decision. For example, in a slot machine game, each pull or virtual pull of the slot machine lever may represent a decision node. In a blackjack game, each opportunity for the user to stay or hit may represent a decision node. In a poker game, each ante, wager and draw may represent a decision node. Depending on the type of game implemented by a gaming application, decision nodes may be fixed and/or may be variable. For example, in a slot machine style game, the decision node corresponding to a pull of the slot machine lever may be fixed. In other types of games, however, the placement and properties of decision nodes may be determined directly or indirectly by the user, for example, based on prior game play decisions made by the user. Examples of such games include, for example, games of skill, strategy games such as FARMVILLE, FARMTOWN, ANGRY BIRDS and the MAFIA WARS games described herein above.

In some example embodiments, the recommendation engine 115 monitors additional game play metrics for games characterized using decision nodes. A frequency of decision nodes may describe a frequency with which the user encounters decision nodes during game play. The frequency of decision nodes may be a function of a gaming application itself and/or a function of user choices during game play. For example, a slot machine or blackjack style game may have a relatively constant frequency of decision nodes regardless of decisions made by the user. On the other hand, a strategy-style game such as FARMVILLE, MAFIA WARS, etc. may have a variable frequency of decision nodes based, at least in part, on the progression of the game and/or the style of the user's play. Another example game play metric for games characterized using decision nodes is a quantity and/or percentage of decision nodes that are gambling opportunity nodes. A gambling opportunity node may be a node that includes or is related to a contingent event upon which the user may place a wager. For example, in a blackjack style game, the decision to play may be a gambling opportunity node. Decisions to hit or stay may be decision nodes but may not be gambling opportunity nodes. Also, for example, in the context of a strategy game, the user may encounter decision nodes that do not provide gambling opportunities (e.g., a decision to plant a standard or non-premium crop, a decision to move between locations on a board, etc.) as well as decision nodes that do (e.g., a decision to plant a premium crop, a decision to fight another character, etc).

Referring back to FIG. 46 the recommendation engine 115 may, at 1904, calculate user preferences based on the observed game-play behavior. The user preferences may be calculated in any suitable manner. In some example embodiments, user preferences may be calculated for each user. Also, in some example embodiments, user preferences may be calculated for groups of users. For example, not every user will make enough wagers or play gaming applications frequently enough to generate a statistically significant set of game play behavior metrics. Accordingly, users, and game play behavior metrics, may be grouped together to determine user preferences. In various example embodiments, users are grouped together based on common characteristics. For example, users may be grouped based on similar backgrounds (age, profile, frequency of gaming, etc.) and/or based on common or similar game play behavior metrics.

In some embodiments, calculating user preferences may comprise generating a perceived utility and a risk tolerance. The perceived utility may indicate the relative value to the user (or user group) of various combinations of game play behavior metrics. The perceived utility may be calculated and/or expressed in various different forms. In some embodiments, the perceived utility is indicated in tabular form. For example, each observed game play behavior metric may be assigned a representative value for the user and/or for all users in a group. The representative value may be, for example, a mean, a median, etc. Also, in various embodiments, the perceived utility may be indicated in functional form. For example, the gaming management system 102' may calculate a best-fit curve matching the values of one or more measured game play behavior metrics.

At 1906, the gaming management system 102' may modify a user's game play based on the user preferences calculated at 1904. In example cases where the user has played with the gaming management system 102' frequently enough for the gaming management system 102' to generate a threshold quantity of user game play behavior metrics for the user, the modifications to the gaming application may be based on user preferences specific to the user. In some example embodiments, and in cases where the gaming management system 102' has less than the threshold quantity of user game play behavior metrics for the user, the modifications may be based on the user preferences of a class of users including the user. For example, the gaming management system 102' may receive data describing the user (e.g., from the user). The information may include demographic information, geographic information, etc. Based on the user information, the gaming management system 102' may assign the user to a group of users and modify game play based on user preferences of the assigned group.

The gaming management system 102' may modify game play in any suitable manner. For example, in some embodiments, the gaming management system may modify a set of games presented to the user for play (e.g., via a user interface). For example, the set of games presented to the user for play may include games having game play characteristics close to and/or matching the user preferences. Also, in some embodiments, the gaming management system 102' modifies gaming applications to match user preferences. For example, the gaming management system 102' may modify a maximum or minimum wager amount, a game speed, etc. to match the user preferences. In some embodiments, modifications to gaming applications are implemented by pushing code updates to a user device 104. In other embodiments, modifications to gaming applications are implemented by the gaming management system 102' itself. In example embodiments the user preferences may indicate that a particular user or group of users prefers to play games where the maximum wager is under a particular amount (e.g., $1.00). The gaming management system 102' may modify either applications and/or wager parameters provided to applications in order to present games to the user with maximum wager amounts below a particular amount.

At 1908, the recommendation module 115 may monitor the user's use of modified game play and, at 1910, may determine whether the modified game play has lead to an increase in the user's utilization of the gaming management system 102'. Again, the monitoring and determination may be based on a single user and/or may be based on groups of users. Feedback data determined at 1908 and 1910 may be utilized at 1904 to calculate user preferences. For example, feedback data may be utilized to distill user game play behavior metrics into user preferences, as described above.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Reference in the specification to "one example embodiment," "one embodiment," "an example embodiment," or to "an embodiment" means that a particular feature, structure, or characteristic described in connection with the embodiments is included in at least one embodiment of the invention. The appearances of the phrase "in one example embodiment" or "a preferred embodiment" in various places in the specification are not necessarily all referring to the same embodiment. Reference to embodiments is intended to disclose examples, rather than limit the claimed invention.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of actions (instructions) leading to a desired result. The actions are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method actions. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A computer-implemented gaming management system for facilitating gaming applications, the system comprising:
  a computer system comprising at least one processor and operatively-associated memory, wherein the computer system is programmed to:
    record values for a plurality of game play behavior metrics describing game play of at least one user of a gaming application including a contingent event that is the subject of a wager, wherein at least one of the plurality of game play behavior metrics describes the wager placed by the at least one user through the gaming application on the contingent event, and wherein recording values for the plurality of game play behavior metrics comprises recording values for a wager limit allowed by the gaming application selected by the at least one user;
    based on the plurality of game play behavior metrics, determine at least one game play preference for the at least one user; and
    modify at least one of a contingent event type and a characteristic of the contingent event type of the contingent event for a first user based on the determined at least one game play preference for the at least one user.

2. The system of claim 1, wherein the computer system is further programmed to modify game play for the user by:
   selecting at least one recommended gaming application based on the determined at least one game play preference for the at least one user; and
   providing an indication of the at least one recommended gaming application to the first user.

3. The system of claim 1, wherein the computer system is further programmed to modify game play for the user by:
   modifying at least one wager parameter of the gaming application.

4. The system of claim 1, wherein the at least one user consists of the first user.

5. The system of claim 1, wherein the computer system is further programmed to:
   receive data describing the first user; and
   select the at least one user based on the data describing the first user.

6. The system of claim 1, wherein the computer system is further programmed to:
   record data describing the first user's use of the gaming application after the game play is modified; and
   determine a new value for the at least one game play preference in view of the recorded data describing the first user's use of the gaming application after the game play is modified.

7. The system of claim 1, wherein determining the at least one game play preference comprises:
   calculating a risk tolerance for the at least one user; and
   calculating a perceived utility for the plurality of game play behavior metrics.

8. The system of claim 1, wherein the wager limit includes a maximum wager allowed by the gaming application selected by the at least one user.

9. The system of claim 1, wherein recording values for the plurality of game play behavior metrics comprises recording values for an amount of time elapsed between a placing of a wager and a resolution of the wager in the gaming application selected by the at least one user.

10. The system of claim 1, wherein recording values for the plurality of game play behavior metrics comprises recording values for a probability of winning a wager in the gaming application selected by the at least one user and a payout for the wager.

11. The system of claim 1, wherein recording values for the plurality of game play behavior metrics comprises recording values for a degree of control that the at least one user has over the outcome of at least one wager in the gaming application selected by the at least one user.

12. The system of claim 1, wherein recording values for the plurality of game play behavior metrics comprises recording values for a loss tolerance of the at least one user.

13. The system of claim 1, wherein the gaming application is described by a plurality of decision nodes, and wherein recording values for the plurality of game play behavior metrics comprises recording a value for a frequency of decision nodes in the gaming application selected by the at least one user.

14. The system of claim 1, wherein the gaming application is described by a plurality of decision nodes, and wherein recording values for the plurality of game play behavior metrics comprises recording a quantity of decision nodes encountered by the at least one user that allow the at least one user to place a wager in the gaming application selected by the at least one user.

15. The system of claim 1, wherein the computer system is further programmed to determine whether the values for the plurality of game play behavior metrics comprise a threshold number of values describing the first user.

16. The system of claim 15, wherein the computer system is further programmed to, conditioned upon the values for the plurality of game play behavior metrics comprising the threshold number of values describing the first user:
   determine the at least one game play preference for the first user; and
   modify game play for the first user based on the determined at least one game play preference for the first user.

17. A computer-implemented method for facilitating gaming applications, the method comprising:
   recording, by a computer system, values for a plurality of game play behavior metrics describing game play of at least one user of a gaming application including a contingent event upon which a wager is placed, wherein at least one of the plurality of game play behavior metrics describes the wager placed by the at least one user through the gaming application on the contingent event, wherein recording values for the plurality of game play behavior metrics comprises recording values for a wager limit allowed by the gaming application selected by the at least one user, and wherein the computer system comprises at least one processor and operatively associated memory;
   based on the plurality of game play behavior metrics, determining, by the computer system, at least one game play preference for the at least one user; and
   modifying, by the computer system, at least one of a contingent event type and a characteristic of the contingent event type of the contingent event for a first user based on the determined at least one game play preference for the at least one user.

18. The computer-implemented method of claim 17, further comprising modifying a parameter of a different gaming application based on the determined at least one game play preference for the at least one user.

19. The system of claim 1, wherein the at least one user includes at least the first user and a second user, and the game play for the first user is modified based, at least in part, on at least one game play preference for the second user.

20. A computer-implemented gaming management system for facilitating gaming applications, the system comprising:
   a computer system in communication with a developer computer device, the computer system comprising at least one processor and operatively-associated memory, wherein the computer system is programmed to:
      record values for a plurality of game play behavior metrics describing game play of at least one user of a gaming application including a contingent event that is the subject of a wager,
      based on the plurality of game play behavior metrics, determine at least one game play preference for the at least one user,
      receive, from the developer computer device, configuration data for a contingent event type to be associated with the gaming application, wherein the contingent event type indicates a plurality of potential outcomes and wherein each of the plurality of potential outcomes is associated with a probability, and wherein the configuration data is based on the at least one game play preference of the at least one user,
      determine whether the configuration data meets at least one predetermined standard, and
      provided that the configuration data meets at least one predetermined standard, provide the developer computer device with an application program interface (API) credential to be utilized by the user application, wherein the API credential is to give the user application access to an API for resolving the contingent event of the gaming application.

* * * * *